United States Patent
Bishop et al.

(10) Patent No.: US 7,996,324 B2
(45) Date of Patent: Aug. 9, 2011

(54) SYSTEMS AND METHODS FOR MANAGING MULTIPLE ACCOUNTS ON A RF TRANSACTION DEVICE USING SECONDARY IDENTIFICATION INDICIA

(75) Inventors: Fred Bishop, Glendale, AZ (US); Peter D. Saunders, Salt Lake City, UT (US)

(73) Assignee: American Express Travel Related Services Company, Inc., New York, NY (US)

( * ) Notice: Subject to any disclaimer, the term of this patent is extended or adjusted under 35 U.S.C. 154(b) by 982 days.

(21) Appl. No.: 10/711,720

(22) Filed: Sep. 30, 2004

(65) Prior Publication Data

US 2005/0171898 A1     Aug. 4, 2005

Related U.S. Application Data

(63) Continuation-in-part of application No. 10/708,545, filed on Mar. 10, 2004, and a continuation-in-part of application No. 10/708,547, filed on Mar. 10, 2004, which is a continuation-in-part of application No. 10/340,352, filed on Jan. 10, 2003, and a continuation-in-part of application No. 10/192,488, filed on Jul. 9, 2002, now Pat. No. 7,239,226.

(60) Provisional application No. 60/507,803, filed on Sep. 30, 2003, provisional application No. 60/396,577, filed on Jul. 16, 2002, provisional application No. 60/304,216, filed on Jul. 10, 2001.

(51) Int. Cl.
*G06Q 99/00* (2006.01)
(52) U.S. Cl. ............................................... 705/64
(58) Field of Classification Search ............... 705/50–79
See application file for complete search history.

(56) References Cited

U.S. PATENT DOCUMENTS 4,303,904 A   12/1981   Chasek
(Continued)

FOREIGN PATENT DOCUMENTS

CH           689070           1/1998
(Continued)

OTHER PUBLICATIONS

"The Bank Credit Card Business", American Bankers Association, 1996, all pages.*
(Continued)

*Primary Examiner* — Andrew J. Fischer
*Assistant Examiner* — Jacob C. Coppola
(74) *Attorney, Agent, or Firm* — Snell & Wilmer L.L.P.

(57) ABSTRACT

Systems and methods are configured to manage data sets associated with a transaction device. For example, a method is provided for facilitating the management of distinct data sets on a transaction device that are provided by distinct data set owners, wherein the distinct data sets may include differing formats. The method includes the steps of: adding, by a read/write, a first data set to the financial transaction device, wherein the first data set is owned by a first owner; adding, by the read/write device, a second data set to the financial transaction device, wherein the second data set is owned by a second owner; and storing the first data set and the second data set on the financial transaction device in accordance with an owner defined format. The first and second data sets are associated with first and second owners, respectively, and are configured to be stored independent of each other The transaction device user may be permitted to select at least one of the multiple data sets for transaction completion using a secondary identifier indicia. Where the user selects multiple accounts for transaction completion, the user may be permitted to allocate portions of a transaction to the selected transaction accounts. The transaction request may be processed in accordance with the user's allocations.

13 Claims, 15 Drawing Sheets

U.S. PATENT DOCUMENTS

| | | |
|---|---|---|
| 4,443,027 A | 4/1984 | McNeely et al. |
| 4,450,535 A | 5/1984 | de Pommery et al. |
| 4,475,308 A | 10/1984 | Heise et al. |
| 4,583,766 A | 4/1986 | Wessel |
| 4,639,765 A | 1/1987 | dHont |
| 4,672,021 A | 6/1987 | Blumel et al. |
| 4,700,055 A | 10/1987 | Kashkashian, Jr. |
| 4,736,094 A | 4/1988 | Yoshida |
| 4,739,328 A | 4/1988 | Koelle et al. |
| 4,837,422 A | 6/1989 | Dethloff et al. |
| 4,839,504 A | 6/1989 | Nakano |
| 4,868,849 A | 9/1989 | Tamaoki |
| 4,961,142 A | 10/1990 | Elliott et al. |
| 5,016,274 A | 5/1991 | Micali et al. |
| 5,023,782 A | 6/1991 | Lutz et al. |
| 5,023,908 A | 6/1991 | Weiss |
| 5,025,372 A | 6/1991 | Burton et al. |
| 5,053,774 A | 10/1991 | Schuermann et al. |
| 5,099,226 A | 3/1992 | Andrews |
| 5,101,200 A | 3/1992 | Swett |
| 5,197,140 A | 3/1993 | Balmer |
| 5,202,826 A | 4/1993 | McCarthy |
| 5,212,777 A | 5/1993 | Gove et al. |
| 5,221,838 A | 6/1993 | Gutman et al. |
| 5,222,282 A | 6/1993 | Sukonnik et al. |
| 5,226,989 A | 7/1993 | Sukonnik |
| 5,239,654 A | 8/1993 | IngSimmons et al. |
| 5,247,304 A | 9/1993 | dHont |
| 5,274,392 A | 12/1993 | dHont et al. |
| 5,276,311 A | 1/1994 | Hennige |
| 5,285,100 A | 2/1994 | Byatt |
| 5,305,002 A | 4/1994 | Holodak et al. |
| 5,326,964 A | 7/1994 | Risser |
| 5,329,617 A | 7/1994 | Asal |
| 5,331,138 A | 7/1994 | Saroya |
| 5,339,447 A | 8/1994 | Balmer |
| 5,349,357 A | 9/1994 | Schurmann et al. |
| 5,351,052 A | 9/1994 | dHont et al. |
| 5,365,551 A | 11/1994 | Snodgrass et al. |
| 5,371,896 A | 12/1994 | Gove et al. |
| 5,373,303 A | 12/1994 | dHont |
| 5,397,881 A | 3/1995 | Mannik |
| 5,407,893 A | 4/1995 | Koshizuka et al. |
| 5,408,243 A | 4/1995 | dHont |
| 5,410,649 A | 4/1995 | Gove |
| 5,428,363 A | 6/1995 | dHont |
| 5,453,747 A | 9/1995 | dHont et al. |
| 5,461,217 A | 10/1995 | Claus |
| 5,471,592 A | 11/1995 | Gove et al. |
| 5,485,510 A | 1/1996 | Colbert |
| 5,488,376 A | 1/1996 | Hurta et al. |
| 5,489,411 A | 2/1996 | Jha et al. |
| 5,489,908 A | 2/1996 | Orthmann et al. |
| 5,490,079 A | 2/1996 | Sharpe et al. |
| 5,491,483 A | 2/1996 | dHont |
| 5,491,484 A | 2/1996 | Schuermann |
| 5,491,715 A | 2/1996 | Flaxl |
| 5,493,312 A | 2/1996 | Knebelkamp |
| 5,497,121 A | 3/1996 | dHont |
| 5,500,513 A | 3/1996 | Langhans et al. |
| 5,500,651 A | 3/1996 | Schuermann |
| 5,504,808 A | 4/1996 | Hamrick, Jr. |
| 5,513,525 A | 5/1996 | Schurmann |
| 5,519,381 A | 5/1996 | Marsh et al. |
| 5,522,083 A | 5/1996 | Gove et al. |
| 5,525,992 A | 6/1996 | Froschermeier |
| 5,525,994 A | 6/1996 | Hurta et al. |
| 5,530,232 A | 6/1996 | Taylor |
| 5,537,314 A | 7/1996 | Kanter |
| 5,541,604 A | 7/1996 | Meier |
| 5,543,798 A | 8/1996 | Schuermann |
| 5,544,246 A * | 8/1996 | Mandelbaum et al. ......... 705/65 |
| 5,548,291 A | 8/1996 | Meier et al. |
| 5,550,536 A | 8/1996 | Flaxl |
| 5,550,548 A | 8/1996 | Schuermann |
| 5,552,789 A | 9/1996 | Schuermann |
| 5,557,279 A | 9/1996 | dHont |
| 5,557,516 A | 9/1996 | Hogan |
| 5,561,430 A | 10/1996 | Knebelkamp |
| 5,563,582 A | 10/1996 | dHont |
| 5,569,187 A | 10/1996 | Kaiser |
| 5,572,226 A | 11/1996 | Tuttle |
| 5,577,109 A | 11/1996 | Stimson et al. |
| 5,577,120 A | 11/1996 | Penzias |
| 5,578,808 A * | 11/1996 | Taylor ............................. 705/41 |
| 5,581,630 A | 12/1996 | Bonneau, Jr. |
| 5,585,787 A | 12/1996 | Wallerstein |
| 5,590,038 A * | 12/1996 | Pitroda ........................... 705/41 |
| 5,592,150 A | 1/1997 | dHont |
| 5,592,405 A | 1/1997 | Gove et al. |
| 5,594,227 A | 1/1997 | Deo |
| 5,594,233 A | 1/1997 | Kenneth et al. |
| 5,594,448 A | 1/1997 | dHont |
| 5,597,534 A | 1/1997 | Kaiser |
| 5,600,175 A | 2/1997 | Orthmann |
| 5,602,538 A | 2/1997 | Orthmann et al. |
| 5,602,919 A | 2/1997 | Hurta et al. |
| 5,604,342 A | 2/1997 | Fujioka |
| 5,606,520 A | 2/1997 | Gove et al. |
| 5,606,594 A | 2/1997 | Register et al. |
| 5,607,522 A | 3/1997 | McDonnell |
| 5,608,406 A | 3/1997 | Eberth et al. |
| 5,608,778 A | 3/1997 | Partridge, III |
| 5,613,146 A | 3/1997 | Gove et al. |
| 5,614,703 A | 3/1997 | Martin et al. |
| 5,619,207 A | 4/1997 | dHont |
| 5,621,396 A | 4/1997 | Flaxl |
| 5,621,411 A | 4/1997 | Hagl et al. |
| 5,621,412 A | 4/1997 | Sharpe et al. |
| 5,625,366 A | 4/1997 | dHont |
| 5,625,370 A | 4/1997 | dHont |
| 5,625,695 A | 4/1997 | MRaihi et al. |
| 5,629,981 A | 5/1997 | Nerlikar |
| 5,638,080 A | 6/1997 | Orthmann et al. |
| 5,640,002 A | 6/1997 | Ruppert et al. |
| 5,641,050 A | 6/1997 | Smith et al. |
| 5,646,607 A | 7/1997 | Schurmann et al. |
| 5,649,118 A | 7/1997 | Carlisle |
| 5,657,388 A | 8/1997 | Weiss |
| 5,660,319 A | 8/1997 | Falcone et al. |
| 5,673,106 A | 9/1997 | Thompson |
| 5,675,342 A | 10/1997 | Sharpe |
| 5,686,920 A | 11/1997 | Hurta et al. |
| 5,689,100 A | 11/1997 | Carrithers |
| 5,691,731 A | 11/1997 | vanErven |
| 5,692,132 A | 11/1997 | Hogan |
| 5,696,913 A | 12/1997 | Gove et al. |
| 5,698,837 A | 12/1997 | Furuta |
| 5,699,528 A | 12/1997 | Hogan |
| 5,701,127 A | 12/1997 | Sharpe |
| 5,704,046 A | 12/1997 | Hogan |
| 5,705,798 A | 1/1998 | Tarbox |
| 5,715,399 A | 2/1998 | Bezos |
| 5,721,781 A * | 2/1998 | Deo et al. ......................... 705/67 |
| 5,724,424 A | 3/1998 | Gifford |
| 5,729,053 A | 3/1998 | Orthmann |
| 5,729,236 A | 3/1998 | Flaxl |
| 5,731,957 A | 3/1998 | Brennan |
| 5,732,579 A | 3/1998 | dHont et al. |
| 5,734,838 A | 3/1998 | Robinson et al. |
| 5,742,756 A | 4/1998 | Dillaway et al. |
| 5,742,845 A | 4/1998 | Wagner |
| 5,748,137 A | 5/1998 | dHont |
| 5,748,737 A | 5/1998 | Daggar |
| 5,758,195 A | 5/1998 | Balmer |
| 5,761,306 A | 6/1998 | Lewis |
| 5,761,493 A | 6/1998 | Blakeley et al. |
| 5,768,385 A | 6/1998 | Simon |
| 5,768,609 A | 6/1998 | Gove et al. |
| 5,770,843 A | 6/1998 | Rose |
| 5,774,882 A | 6/1998 | Keen et al. |
| 5,777,903 A | 7/1998 | Piosenka |
| 5,778,067 A | 7/1998 | Jones et al. |
| 5,778,069 A | 7/1998 | Thomlinson |
| 5,785,680 A | 7/1998 | Niezink et al. |
| 5,792,337 A | 8/1998 | Padovani et al. |
| 5,793,324 A | 8/1998 | Aslanidis et al. |

| | | | | | | |
|---|---|---|---|---|---|---|
| 5,794,095 A | 8/1998 | Thompson | 5,960,411 A | 9/1999 | Hartman et al. | |
| 5,797,060 A | 8/1998 | Thompson | 5,963,915 A | 10/1999 | Kirsch | |
| 5,797,085 A | 8/1998 | Beuk et al. | 5,963,924 A | 10/1999 | Williams et al. | |
| 5,797,133 A | 8/1998 | Jones et al. | 5,966,697 A | 10/1999 | Fergerson et al. | |
| 5,798,709 A | 8/1998 | Flaxl | 5,970,148 A | 10/1999 | Meier | |
| 5,809,142 A | 9/1998 | Hurta et al. | 5,970,471 A | 10/1999 | Hill | |
| 5,809,288 A | 9/1998 | Balmer | 5,970,472 A | 10/1999 | Allsop et al. | |
| 5,809,633 A | 9/1998 | Mundigl et al. | 5,970,473 A | 10/1999 | Gerszberg et al. | |
| 5,825,007 A | 10/1998 | Jesadanont | 5,970,475 A | 10/1999 | Barnes et al. | |
| 5,825,302 A | 10/1998 | Stafford | RE36,365 E | 11/1999 | Levine et al. | |
| 5,826,077 A | 10/1998 | Blakeley et al. | 5,978,840 A | 11/1999 | Nguyen et al. | |
| 5,826,241 A | 10/1998 | Stein | 5,979,757 A | 11/1999 | Tracy et al. | |
| 5,826,242 A | 10/1998 | Montulli | 5,982,293 A | 11/1999 | Everett et al. | |
| 5,826,243 A | 10/1998 | Musmanno et al. | 5,983,207 A | 11/1999 | Turk et al. | |
| 5,828,044 A | 10/1998 | Jun et al. | 5,983,208 A | 11/1999 | Haller | |
| 5,834,756 A | 11/1998 | Gutman et al. | 5,987,140 A | 11/1999 | Rowney et al. | |
| 5,835,894 A | 11/1998 | Adcock et al. | 5,987,155 A | 11/1999 | Dunn et al. | |
| 5,841,364 A | 11/1998 | Hagl et al. | 5,987,498 A | 11/1999 | Athing et al. | |
| 5,842,088 A | 11/1998 | Thompson | 5,989,950 A | 11/1999 | Wu | |
| 5,844,218 A | 12/1998 | Kawan et al. | 5,991,413 A | 11/1999 | Arditti et al. | |
| 5,844,230 A | 12/1998 | Lalonde | 5,991,608 A | 11/1999 | Leyten | |
| 5,845,267 A | 12/1998 | Ronen | 5,991,748 A | 11/1999 | Taskett | |
| 5,851,149 A | 12/1998 | Xidos et al. | 5,991,750 A | 11/1999 | Watson | |
| 5,852,812 A | 12/1998 | Reeder | 5,996,076 A | 11/1999 | Rowney et al. | |
| 5,854,891 A | 12/1998 | Postlewaite et al. | 5,999,914 A | 12/1999 | Blinn et al. | |
| 5,858,006 A | 1/1999 | Van der AA et al. | 6,000,608 A * | 12/1999 | Dorf | 235/380 |
| 5,859,419 A | 1/1999 | Wynn | 6,000,832 A | 12/1999 | Franklin et al. | |
| 5,859,779 A | 1/1999 | Giordano et al. | 6,002,438 A | 12/1999 | Hocevar et al. | |
| 5,862,325 A | 1/1999 | Reed et al. | 6,002,767 A | 12/1999 | Kramer | |
| 5,864,306 A | 1/1999 | Dwyer et al. | 6,003,014 A | 12/1999 | Lee et al. | |
| 5,864,323 A | 1/1999 | Berthon | 6,005,942 A | 12/1999 | Chan et al. | |
| 5,864,830 A | 1/1999 | Armetta et al. | 6,006,216 A | 12/1999 | Griffin et al. | |
| 5,867,100 A | 2/1999 | dHont | 6,009,412 A | 12/1999 | Storey | |
| 5,870,031 A | 2/1999 | Kaiser et al. | 6,011,487 A | 1/2000 | Plocher | |
| 5,870,915 A | 2/1999 | dHont | 6,012,039 A | 1/2000 | Hoffman et al. | |
| 5,878,138 A | 3/1999 | Yacobi | 6,012,049 A | 1/2000 | Kawan | |
| 5,878,141 A | 3/1999 | Daly et al. | 6,012,143 A | 1/2000 | Tanaka | |
| 5,878,215 A | 3/1999 | Kling et al. | 6,012,636 A | 1/2000 | Smith | |
| 5,878,337 A | 3/1999 | Joao et al. | 6,014,634 A | 1/2000 | Scroggie et al. | |
| 5,878,403 A | 3/1999 | DeFrancesco et al. | 6,014,635 A | 1/2000 | Harris et al. | |
| 5,880,675 A | 3/1999 | Trautner | 6,014,636 A | 1/2000 | Reeder | |
| 5,881,272 A | 3/1999 | Balmer | 6,014,645 A | 1/2000 | Cunningham | |
| 5,883,810 A | 3/1999 | Franklin et al. | 6,014,646 A | 1/2000 | Vallee et al. | |
| 5,884,280 A | 3/1999 | Yoshioka et al. | 6,014,648 A | 1/2000 | Brennan | |
| 5,887,266 A | 3/1999 | Heinonen et al. | 6,014,650 A | 1/2000 | Zampese | |
| 5,890,137 A | 3/1999 | Koreeda | 6,014,748 A | 1/2000 | Tushie et al. | |
| 5,897,622 A | 4/1999 | Blinn et al. | 6,016,482 A | 1/2000 | Molinari et al. | |
| 5,898,783 A | 4/1999 | Rohrbach | 6,016,484 A | 1/2000 | Williams et al. | |
| 5,898,838 A | 4/1999 | Wagner | 6,018,717 A | 1/2000 | Lee et al. | |
| 5,903,830 A | 5/1999 | Joao et al. | 6,018,718 A | 1/2000 | Walker et al. | |
| 5,903,875 A | 5/1999 | Kohara | 6,021,943 A | 2/2000 | Chastain | |
| 5,903,880 A | 5/1999 | Biffar | 6,023,510 A | 2/2000 | Epstein | |
| 5,905,798 A | 5/1999 | Nerlikar et al. | 6,024,286 A | 2/2000 | Bradley et al. | |
| 5,905,908 A | 5/1999 | Wagner | 6,029,147 A | 2/2000 | Horadan et al. | |
| 5,909,492 A | 6/1999 | Payne et al. | 6,029,149 A | 2/2000 | Dykstra et al. | |
| 5,912,678 A | 6/1999 | Saxena et al. | 6,029,150 A | 2/2000 | Kravitz | |
| 5,913,203 A | 6/1999 | Wong et al. | 6,029,890 A | 2/2000 | Austin | |
| 5,914,472 A | 6/1999 | Foladare et al. | 6,029,892 A | 2/2000 | Miyake | |
| 5,915,023 A | 6/1999 | Bernstein | 6,032,136 A | 2/2000 | Brake et al. | |
| 5,917,168 A | 6/1999 | Nakamura et al. | 6,038,292 A | 3/2000 | Thomas | |
| 5,918,216 A | 6/1999 | Miksovsky et al. | 6,038,551 A | 3/2000 | Barlow et al. | |
| 5,920,628 A | 7/1999 | Indeck et al. | 6,038,584 A | 3/2000 | Balmer | |
| 5,923,734 A | 7/1999 | Taskett | 6,041,308 A | 3/2000 | Walker et al. | |
| 5,929,801 A | 7/1999 | Aslanidis et al. | 6,044,360 A | 3/2000 | Picciallo | |
| 5,930,767 A | 7/1999 | Reber et al. | 6,047,888 A | 4/2000 | Dethloff | |
| 5,930,777 A | 7/1999 | Barber | 6,052,675 A | 4/2000 | Checchio | |
| 5,931,917 A | 8/1999 | Nguyen et al. | 6,058,418 A | 5/2000 | Kobata | |
| 5,933,624 A | 8/1999 | Balmer | 6,061,344 A | 5/2000 | Wood, Jr. | |
| 5,943,624 A | 8/1999 | Fox et al. | 6,061,789 A | 5/2000 | Hauser et al. | |
| 5,948,116 A | 9/1999 | Aslanidis et al. | 6,064,320 A | 5/2000 | dHont et al. | |
| 5,949,044 A | 9/1999 | Walker et al. | 6,064,981 A | 5/2000 | Barni et al. | |
| 5,949,876 A | 9/1999 | Ginter et al. | 6,070,003 A | 5/2000 | Gove et al. | |
| 5,953,512 A | 9/1999 | Cai et al. | 6,070,150 A | 5/2000 | Remington et al. | |
| 5,953,710 A | 9/1999 | Fleming | 6,070,154 A | 5/2000 | Tavor et al. | |
| 5,955,717 A | 9/1999 | Vanstone | 6,072,870 A | 6/2000 | Nguyen et al. | |
| 5,955,969 A | 9/1999 | dHont | 6,073,840 A | 6/2000 | Marion | |
| 5,956,024 A | 9/1999 | Strickland et al. | 6,076,078 A | 6/2000 | Camp et al. | |
| 5,956,699 A | 9/1999 | Wong et al. | 6,078,888 A | 6/2000 | Johnson, Jr. | |
| 5,958,004 A | 9/1999 | Helland et al. | 6,078,906 A | 6/2000 | Huberman | |

| Patent No. | Date | Name |
|---|---|---|
| 6,078,908 A | 6/2000 | Schmitz |
| 6,081,790 A | 6/2000 | Rosen |
| RE36,788 E | 7/2000 | Mansvelt et al. |
| 6,088,683 A | 7/2000 | Jalili |
| 6,088,686 A | 7/2000 | Walker et al. |
| 6,088,717 A | 7/2000 | Reed et al. |
| 6,088,797 A | 7/2000 | Rosen |
| 6,092,057 A | 7/2000 | Zimmerman et al. |
| 6,092,198 A | 7/2000 | Lanzy et al. |
| 6,098,053 A | 8/2000 | Slater |
| 6,098,879 A | 8/2000 | Terranova |
| 6,101,174 A | 8/2000 | Langston |
| 6,102,162 A | 8/2000 | Teicher |
| 6,102,672 A | 8/2000 | Woollenweber |
| 6,105,008 A | 8/2000 | Davis et al. |
| 6,105,013 A | 8/2000 | Curry et al. |
| 6,105,865 A | 8/2000 | Hardesty |
| 6,108,641 A | 8/2000 | Kenna et al. |
| 6,109,525 A | 8/2000 | Blomqvist et al. |
| 6,112,152 A | 8/2000 | Tuttle |
| 6,112,191 A | 8/2000 | Burke |
| 6,112,987 A * | 9/2000 | Lambert et al. ............... 235/380 |
| 6,115,360 A | 9/2000 | Quay et al. |
| 6,115,458 A | 9/2000 | Taskett |
| 6,116,423 A | 9/2000 | Troxtell, Jr. et al. |
| 6,116,505 A | 9/2000 | Withrow |
| 6,118,189 A | 9/2000 | Flaxl |
| 6,121,544 A | 9/2000 | Petsinger |
| 6,122,625 A | 9/2000 | Rosen |
| 6,123,223 A | 9/2000 | Watkins |
| 6,125,352 A | 9/2000 | Franklin et al. |
| 6,129,274 A | 10/2000 | Suzuki |
| 6,133,834 A | 10/2000 | Eberth et al. |
| 6,141,651 A | 10/2000 | Riley et al. |
| 6,141,752 A | 10/2000 | Dancs et al. |
| 6,163,771 A | 12/2000 | Walker et al. |
| 6,167,236 A | 12/2000 | Kaiser et al. |
| 6,173,269 B1 | 1/2001 | Sokol et al. |
| 6,173,272 B1 | 1/2001 | Thomas et al. |
| 6,177,860 B1 | 1/2001 | Cromer et al. |
| 6,179,205 B1 | 1/2001 | Sloan |
| 6,179,206 B1 | 1/2001 | Matsumori |
| 6,188,994 B1 | 2/2001 | Egendort |
| 6,189,787 B1 | 2/2001 | Dorf |
| 6,192,255 B1 | 2/2001 | Lewis et al. |
| 6,198,728 B1 | 3/2001 | Hulyalkar et al. |
| 6,198,875 B1 | 3/2001 | Edenson et al. |
| 6,202,927 B1 | 3/2001 | Bashan et al. |
| 6,205,151 B1 | 3/2001 | Quay et al. |
| 6,206,293 B1 | 3/2001 | Gutman et al. |
| 6,213,390 B1 | 4/2001 | Oneda |
| 6,215,437 B1 | 4/2001 | Schurmann et al. |
| 6,216,219 B1 | 4/2001 | Cai et al. |
| 6,219,439 B1 | 4/2001 | Burger |
| 6,220,510 B1 | 4/2001 | Everett et al. |
| 6,222,914 B1 | 4/2001 | McMullin |
| D442,627 S | 5/2001 | Webb et al. |
| D442,629 S | 5/2001 | Webb et al. |
| 6,223,984 B1 | 5/2001 | Renner et al. |
| 6,226,382 B1 | 5/2001 | MRaihi et al. |
| 6,227,447 B1 | 5/2001 | Campisano |
| 6,230,270 B1 | 5/2001 | Laczko, Sr. |
| 6,232,917 B1 | 5/2001 | Baumer et al. |
| 6,233,683 B1 | 5/2001 | Chan et al. |
| 6,237,848 B1 | 5/2001 | Everett |
| 6,239,675 B1 | 5/2001 | Flaxl |
| 6,240,187 B1 | 5/2001 | Lewis |
| 6,248,199 B1 | 6/2001 | Smulson |
| 6,257,486 B1 | 7/2001 | Teicher et al. |
| 6,259,769 B1 | 7/2001 | Page |
| 6,260,026 B1 | 7/2001 | Tomida et al. |
| 6,260,088 B1 | 7/2001 | Gove et al. |
| 6,263,316 B1 | 7/2001 | Khan et al. |
| 6,264,106 B1 | 7/2001 | Bridgelall |
| 6,266,754 B1 | 7/2001 | Laczko, Sr. et al. |
| 6,267,292 B1 | 7/2001 | Walker et al. |
| 6,269,348 B1 | 7/2001 | Pare, Jr. et al. |
| 6,273,335 B1 | 8/2001 | Sloan |
| 6,282,522 B1 | 8/2001 | Davis et al. |
| D447,515 S | 9/2001 | Faenza, Jr. et al. |
| 6,286,763 B1 | 9/2001 | Reynolds et al. |
| 6,289,324 B1 | 9/2001 | Kawan |
| 6,293,462 B1 | 9/2001 | Gangi |
| 6,315,193 B1 | 11/2001 | Hogan |
| 6,315,195 B1 | 11/2001 | Ramachandran |
| 6,317,721 B1 | 11/2001 | Hurta et al. |
| 6,318,636 B1 | 11/2001 | Reynolds et al. |
| 6,323,566 B1 | 11/2001 | Meier |
| 6,325,285 B1 | 12/2001 | Baratelli |
| 6,325,293 B1 | 12/2001 | Moreno |
| 6,326,934 B1 | 12/2001 | Kinzie |
| 6,327,573 B1 | 12/2001 | Walker et al. |
| 6,330,544 B1 | 12/2001 | Walker et al. |
| 6,336,095 B1 | 1/2002 | Rosen |
| 6,342,844 B1 | 1/2002 | Rozin |
| 6,353,811 B1 | 3/2002 | Weissman |
| 6,364,208 B1 | 4/2002 | Stanford et al. |
| 6,367,011 B1 | 4/2002 | Lee et al. |
| 6,374,245 B1 | 4/2002 | Park |
| 6,377,034 B1 | 4/2002 | Ivanov |
| 6,378,073 B1 | 4/2002 | Davis et al. |
| 6,388,533 B2 | 5/2002 | Swoboda |
| 6,390,375 B2 | 5/2002 | Kayanakis |
| 6,400,272 B1 | 6/2002 | Holtzman et al. |
| 6,402,026 B1 | 6/2002 | Schwier |
| 6,402,028 B1 | 6/2002 | Graham, Jr. et al. |
| 6,411,611 B1 | 6/2002 | Van der Tuijn |
| 6,415,978 B1 | 7/2002 | McAllister |
| 6,422,464 B1 | 7/2002 | Terranova |
| 6,424,029 B1 | 7/2002 | Giesler |
| RE37,822 E | 8/2002 | Anthonyson |
| 6,427,910 B1 | 8/2002 | Barnes et al. |
| 6,438,235 B2 | 8/2002 | Sims, III |
| 6,439,455 B1 | 8/2002 | Everett et al. |
| 6,442,532 B1 | 8/2002 | Kawan |
| 6,445,794 B1 | 9/2002 | Shefi |
| 6,457,996 B1 | 10/2002 | Shih |
| 6,466,804 B1 | 10/2002 | Pecen et al. |
| 6,473,500 B1 | 10/2002 | Risafi et al. |
| 6,480,100 B1 * | 11/2002 | Frieden et al. ............... 340/10.1 |
| 6,480,101 B1 | 11/2002 | Kelly et al. |
| 6,481,621 B1 | 11/2002 | Herrendoerfer et al. |
| 6,481,632 B2 * | 11/2002 | Wentker et al. ............... 235/492 |
| 6,483,427 B1 | 11/2002 | Werb |
| 6,483,477 B1 | 11/2002 | Plonka |
| 6,483,929 B1 | 11/2002 | Murakami et al. |
| 6,484,937 B1 | 11/2002 | Devaux et al. |
| 6,490,443 B1 | 12/2002 | Freeny, Jr. |
| 6,491,229 B1 | 12/2002 | Berney |
| 6,494,380 B2 | 12/2002 | Jarosz |
| 6,507,762 B1 | 1/2003 | Amro et al. |
| 6,510,983 B2 | 1/2003 | Horowitz et al. |
| 6,510,998 B1 | 1/2003 | Stanford et al. |
| 6,513,015 B2 | 1/2003 | Ogasawara |
| 6,519,565 B1 | 2/2003 | Clements et al. |
| 6,520,542 B2 | 2/2003 | Thompson et al. |
| 6,529,880 B1 | 3/2003 | McKeen et al. |
| 6,535,726 B1 | 3/2003 | Johnson |
| 6,546,373 B1 | 4/2003 | Cerra |
| 6,547,133 B1 | 4/2003 | DeVries, Jr. et al. |
| 6,549,912 B1 | 4/2003 | Chen |
| 6,560,581 B1 | 5/2003 | Fox et al. |
| 6,577,229 B1 | 6/2003 | Bonneau et al. |
| 6,578,768 B1 | 6/2003 | Binder et al. |
| 6,581,839 B1 | 6/2003 | Lasch et al. |
| 6,587,835 B1 | 7/2003 | Treyz et al. |
| 6,588,660 B1 | 7/2003 | Buescher et al. |
| 6,589,119 B1 | 7/2003 | Orus et al. |
| 6,598,024 B1 | 7/2003 | Walker et al. |
| 6,608,995 B1 | 8/2003 | Kawasaki et al. |
| 6,609,655 B1 | 8/2003 | Harrell |
| 6,623,039 B2 | 9/2003 | Thompson et al. |
| 6,626,356 B2 | 9/2003 | Davenport et al. |
| 6,628,961 B1 | 9/2003 | Ho et al. |
| 6,636,833 B1 | 10/2003 | Flitcroft et al. |
| 6,650,887 B2 | 11/2003 | McGregor et al. |
| 6,651,168 B1 * | 11/2003 | Kao et al. ............... 713/185 |
| 6,662,166 B2 | 12/2003 | Pare, Jr. et al. |

| | | | |
|---|---|---|---|
| 6,665,405 B1 | 12/2003 | Lenstra | |
| 6,669,086 B2 | 12/2003 | Abdi et al. | |
| 6,671,358 B1 | 12/2003 | Seidman et al. | |
| 6,674,786 B1 | 1/2004 | Nakamura et al. | |
| 6,679,427 B1 | 1/2004 | Kuroiwa | |
| 6,681,328 B1 | 1/2004 | Harris et al. | |
| 6,684,269 B2 | 1/2004 | Wagner | |
| 6,685,088 B1* | 2/2004 | Royer et al. | 235/380 |
| 6,687,714 B1 | 2/2004 | Kogen et al. | |
| 6,690,930 B1 | 2/2004 | Dupre | |
| 6,693,513 B2 | 2/2004 | Tuttle | |
| 6,705,530 B2 | 3/2004 | Kiekhaefer | |
| 6,711,262 B1 | 3/2004 | Watanen | |
| 6,732,936 B1 | 5/2004 | Kiekhaefer | |
| 6,742,120 B1 | 5/2004 | Markakis et al. | |
| 6,747,546 B1 | 6/2004 | Hikita et al. | |
| 6,760,581 B2 | 7/2004 | Dutta | |
| 6,769,718 B1 | 8/2004 | Warther et al. | |
| 6,771,981 B1 | 8/2004 | Zalewski et al. | |
| 6,789,012 B1 | 9/2004 | Childs et al. | |
| 6,834,270 B1 | 12/2004 | Pagani et al. | |
| 6,851,617 B2 | 2/2005 | Saint et al. | |
| 6,853,087 B2 | 2/2005 | Neuhaus et al. | |
| 6,853,894 B1 | 2/2005 | Kolls | |
| 6,853,987 B1 | 2/2005 | Cook | |
| 6,857,566 B2 | 2/2005 | Wankmueller | |
| 6,859,672 B2 | 2/2005 | Roberts et al. | |
| 6,880,037 B2* | 4/2005 | Boyer | 711/103 |
| 6,895,310 B1 | 5/2005 | Kolls | |
| 6,994,262 B1 | 2/2006 | Warther | |
| 7,003,501 B2 | 2/2006 | Ostroff | |
| 7,032,067 B2* | 4/2006 | Massard | 711/113 |
| 7,069,444 B2 | 6/2006 | Lowensohn et al. | |
| 7,096,204 B1 | 8/2006 | Chen et al. | |
| 7,100,821 B2 | 9/2006 | Rasti | |
| 7,103,575 B1 | 9/2006 | Linehan | |
| 7,136,835 B1 | 11/2006 | Flitcroft et al. | |
| 7,181,017 B1* | 2/2007 | Nagel et al. | 380/282 |
| 7,195,154 B2* | 3/2007 | Routhenstein | 235/380 |
| 7,213,748 B2 | 5/2007 | Tsuei et al. | |
| 7,287,011 B1* | 10/2007 | Wood et al. | 705/65 |
| 2001/0013542 A1 | 8/2001 | Horowitz et al. | |
| 2001/0024157 A1 | 9/2001 | Hansmann et al. | |
| 2001/0034565 A1 | 10/2001 | Leatherman | |
| 2001/0034720 A1 | 10/2001 | Armes | |
| 2001/0039617 A1 | 11/2001 | Buhrlen et al. | |
| 2001/0049628 A1* | 12/2001 | Icho | |
| 2002/0011519 A1 | 1/2002 | Shults | |
| 2002/0026419 A1* | 2/2002 | Maritzen et al. | 705/41 |
| 2002/0026575 A1* | 2/2002 | Wheeler et al. | 713/156 |
| 2002/0028704 A1 | 3/2002 | Bloomfield et al. | |
| 2002/0029254 A1* | 3/2002 | Davis et al. | 709/217 |
| 2002/0035548 A1 | 3/2002 | Hogan et al. | |
| 2002/0040438 A1* | 4/2002 | Fisher, Jr. | 713/200 |
| 2002/0046341 A1* | 4/2002 | Kazaks et al. | |
| 2002/0052839 A1 | 5/2002 | Takatori | |
| 2002/0062249 A1* | 5/2002 | Iannacci | 705/14 |
| 2002/0062284 A1 | 5/2002 | Kawan | |
| 2002/0074398 A1 | 6/2002 | Lancos et al. | |
| 2002/0077837 A1 | 6/2002 | Krueger et al. | |
| 2002/0077895 A1 | 6/2002 | Howell | |
| 2002/0077992 A1 | 6/2002 | Tobin | |
| 2002/0079367 A1 | 6/2002 | Montani | |
| 2002/0092914 A1 | 7/2002 | Pentz et al. | |
| 2002/0095298 A1* | 7/2002 | Ewing | |
| 2002/0095343 A1 | 7/2002 | Barton et al. | |
| 2002/0095389 A1 | 7/2002 | Gaines | |
| 2002/0095587 A1 | 7/2002 | Doyle et al. | |
| 2002/0097144 A1 | 7/2002 | Collins et al. | |
| 2002/0107007 A1 | 8/2002 | Gerson | |
| 2002/0107742 A1 | 8/2002 | Magill | |
| 2002/0109580 A1 | 8/2002 | Shreve et al. | |
| 2002/0111210 A1 | 8/2002 | Luciano, Jr. et al. | |
| 2002/0111917 A1 | 8/2002 | Hoffman et al. | |
| 2002/0113082 A1 | 8/2002 | Leatherman et al. | |
| 2002/0116274 A1 | 8/2002 | Hind et al. | |
| 2002/0117542 A1* | 8/2002 | Hamann et al. | 235/380 |
| 2002/0120584 A1 | 8/2002 | Hogan et al. | |
| 2002/0126010 A1 | 9/2002 | Trimble et al. | |
| 2002/0131567 A1 | 9/2002 | Maginas | |
| 2002/0138438 A1 | 9/2002 | Bardwell | |
| 2002/0140542 A1 | 10/2002 | Prokoski et al. | |
| 2002/0140714 A1* | 10/2002 | Hoffman | 345/700 |
| 2002/0145043 A1 | 10/2002 | Challa et al. | |
| 2002/0147913 A1 | 10/2002 | Lun Yip | |
| 2002/0148892 A1 | 10/2002 | Bardwell | |
| 2002/0152123 A1 | 10/2002 | Giordano et al. | |
| 2002/0154795 A1 | 10/2002 | Lee et al. | |
| 2002/0166891 A1 | 11/2002 | Stoutenburg et al. | |
| 2002/0174067 A1 | 11/2002 | Hoffman et al. | |
| 2002/0176522 A1 | 11/2002 | Fan | |
| 2002/0178063 A1 | 11/2002 | Gravelle et al. | |
| 2002/0178369 A1 | 11/2002 | Black | |
| 2002/0185543 A1 | 12/2002 | Pentz et al. | |
| 2002/0188501 A1 | 12/2002 | Lefkowith | |
| 2002/0190125 A1 | 12/2002 | Stockhammer | |
| 2002/0194303 A1 | 12/2002 | Suila et al. | |
| 2002/0194503 A1 | 12/2002 | Faith et al. | |
| 2002/0196963 A1 | 12/2002 | Bardwell | |
| 2003/0009382 A1 | 1/2003 | DArbelott et al. | |
| 2003/0014307 A1 | 1/2003 | Heng | |
| 2003/0014357 A1 | 1/2003 | Chrisekos et al. | |
| 2003/0014891 A1 | 1/2003 | Nelms et al. | |
| 2003/0018532 A1 | 1/2003 | Dudek et al. | |
| 2003/0018567 A1* | 1/2003 | Flitcroft et al. | |
| 2003/0025600 A1 | 2/2003 | Blanchard | |
| 2003/0028481 A1* | 2/2003 | Flitcroft et al. | |
| 2003/0046228 A1 | 3/2003 | Berney | |
| 2003/0054836 A1 | 3/2003 | Michot | |
| 2003/0055727 A1* | 3/2003 | Walker et al. | |
| 2003/0057226 A1 | 3/2003 | Long | |
| 2003/0057278 A1 | 3/2003 | Wong | |
| 2003/0069828 A1 | 4/2003 | Blazey et al. | |
| 2003/0069846 A1 | 4/2003 | Marcon | |
| 2003/0112972 A1 | 6/2003 | Hattick et al. | |
| 2003/0120554 A1 | 6/2003 | Hogan et al. | |
| 2003/0121969 A1 | 7/2003 | Wankmueller | |
| 2003/0130820 A1* | 7/2003 | Lane, III | |
| 2003/0132284 A1 | 7/2003 | Reynolds et al. | |
| 2003/0140228 A1 | 7/2003 | Binder | |
| 2003/0149662 A1* | 8/2003 | Shore | 705/39 |
| 2003/0163699 A1 | 8/2003 | Pailles et al. | |
| 2003/0167207 A1 | 9/2003 | Berardi et al. | |
| 2003/0177347 A1 | 9/2003 | Schneier et al. | |
| 2003/0183689 A1 | 10/2003 | Swift et al. | |
| 2003/0183699 A1 | 10/2003 | Masui | |
| 2003/0187786 A1 | 10/2003 | Swift et al. | |
| 2003/0187787 A1 | 10/2003 | Freund | |
| 2003/0187790 A1 | 10/2003 | Swift et al. | |
| 2003/0187796 A1 | 10/2003 | Swift et al. | |
| 2003/0195037 A1* | 10/2003 | Vuong et al. | |
| 2003/0195842 A1 | 10/2003 | Reece | |
| 2003/0195843 A1 | 10/2003 | Matsuda et al. | |
| 2003/0200184 A1 | 10/2003 | Dominguez et al. | |
| 2003/0208438 A1* | 11/2003 | Rothman | 705/38 |
| 2003/0218066 A1 | 11/2003 | Fernandes et al. | |
| 2003/0220876 A1 | 11/2003 | Burger et al. | |
| 2003/0222153 A1 | 12/2003 | Pentz et al. | |
| 2003/0225623 A1 | 12/2003 | Wankmueller | |
| 2003/0225713 A1 | 12/2003 | Atkinson et al. | |
| 2003/0227550 A1 | 12/2003 | Manico et al. | |
| 2003/0233334 A1 | 12/2003 | Smith | |
| 2004/0006539 A1* | 1/2004 | Royer et al. | |
| 2004/0010462 A1 | 1/2004 | Moon et al. | |
| 2004/0015451 A1 | 1/2004 | Sahota et al. | |
| 2004/0016796 A1 | 1/2004 | Hann et al. | |
| 2004/0020982 A1 | 2/2004 | Hoffman et al. | |
| 2004/0029569 A1 | 2/2004 | Khan et al. | |
| 2004/0030601 A1 | 2/2004 | Pond et al. | |
| 2004/0034734 A1* | 2/2004 | Boyer | 711/103 |
| 2004/0039814 A1 | 2/2004 | Crabtree et al. | |
| 2004/0039860 A1 | 2/2004 | Mills et al. | |
| 2004/0044627 A1* | 3/2004 | Russell et al. | 705/50 |
| 2004/0083184 A1* | 4/2004 | Tsuei et al. | |
| 2004/0139021 A1 | 7/2004 | Reed et al. | |
| 2005/0017068 A1 | 1/2005 | Zalewski et al. | |
| 2005/0038718 A1* | 2/2005 | Barnes et al. | |
| 2005/0040272 A1* | 2/2005 | Argumedo et al. | |

| | | | |
|---|---|---|---|
| 2005/0119978 A1* | 6/2005 | Ates | |
| 2005/0121512 A1* | 6/2005 | Wankmueller | |
| 2006/0020517 A1* | 1/2006 | Brooks et al. | 705/26 |

FOREIGN PATENT DOCUMENTS

| | | | |
|---|---|---|---|
| EP | 0 358 525 A2 | 3/1990 | |
| EP | 0 424 726 A1 | 10/1990 | |
| EP | 0 484 726 A1 * | 5/1992 | |
| EP | 0 933 717 A2 | 8/1999 | |
| EP | 0 956 818 A1 | 11/1999 | |
| EP | 0 959 440 A2 | 11/1999 | |
| EP | 0 984 404 A2 | 3/2000 | |
| EP | 1 016 947 A2 | 7/2000 | |
| EP | 1 039 403 A2 | 9/2000 | |
| EP | 1 104 909 A2 | 6/2001 | |
| EP | 1 113 387 A2 | 7/2001 | |
| EP | 1 115 095 A2 * | 7/2001 | |
| EP | 1 199 684 A2 | 4/2002 | |
| EP | 1 251 450 A1 | 10/2002 | |
| GB | 2347537 | 9/2000 | |
| GB | 2 361 790 A * | 10/2001 | |
| JP | 2000-1109 A | 1/2000 | |
| JP | 2000-015288 A | 1/2000 | |
| JP | 2000011109 A * | 1/2000 | |
| JP | 2000-40181 A | 2/2000 | |
| JP | 2000-67312 A | 3/2000 | |
| JP | 2000-207641 A | 7/2000 | |
| JP | 2001-5931 A | 1/2001 | |
| JP | 2001-283122 A | 10/2001 | |
| WO | WO 95/32919 | 12/1995 | |
| WO | 97/09688 A3 * | 3/1997 | |
| WO | WO 99/03057 A1 | 1/1999 | |
| WO | 99/49424 A1 * | 9/1999 | |
| WO | WO 00/10144 A1 | 2/2000 | |
| WO | WO 00/38088 A1 | 6/2000 | |
| WO | 00/49586 A1 * | 8/2000 | |
| WO | WO 01/04825 A1 | 1/2001 | |
| WO | WO 01/15098 A1 | 3/2001 | |
| WO | WO 01/43095 A2 | 6/2001 | |
| WO | WO 01/72224 A1 | 10/2001 | |
| WO | WO 01/77856 A1 | 10/2001 | |
| WO | WO 01/80473 A2 | 10/2001 | |
| WO | WO 01/86535 A1 | 11/2001 | |
| WO | WO 01/90962 A1 | 11/2001 | |
| WO | WO 01/95243 A2 | 12/2001 | |
| WO | WO 02/01485 A1 | 1/2002 | |
| WO | WO 02/13134 A2 | 2/2002 | |
| WO | WO 02/21903 A1 | 3/2002 | |
| WO | WO 02/063545 A2 | 8/2002 | |
| WO | WO 02/065246 A2 | 8/2002 | |
| WO | WO 02/065404 A2 | 8/2002 | |
| WO | WO 02/069221 A1 | 9/2002 | |
| WO | WO 02/073512 A1 | 9/2002 | |
| WO | WO 02/086665 A2 | 10/2002 | |
| WO | WO 02/091281 A2 | 11/2002 | |
| WO | WO 02/097575 A2 | 12/2002 | |
| WO | WO 02/101670 A2 | 12/2002 | |
| WO | 03/007623 A3 | 1/2003 | |

OTHER PUBLICATIONS

Muller, "Desktop Encyclopedia of the Internet", 1999, Artech House Inc., Norwood, MA, all pages.*
Gralla, "How the Internet Works", Millennium Edition, 1999, Que Corporation, Indianapolis, IN, all pages.*
White, "How Computers Work", Millennium Edition, 1999, Que Corporation, Indianapolis, IN, all pages.*
Derfler, "How Networks Work", Bestseller Edition, 1996, Ziff-Davis Press, Emeryville, CA, all pages.*
Rankl et al., "Smart Card Handbook," Second Edition, 2000, Wiley & Sons, all pages.*
"Physical Reality: A Second Look", Ken Sharp, Senior Technical Editor, http://www.idsystems.com/reader/1999_03/phys0399_pt2/phys0399_pt2.htm (6 pages).
"'Magic Wands' to Speed Mobile Sales", BobBrewin, Jan. 15, 2001, http://www.computerworld.com/mobiletopics/mobile/story/1,10801,563300.html (4 pages).
"Mobile Speedpass Goes Global as Mobil Singapore Rolls Out Asia's First RFID-Based Pay-At-The-Pump System", Press Release, Apr. 5, 1999, http://www.ti.com/tiris/docs/news_releases/rel12.htm (3 pages).
"Speedpass Unleashed", Jun. 4, 2002 http://www.cardweb.com/cardtrak/news/cf2_20a_97.html (2 pages).
Prophecy Central Update #9, Oct. 10, 1997, http://www.bible-prophecy.com/pcu9.htm (5 pages).
International Newsletter of the TI RFID Group, Issue 20, 2000 (12 pages).
"CES: Microsoft's SPOT Technology has Humble Origins", by James Niccolai, Jan. 10, 2003, http://archive.infoworld.com/articles/hn/xml/03/01/10/030110hnspot.xml?s=IDGNS (3 pages).
"Microsoft: See SPOT Run on Your Wrist", by Richard Shim, Jun. 5, 2003, http://news.com.com/2100-1041_3-1013442.html?tag=fd_top (1 page).
"Networking: Microsoft SPOT", by Jeremy A. Kaplan, Jul. 1, 2003, http://www.pcmag.com/print_article/0,3048,a=43561,00.asp (2 pages).
"Microsoft Launches Smart Personal Object Technology Initiative", Press Release from COMDEX Fall 2002, Nov. 17, 2002, http://www.Microsoft.com/presspass/features/2002/nov02/11-17SPOT.asp (4 pages).
"Bank Extends RFID Payment Pilot: Bank of America will continue to test its QuickWave RFID payment card for another three months", RFID Journal, Jan. 23, 2003.
"MasterCard to Test RFID Card: Pilot will test whether consumers, merchants and credit card issuers value "contactless" payments", RFID Journal, Dec. 20, 2002.
"Vendors Target Amusement Parks: Protecting children and enabling cashless payments make RFID an appealing option for the entertainment industry", RFID Journal, Nov. 27, 2002.
"Inside's Next-Gen Smart Card: The French company plans to introduce an RFID card that uses a 16-bit microprocessor and new encryption technology", RFID Journal, Oct. 29, 2002.
"Sony, Philips Creating RFID Link: Consumer electronics giants are jointly developing a new RFID standard for payments and for communication between devices", RFID Journal, Sep. 17, 2002.
"Japan Gets Digital Ticket System: A national ticket seller and phone company are teaming up to create an electronic ticket", RFID Journal, Aug. 31, 2002.
"Security for Wireless Java: NTRU, a startup that offers security software, has relased of Java version of its NTRU encryption algorithm", RFID Journal, Jun. 27, 2002.
"Making RFID Payments Ubiquitous: Philips and Visa want people to be able to pay for goods and services anywhere by using RFID chips embedded in the phones and other devices", RFID Journal, Jun. 2, 2003.
"RFID Smart Cards Gain Ground: The convenience of contactless transactions is driving widespread adoption of contactless smart cards", RFID Journal, Apr. 9, 2003.
"TI Embarces Prox Card Standard: Texas Instruments ISO 14443 payment platform promises faster data transfer rates and more security", RFID Journal, Mar. 6, 2003.
"Multiple Frequency Transponders: Volume production of dual-band RFID chips begins", Frontline Solutions, Jul. 16, 2003.
Functional Specification, Standard Card IC MFI IC S50, Philips Semiconductors, Product Specification Rev. 5.1 May 2001.
"Biometrics: Speaker Verification", by Kulkarni, et al., http://biometrics.cse.msu.edu/speaker.html, Mar. 8, 2004, 5 pages.
"Judge Dismisses FTC Suit Against Rambus", Evers, IDG New Service, http://www.infoworld.com/article/04/02/18/HNjudgedismisses_1.html, Feb. 18, 2004, 3 pages.
"Credit on Your Key Ring, Buy Gas at Mobil, Exxon and Soon Burgers at McDonald's", by Krakow, MSNBC, http://www.msnbc.msn.com/id/3072638, Feb. 17, 2004, 4 pages.
"The Evolution of Mobile Payment", by McPherson, Financial Insights, Feb. 2, 2004, http://www.banktech.com./story/mews/showArticle/jhtml?articleID=17601432, 2 pages.
"RFID Take Priority With Wal-Mart", by DocMemory, http://www.simmtester.com/page/news/shownews.asp?num=6550, Feb. 9, 2004, 2 pages.

"Microsoft, IBM and Phillips Test RFID Technology", by Rohde, IDG New Service, http:www.computerweekly.com/Article127889.htm, Feb. 9, 2004, 3 pages.

"Pay by Touch Press Releases", http://www.paybytouch.com/press.html, Feb. 10, 2004, 3 pages.

"PowerPay RFID Payment and Marketing Solution Speeds Purchases at Seahawks Stadium with Technology from Texas Instruments", http://www.powerpayit.com/news/Seahawks_pr.html, Feb. 9, 2004, 2 pages.

"Putting Their Finger on It", by Wilson, http://sanfrancisco.bizjournals.com/sanfrancisco/stories/2003/10/20/story6.html?t=printable, Feb. 9, 2004, 2 pages.

"TI Embraces Prox Card Standard", by Roberti, Mar. 6, 2003, http://www.ti.com/tiris/docs/in-the-news/2003/3-6-03.shtml, 2 pages.

"Paying It by Ear", The Guardian, Jan. 18, 2003, http://money.guardian.co.uk/creditanddebt/creditcards/story/0,1456,876908,00.html, 3 pages.

"International Biometric Group—Signature Biometrics: How It Works", http://www.ibgweb.com./reports/public/reports/signature-scan_tech.html, Feb. 18, 2004, 1 page.

"International Biometric Group—Voice Recognition Technology: How It Works", http://www.ibgweb.com/reports/public/reports/voice-scan_tech.html, Feb. 18, 2004, 1 page.

"Individual Biometrics—Hand Geometry", http://ctl.ncsc.dni.us/biomet%20web/BMHand.html, Feb. 18, 2004, 2 pages.

"Individual Biometrics—Retinal Scan", http:ctl.ncsc.dni.us/biomet%20web/BMRetinal.html, Feb. 18, 2004, 2 pages.

"Individual Biometrics—Iris Scan", http:ctl.ncsc.dni.us/biomet%20web/BMIris.html, Feb. 18, 2004, 2 pages.

"Individual Biometrics—Vascular Patterns", http:ctl.ncsc.dni.us/biomet%20web/BMVascular.html, Feb. 18, 2004, 1 page.

"Individual Biometrics—Fingerprint", http:ctl.ncsc.dni.us/biomet%20web/BMFingerprint.html, Feb. 18, 2004, 3 pages.

"Fingerprint Technology—Indentix Inc.—Empowering Identification™—Understanding Biometrics", http://www.identix.com/newsroom/news_biometrics_finger.html, Feb. 18, 2004, 1 page.

"Individual Biometrics—Facial Recognition", http:ctl.ncsc.dni.us/biomet%20web/BMfacial.html, Feb. 18, 2004, 2 pages.

"Fingerprint Analysis—The Basics", http://www.crimtrac.gov.au/fingerprintanalysis.htm, Feb. 18, 2004, 3 pages.

"Visual Speech and Speaker Recognition", by Luettin, Jun. 30, 2000, http://herens.idiap.ch/~luettin/luettin-thesis.bib.abs.html, 1 page.

"Automatic Ear Recognition by Force Field Transformations", by Hurley, et al., The Institution of Electrical Engineers, 2000, pp. 7/1-7/5.

"Everything You Need to Know About Biometrics", by Bowman, Identix Croproation, Jan. 2000, 8 pages.

"How Fingerprint Scanners Work", by Harris, http:computer.howstuffworks.com/fingerprint-scanner.htm/printable, Feb. 18, 2004, 6 pages.

"How Facial Recognition Systems Work", by Bonsor, http://computer.howstuffworks.com/facial-recognition.htm/printable, Feb. 18, 2004, 6 pages.

"Biometrics: Hand Geometry", by Ross, et al., http://biometrics.cse.msu.edu/hand_geometry.html, Feb. 26, 2004, 2 pages.

"ISO Magnetic Stripe Card Standards", http://www.cyberd.co.uk/support./technotes/ioscards.htm, Feb. 9, 2004, 4 pages.

"Smart Card Developer's Kit: Some Basic Standards for Smart Cards", http:unix.be.eu.org/docs/smart-card-developer-kit/ch03/033-035.html, Feb. 9, 2004, 2 pages.

International Search Report and Written Opinion of the International Searching Authority, PCT/US05/26067, May 23, 2007.

Zhanna Korotkaya, "Biometric Person Authentication: Odor", Department of Information Technology, Laboratory of Applied Mathematics, Lappeenranta University of Technology pp. 1 16, (2003).

"The Henry Classification System", International Biometric Group, 7 pages, (2003).

"Identix Inc.—Empowering IdentificationTM—Understanding Biometrics: Facial Recognition Technology", Identix Inc., 1 page, (2003), http://www.identix.com/newsroom/news_biometrics_face.html.

"Pay by Touch—Company: About Us", Pay by Touch, 1 page, (2003), http://www.paybytouch.com/company.html.

"What's New: Timex Watch Features Speedpass System", Exxon Mobil Corp., 1 page, (Jun. 4, 2002), http://www.speedpass.com/news/article.isp?id-51.

"Credit Card Offer Travelers New Benefit", PR Newswire, Aug. 5, 1987.

"New Evidence about Positive Three-Tier Co-pay Performance Presented at Express Scripts 2000 Outcomes Conference", PR Newswire Association, Inc., Jun. 28, 2000.

"Prestige Credit Cards: Those Pricey Plastics", Changing Times, Apr. 1986.

"Shell Introduces Optional Credit Card", The Associated Press, Sep. 3, 1985.

"Shell Introducing Expanded 'Signature' Credit Card", Tulsa Business Chronicle, Sep. 5, 1985.

"Shell-Oil: Introduces Shell Signature Travel and Entertainment Credit Card", Business Wire, Sep. 3, 1985.

"The Chase Manhattan Bank Today Announced a Comprehensive Program to Enhance the Value of All its Credit Cards", PR Newswire, Dec. 18, 1986.

American Express to offer disposable credit card numbers, CNN.com. U.S. News, www.cnn.com/2000/US/09/08/online.payments.ap/, Sep. 8, 2000.

Carey, Gordon, "Multi-tier Copay", Pharmaceutical Executive, Feb. 2000.

Crumbaugh, Darlene M., "Effective Marketing Positions: Check card as consumer lifeline", Hoosier Banker, Apr. 1998, p. 10, vol. 82, Issue 4.

Disposable Credit Card Numbers, courtesy of CardRatings.org, The Dollar Stretcher, www.stretcher.com/stories/01/010212e.cfm, Jan. 2001.

Gabber, et al., "Agora: A Minimal Distributed Protocol for Electronic Commerce", USENIX Oakland, CA, Nov. 18, 1996.

Goldwasser, Joan, "Best of the Cash-back Cards", Kiplinger's Personal Finance Magazine, Apr. 1999.

Greene, Thomas C., American Express offers temporary CC numbers for the Web, The Register, www.theregister.com.uk/content/1/13132.html, Sep. 9, 2000.

http://www.palowireless.com/infotooth/tutorial.asp, Apr. 28, 2003.
http://www.palowireless.com/infotooth/tutorial/12cap.asp, Apr. 28, 2003.
http://www.palowireless.com/infotooth/tutorial/baseband.asp, Apr. 28, 2003.
http://www.palowireless.com/infotooth/tutorial/hci.asp, Apr. 28, 2003.
http://www.palowireless.com/infotooth/tutorial/Imp.asp, Apr. 28, 2003.
http://www.palowireless.com/infotooth/tutorial/k1_gap.asp, Apr. 28, 2003.
http://www.palowireless.com/infotooth/tutorial/profiles.asp, Apr. 28, 2003.
http://www.palowireless.com/infotooth/tutorial/radio.asp, Apr. 28, 2003.
http://www.palowireless.com/infotooth/tutorial/rfcomm.asp, Apr. 28, 2003.
http://www.palowireless.com/infotooth/tutorial/sdp.asp, Apr. 28, 2003.
http://www.palowireless.com/infotooth/whatis.asp, Apr. 28, 2003.
http://www.semiconductors.philips.com/news/content/file_878.html, Apr. 7, 2003.

International Search Report and Written Opinion of the International Searching Authority, PCT/U505/26101, May 13, 2008.

Kuntz, Mary, "Credit Cards as Good as Gold", Forbes, Nov. 4, 1985.

Lahey, Liam, "Microsoft Bolsters Rebate Structure", Computer Dealer News, Feb. 8, 2002.

Lamond, "Credit Card Transactions Real World and Online" © 1996.

Martin, Zack, One-Time Numbers Stop Web Hackers From Pilfering Data, Card Marketing, Thomson Financial, www.cardforum.com/html/cardmark/jan01_c3.htm, Jan. 2001.

Nyman, Judy, "Free Income Tax Clinics are Opening as April 30 Deadline Draws Nearer", The Toronto Star, Final Edition, Mar. 25, 1986.

Obel, Michael, "Oil Companies Push Marketing, Cost Cutting to Fortify Earnings", Oil & Gas Journal, Sep. 16, 1985.

Schmuckler, Eric, "Playing Your Cards Right", Forbes, Dec. 28, 1987.

Sony, Philips to Test RFID Platform, RFID Journal, May 8, 2003, 2 pages.

"Core One Credit Union—Discover the Advantage", http://coreone.org/2visa.html, Copyright 2001, (Last Visited Oct. 9, 2002).

* cited by examiner

SYSTEMS AND METHODS FOR MANAGING MULTIPLE ACCOUNTS ON A RF TRANSACTION DEVICE USING SECONDARY IDENTIFICATION INDICIA

CROSS-REFERENCE TO RELATED APPLICATIONS

This invention claims priority to and the benefit of U.S. Provisional Patent Application No. 60/507,803, filed Sep. 30, 2003; and is a continuation-in-part of and claims priority to U.S. patent application Ser. No. 10/708,545, entitled "SYSTEM AND METHOD FOR SECURING RF TRANSACTIONS USING A RADIO FREQUENCY IDENTIFICATION DEVICE INCLUDING A TRANSACTIONS COUNTER," filed Mar. 10, 2004; and to U.S. patent application Ser. No. 10/708,547, entitled "SYSTEM AND METHOD FOR SECURING RF TRANSACTIONS USING A RADIO FREQUENCY IDENTIFICATION DEVICE INCLUDING A RANDOM NUMBER GENERATOR," filed Mar. 10, 2004. The '545 and '547 applications themselves claim priority to U.S. patent application Ser. No. 10/340,352, entitled "SYSTEM AND METHOD FOR INCENTING PAYMENT USING RADIO FREQUENCY IDENTIFICATION IN CONTACT AND CONTACTLESS TRANSACTIONS," filed Jan. 10, 2003; (which itself claims priority to U.S. Provisional Patent Application No. 60/396,577, filed Jul. 16, 2002). The '352 application itself claims priority to U.S. patent application Ser. No. 10/192,488 entitled "SYSTEM AND METHOD FOR PAYMENT USING RADIO FREQUENCY IDENTIFICATION IN CONTACT AND CONTACTLESS TRANSACTIONS," filed on Jul. 9, 2002 (which itself claims priority to U.S. Provisional Patent Application No. 60/304,216, filed Jul. 10, 2001). All of the above applications are hereby incorporated by reference.

FIELD OF INVENTION

The present invention generally relates to payment systems, and more particularly, to systems and methods for facilitating the management of multiple data sets on various card and "non-card" transaction enabling instruments.

BACKGROUND OF INVENTION

Some financial transaction devices, such as credit cards and loyalty program cards, are capable of accessing information related to multiple accounts. For example, a credit card may be able to access membership data associated with both a credit card account and a wholesale purchase club account. These financial transaction devices may generally include one or more applications for selecting and then securely utilizing a sub-set of specified account information. However, the systems associated with these cards typically delegate the loading of these applications and management of the related data sets to third parties on behalf of both the issuer of the instrument and "application tenants" residing on the issuer's financial transaction devices. Managing data associated with a credit card via the issuer/third party may involve time consuming steps such as requesting permission to manage data, conforming to data standard formats, and implementing changes. Thus, traditional solutions for managing multiple application tenants are disadvantageous in that the traditional solutions leave a disproportional burden on the issuer and/or the delegated third party in terms of managing accounts on a financial transaction device.

Another disadvantage is that, in general, the financial transaction devices, which are capable of accessing information related to multiple accounts, are typically designed to access only those multiple accounts managed by the same issuer. For example, the same issuer provides both the credit card and the wholesale purchase club account to the user. As such, the issuer providing both accounts generally establishes its own application tenant storage format and management protocol related to the accounts. The established format and protocol is ordinarily different from any format or protocol used by other unrelated issuers, which provides the issuer increased control over access to the account data. Because of the differing unique protocols/formats amongst issuers, multiple issuers typically provide a transaction device corresponding to an account offered by the issuer, where the data for accessing the account is stored in that issuer's protocol/format. Thus, a user wishing to access multiple accounts managed by different issuers, must ordinarily carry at least one transaction device per issuer. Carrying multiple transaction devices can be inconvenient in that the instruments may be more easily misplaced, lost or stolen, preventing the user from accessing the account.

Another disadvantage of the above conventional methods of managing multiple accounts, which is related to the different issuer formats/protocols, is that, since conventional financial transaction devices typically only store application tenant information related to one issuer, the information may not be recognized by a second issuer distinct from the first. That is, the user of the financial transaction device typically is only able to use the financial transaction device at locations identified by the issuer of the transaction card. The financial transaction device may not be used at any other locations, since the locations not identified by the user will not recognize the application tenant information which is typically stored on the instrument in a issuer determined format. As such, in order to access multiple accounts managed by different issuers using different formats/protocols, the user must typically carry multiple cards, as noted above.

In addition to the above, the conventional multiple account management systems have another disadvantage in that data contained on the financial transaction devices may not be easily updated. That is, traditional financial transaction devices are only "readable" instruments, and not "writeable" instruments, where the data on the instrument may be read from the instrument but not written to the instrument. More particularly, once the financial instrument is issued to the user, the data often may not be modified. Instead, where information contained on the instrument is to be modified, a new physical consumer device (e.g., transaction device) often needs to be issued. That is, the information stored on the financial transaction devices are typically not permitted to be changed without issuer involvement. The issuer may be involved, for example, by verifying compatibility of a proposed new or updated information, checking conformance of the data to the issuer's standard formatting and size guidelines, and implementing the changes. Thus, additional burdens are placed on the issuer where it is necessary to add unique data sets to a financial transaction device, or to update the data stored thereon.

Conventional multiple account management systems are further disadvantaged in that the systems are not configured to permit the system user to select which one of the multiple accounts to use to complete a transaction. Ordinarily, conventional multiple account systems are configured such that a particular account for completing a transaction is selected by the system without any input from the system user. The system user generally has little or not input into the account selected. Thus, conventional systems limit a user's ability to manage the user's transaction accounts according to the user's needs.

As such, the ability to store data on a single financial transaction device thereby permitting a user of the single instrument to complete transactions using multiple transaction accounts issued by different distinct issuers, does not exist. A need exists for a single financial transaction device which stores multiple independent data sets provided by multiple distinct issuers irrespective of the format/protocol of the various issuers. A need further exists for a single financial transaction device which may be used to efficiently manage the data sets and applications stored on the instrument, irrespective of the protocol used by an issuer to process the data. Even more particularly, a need exists for a system for managing multiple transaction accounts of differing formats on a single financial transaction device which is issued to a user, and which permits the user to access different accounts provided by multiple distinct financial account issuers.

SUMMARY OF INVENTION

In one exemplary embodiment of the present invention, a system and method is provided for facilitating the management of distinct data sets of different formats on a RF operable transaction device. The system includes a RF financial transaction device for use in managing multiple distinct data sets provided by distinct issuers. The method includes the steps of: receiving, from a read/write device, at least a first data of a first format at the financial transaction device, wherein the first data set is owned by a first owner; receiving, from the read/write device, at least a second data set of a second format at the financial transaction device, wherein the second data set is owned by a second owner, and wherein the first format is different from the second format; storing the first data set and the second data set on the financial transaction device, in distinct fashion and in accordance with the first and second format respectively, where the first data set and the second data set are unique one from the other; and modifying (e.g., adding, deleting, overwriting, altering) at least the first data set, and/or adding a third data set, in accordance with instructions provided by the data set owner or user.

In another example, a financial transaction device comprises a data set management system for facilitating the management of more than one data set stored on the transaction device, the RF financial transaction device comprising at least one data storage area configured to store a first data set of a first format and a second data set of a second format different from the first format. The first data set is associated with a first data set owner (e.g., first issuer) and the first data set is configured to be stored on the financial transaction device independent of a second data set owner (e.g., second issuer); and, the second data set is associated with the second owner and the second data set is configured to be stored on the financial transaction device independent of the first data set owner, wherein the first data set and the second data set are stored in accordance with the first and second format, respectively.

In yet another exemplary embodiment of the present invention, a data management system comprises: a RF financial transaction device associated with a first data set of a first format and a second data set of a second format, wherein the financial transaction device is configured to facilitate management of the first data set without involvement of the first data set owner. The data management system may further comprise a read/write device configured to communicate with the financial transaction device for providing the first and second data sets to the instrument and for modifying the data sets thereon in accordance with a condition header annotated to the data sets. The read/write device may be stand alone, or the device may be connected to a transaction processing network. The read/write device may be used to load the issuer-owned data onto the transaction device, and thereafter delete, augment and/or manage the information stored thereon, or to add additional distinct data sets.

As noted, exemplary embodiments of the financial transaction device of the present invention may include storing a first and second data set of differing formats on a transaction device database. Alternate exemplary embodiments of the present invention may also include a "mirror image" of the first and second data set stored on a remote database removed from the transaction device issuer and the transaction device itself. The remote database may be placed in communication with the transaction device issuer system, and the financial transaction device via, for example, electronic communication with a network. As such, in one exemplary aspect, the present invention permits changes which are made on the remote database (or transaction device) to be mimicked or synchronized on the instrument (or remote database).

In still another exemplary embodiment, the invention secures authorization from an issuer prior to loading the issuer-owned data onto the RF transaction device. Once authorization is given, the issuer may be "enrolled" in a transaction device multiple account management system, the associated issuer-owned data may then be loaded on the transaction device. The issuer-owned data may be loaded in a format recognizable by a merchant system or by a system maintained by issuer. Thus, when the transaction device is presented to complete a transaction, the data may be transferred to the issuer in an issuer recognized format, eliminating the need to carry multiple transaction devices for each issuer. That is, the issuer receives the data in an issuer recognized format and may process the accompanying transaction under issuer's already established business as usual protocols. In this way, the issuer is permitted to manage its issuer provided program at the issuer location, irrespective of the management of other programs provided by other distinct issuers enrolled in the multiple account management system.

In another exemplary embodiment of the invention, the system user may select at least one of the multiple data sets for transaction completion. Where a single transaction device includes multiple data sets (i.e., transaction account numbers), issued by distinct account issuers, the account issuers may determine different methods for transaction authorization. For example, the issuer may require the system user (e.g., account holder) to provide a secondary form of identification, or secondary identifier prior to authorizing completion of a transaction request. The secondary identifier may be any form of user identification which the system user may use to verify the user's identity. The secondary identifier may be personal identifier number (PIN), biometric identifier, voice or physical characteristic identifier, or the like, that is associated to one of the multiple transaction account numbers contained on the transaction device. The system user may provide the secondary identifier to a merchant or issuer system in response to a request for additional transaction verification. Upon verification of the secondary identifier, the transaction may be processed according to a merchant or issuer system business as usual standard.

In yet another embodiment, the system user may be permitted to allocated portions of a transaction request to one or more transaction account number contained on the transaction device. Accordingly, a system user may identify multiple transaction account numbers for transaction completion, where each one of the transaction account numbers identified is used to partially satisfy the transaction request. That is, the transaction request is satisfied by providing distinct transaction request to an issuer system in accordance with the portions of the transaction request to be satisfied by a particular transaction account.

BRIEF DESCRIPTION OF DRAWINGS

A more complete understanding of the present invention may be derived by referring to the detailed description and claims when considered in connection with the Figures, wherein like reference numbers refer to similar elements throughout the Figures, and:

DETAILED DESCRIPTION

Figure 1:
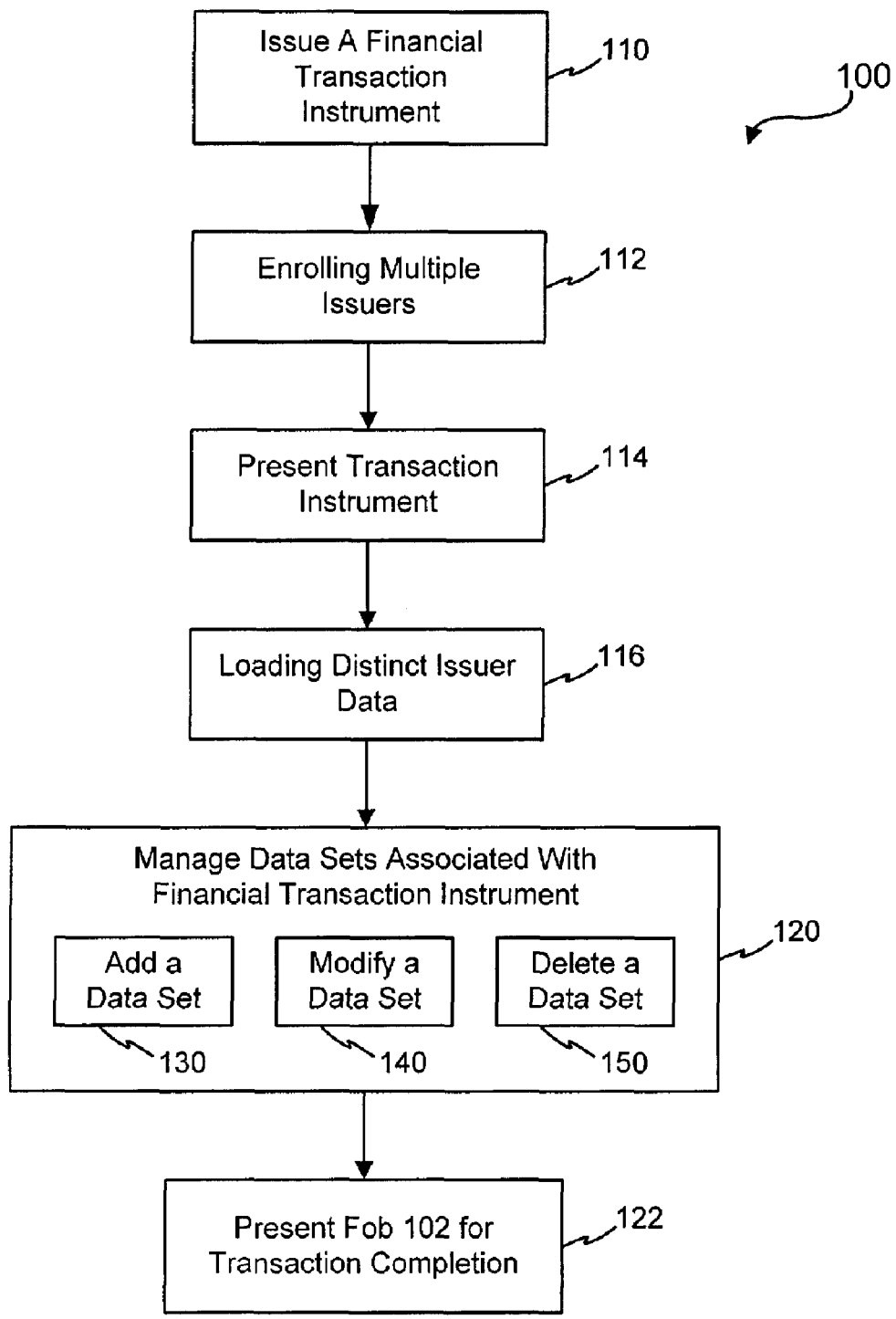
FIG. 1 illustrates a general overview of an exemplary data set management method in accordance with an exemplary embodiment of the present invention.

While the exemplary embodiments herein are described in sufficient detail to enable those skilled in the art to practice the invention, it should be understood that other embodiments may be realized and that logical and mechanical changes may be made without departing from the spirit and scope of the invention. Thus, the following detailed description is presented for purposes of illustration only and not of limitation.

The present invention improves upon prior art contactless cards and includes novel systems and methods for securing the use of contactless cards in the payment process from end-to-end, (meaning from the time it is used to the time it is accepted by the acquirer), or any portion thereof. Embodiments of the invention generally include security solutions for contactless transaction systems, the use of PINs, substantially securely accessing multiple card products in one device, and/ or emulating a magnetic stripe card and cellular phones without substantially compromising security. The invention also includes new security methods which minimize the risks associated with this air interface. In one embodiment, consumer payment information is transmitted using RF technology, so the information can often be accessed without having physical procession of the payment device (e.g., card or fob).

More particularly, exemplary embodiments reduce or eliminate account fraud for RF devices by substantially securing the data contained on the device. The invention incorporates transaction card account payment security from a RF device with a POS device instead of (or in addition to) using an identifier that identifies where to find the correct transaction card account number from the merchant system, outside the POS and using a separate network (not one of the standard financial networks). While the invention and RF devices may include new POS terminals to read the RF signal and transmit it to facilitate authorization and submission, the increased consumer convenience and security should translate into greater use of the fob. Moreover, the POS terminals for the RF devices often include a failure rate less than magnetic-stripe devices, as there is little or no mechanical interaction between the card and the reader (no swiping), thereby resulting in less ongoing cost and maintenance of the POS devices. As used herein, the terms secure, valid, authorized, authenticated, etc (including similar terms and various forms of the terms) may include full, partial or substantial security, validation, authorization, authentication, etc.

An exemplary aspect of the present invention includes the RF device storing substantially "in-the-clear" account data (such as the account number and its expiration date), an encryption key and a counter. The RF devices are typically manufactured with the account number, encryption key and the beginning counter set in them. The RF device at a minimum contains a simple processor chip capable of incrementing a counter and producing an authentication tag. RF devices with greater capabilities (like contactless smart cards) can be used, but are simply an extension of the present invention discussed herein.

In an exemplary embodiment, and which is substantially secure for this particular scheme, both the RF device and reader include an authentication tag with the transaction request. When the RF device comes into range of a merchant's RF reader, the reader sends a random number or 'nonce' to the RF device. The RF device uses the random number (from the RF reader), its counter, and its account number to produce an authentication tag (Message Authentication Code) using its encryption key. The account data, counter, random number and authentication tag is then returned to the RF reader by the RF device as a transaction request. Once the request has been sent to the RF reader, the RF device increments its counter by the designated value. For a basic introduction to cryptography, please review a text written by Bruce Schneider which is entitled "Applied Cryptography: Protocols, Algorithms, and Source Code In C,"

published by John Wiley & Sons (second edition, 1996), which is hereby incorporated by reference.

The invention contemplates various ways to update the counter. The simplest approach is to increment the counter by some value. That value can be obvious (e.g., 1) or something more obscure such as 47 (a number or algorithm which may be different for each account or account range). The key is that the counter is something that can be anticipated by the acquirer as it authenticates the transaction request. Another method to obscure the value is to not have the starting value equal to 0 or 1. Rather, it may be seeded with a specific value (which also may vary by account or account range) and incremented. Finally, the counter may be a random number produced by some algorithm that is based on an initial seed that is produced by the RF device and is also known by the issuer. This is similar to a hidden secret known only to the device and the issuer.

The RF reader then utilizes the transaction request and creates a second authentication tag using the RF readers' encryption key. The RF reader converts the transaction request into a form recognized and used by its corresponding POS device (typically this will be using the format described by ISO 8583), including the two authentication tags, the RF device counter, and the RF reader random number. The extra data may be stored anywhere on the submission record. The POS device uses its existing payment infrastructure and network to send a message/request to the acquirer for the account for authorization of the transaction processing.

The acquirer routes the authorization request to the account issuer. The account issuers authorization process substantially recognizes the type of request and substantially verifies the authentication tags from both the RF device and the RF reader. This approach provides better security of the request by verifying not only the RF device, but also verifying that the authorization request originated from a legitimate RF reader. Because the backend server verifies the authentication tags using the same encryption key, the correct encryption key for the RFID and the RF reader should be known by that same server. Whereas the encryption key may change for the different accounts that are used at any RF reader, the encryption key for the reader should be the same. The encryption key may be the same for all the RFIDs containing accounts in a particular number range, or it may be unique for each account. The incoming account number is used to identify the encryption key that is then used to calculate or recalculate, construct or reconstruct the authentication tag using the account number, random number and/or counter from the RF device. If the same authentication tag value is produced, the RF device tag is authentic and considered valid.

The authentication tag for the RF reader is processed in a similar manner. The encryption key associated with the RF reader based on the POS identifier from the incoming request is identified and used to rehash the incoming account number, random number, counter, and/or RF device authentication tag. If the same or substantially the same authentication tag value is produced, the RF reader tag is authentic and considered valid.

Once the authentication tags have been verified, the issuer validates the counter from the account. Depending on the method used to increment the counter, the acquirer may identify the expected counter value that it will match to the incoming counter value. Any unexpected or reused value may indicate a likely misuse of the RFID or a fraudulent replay of a previous RFID transaction request transmission. To account for undelivered or missing requests, the acquirer may allow for acceptable gaps in the counter value, but reused values may always be rejected.

If either authentication tag or the counter is found to be fully or partially invalid, the authorization request may be rejected. If they are found to be valid, the actual account number is submitted for payment authorization, using the normal process. The authorization response is then returned to the merchant. If the payment is authorized the merchant submits the request through its existing submissions infrastructure and network for settlement.

Another exemplary embodiment that may differ from the first RF device includes an authentication tag for the transaction request and the RF reader is not authenticated. A similar RF device process is used, but when the transaction request is sent to the RF reader, the reader simply converts the request into a form recognized and usable by the POS device. The issuer then verifies the authentication tag of the RF device.

In yet another exemplary embodiment the RF reader includes an authentication tag for the transaction request. In this embodiment, when the RFID is read by the RF reader, the account data and counter is provided to the RF reader. The RF reader uses its encryption key to create an authentication tag for the transaction request. The acquirer then verifies the authentication tag using the encryption key associated with the POS device. In this approach, the security of the account relies on the integrity of the POS device, while simplifying the process (the RFID does not increment a counter) and content (no encryption key) of the account. However, the RFID transmission is vulnerable to eavesdropping. This particular scheme does not necessarily encrypt the account data, but leaves it in the clear. The security is from the authentication tag(s), the nonce and counter that is used and verified by the issuer. Moreover, it helps to insure that the transaction request came from a credible source (e.g., the account and/or the POS device). However, unless the issuer enforces that the account number on the RF device can only originate from a RF associated POS device, this in and of itself may not be adequate to secure the account completely, since the payment information is communicated in the clear, the account number may be captured and faked in any normal online payment. However, by restricting these accounts to be used only through the RF payment channel, the appropriate controls may be enforced.

In another exemplary embodiment, more than one account or one number is stored on the RF device. Two kinds of account numbers, a routing number and transaction account number housed on the RF device may exist. The routing number may be a account number that cannot be used for payment, and that designates to which issuing bank the transaction request should be directed for authorization and submission (using the Industry routing currently used within the existing payment network). The encrypted account data from the RF device is included in the request and describes the actual account data (number and expiration date) to be used for the transaction processing.

In an alternate embodiment, the RF reader activates a RF device and sends a random number to the RF device. The RF device uses its encryption key to create an authentication tag using the routing number, the random number from the RF reader, the counter from the RF device, and/or the encrypted account data. The RF device then returns the routing number as the account number known by the RF reader and merchant, the counter, the encrypted account from the RF device, the random number provided by the RF reader and/or the authentication tag to the RF reader as a transaction request.

The RF reader converts this request into a form recognizable by a POS device and forwards the transaction request to its POS device. In an exemplary embodiment, the request may be in the ISO 8583 format. The POS device then forwards the request to the associated acquirer using the existing infrastructure and network based on the routing number provided. The POS device uses the standard 8583 protocol in a new, unique way, by placing the encrypted payload from the RFID, in this case containing the account number, into the Cryptogram field in the authorization request. The acquirer may forward the authorization to the issuing bank (if different). The issuing bank recognizes the type of request, and verifies the authentication tag and the counter for the request (as described previously). Since the routing number is defined as the account number on the ISO 8583 request it can be used by the issuing bank to locate the encryption key used to create the authentication tag for the RF device. If either the authentication tag or counter verification fails, the request is rejected and returned to the merchant. If both prove to be valid, the payload is decrypted using the encryption key used for the payload, again using a key that is retrieved based on the routing number. The encryption payload key and encryption key to create the authentication tag may be different keys. The decrypted transaction account number is processed using the authorization system. The authorization may be returned using business as usual procedures over the 8582 protocol. If the authorization is approved, the merchant submits the transaction request, the 8583 protocol is again used. The routing number may be used to route the submission to the acquiring bank for merchant payment. The encrypted payload from the RFID, may be included in the Cryptogram field in the submission request. When the issuing bank receives the transaction request, the account number in the Cryptogram field is decrypted using the secret encryption key associated with the routing number. The account member can then be billed based on the decrypted account number ID.

In still another exemplary embodiment, the invention uses more than one transaction account number on the RF device. As noted, there are two kinds of account numbers, a routing number and multiple transaction account numbers housed on the RF device. In this embodiment, the routing number may be a account number that cannot be used for payment, but that designates to which issuer the transaction request should be directed for authorization and submission (using the industry routing currently used within the existing payment network). The encrypted account data from the RF device may be included in the request and describes the actual account data (e.g., number and expiration date) to be used for the payment.

In one exemplary variation of this aspect, the system uses a paired list of routing and encrypted account data. The routing and encrypted account number to be used for the transaction request may be determined from the current value of the counter, so that the routing number and the encrypted account number are both unique for the transaction. When the RF device is activated when passed within range of a RF reader, the RF device incremented the counter and uses the counter as an index to select the routing number and encrypted account number to include in the transaction request. These account numbers and the counter are then used with the random number from the RF reader, the counter and the encryption key to produce the authentication tag for the transaction request. There can be a single encryption key that is used for each of the encrypted account numbers on the RF device or each encrypted account may have its own encryption key that is used.

A PIN can also be used with the RF device for identification and authentication. If there are multiple accounts contained on the RF device, instead of relying on the counter and an algorithm to determine which should be used, a PIN provided by the accountholder may be used. When the RF device is presented to the RF reader, the accountholder may be prompted to enter a PIN. The PIN may simply authenticate the user to use the account. But when there are multiple accounts, the entered PIN may be used to identify which account should be used within the transaction request. This would allow the RF device to contain different account numbers for different types of account products, such as, for example, credit and charge cards. As an example, data related to two accounts may exist on the RF device representing a charge and credit card, each associated with a unique PIN. When the RF device is presented, the accountholder may decide which card and/or account should be used for the payment through the PIN entered. The entered PIN would be returned to the RF device and used to identify which card and/or account will be used. If the PIN for the charge card is used, that card account is used in the transaction request that is provided back to the RF reader. A counter valve may still be important for the purpose of building the authentication tag for the transaction request. Although this approach includes a RF device with greater processing capabilities, it extends the security of the account numbers imbedded on the card by requiring an explicit authentication of the account by the accountholder before the payment can be requested.

Another embodiment may include a single routing number associated with a RFID, but multiple encrypted account numbers. As the counter is incremented, the counter is used as an index to pull the next encrypted account number from protected memory on the RFID to be transmitted to the reader, using the already described random number, counter and/or authentication tag.

Since the RF device typically corresponds to only one actual account from the issuer the list of encrypted accounts on the RFID may correspond to a series of facade account numbers that are linked to the single account number on a centralized server. Because the facade numbers have limited use, it also possible to transmit them to the reader 'in the clear', without significantly impacting fraud rates. The facade or blinded account numbers may be supported through a single use account number or proxy account number (e.g., Private Payments) system, which identifies the underlying account number to be used for the transaction request. As the routing and encrypted account data is selected (by either the RF device or reader), it may be placed into the transaction request and forwarded to the POS device and the acquirer for authorization. Once the request has been authenticated (as described previously using the authentication tag and the RF device counter), the account where the charge will be applied may be authorized. The routing number is used to identify the encryption key to be used to decrypt the account data within the transaction request from the transaction request. The authorization system may recognize that the account is not a usable account number, but a facade/blinded account. The authorization system may request a Private Payments system to identify the actual account number. The actual account number may be returned from Private Payments for authorization and the response may be returned to the requester.

This embodiment may minimize risk by limiting the exposure of any account during any one transaction since the actual account may change from request to request. Although this appears to limit the life span of the RF device to the number of items included in the list, the counter may be reset once the limit of the list has been exceeded. Even though there are 10 items in the list, following the 10 requests, the counter may be offset (not reset because that would reduce the ability to properly verify misuse) so that the list of accounts may be used and reused. As discussed previously, the accounts may also be selected from the list randomly using an algorithm known only to the card and the acquirer. In this case, the account used cannot be anticipated without knowing the algorithm. Thus, the list may never really expire, instead its use may not follow a basic pattern. Finally, there may not be a one to one correlation between the counter and the encrypted account number returned, for example, an encrypted account number may be changed every 10 increments of the counter, increasing fraud potential insignificantly.

There may be two variables that may be changed to create other embodiments of the invention, namely, what is used to select the account data and where the account data is selected. Instead of using the counter from the RF device to identify what account data to use, the list may use a date range to define the effective period when each individual routing and encrypted account data would be used. Being date sensitive may limit the long-term use of this account to what is contained on the card. Once the last item in the list has been used, then the account may no longer be used. Instead of the RF device selecting the account data, the entire list may be sent to the RF reader and the reader may make the selection using either the counter or the date range.

Another exemplary embodiment of the invention may include a combination of the previous two, one routing account number and a list of encrypted account data. Which instance of the encrypted account data is used may be determined as described previously using the counter, random identifier, or an associated date range by either the RF device or RF reader. Whereas the routing number in the earlier descriptions represents how the data will be authenticated by the acquirer, this approach may include a unique routing number for each RF device. So as requests are made for a specific RF device for a specific counter, the corresponding account data from the list may be used for the transaction request.

Because the merchant knows the routing number, but not the payment account number when the actual account number is in the encrypted payload, disputes may be an issue. One way to solve this problem is to allow credits, that is refunds from the merchant, to be processed using the routing number. In this embodiment, only transaction requests from the merchant, in which the merchant attempts to use the routing number for payment may be rejected.

In another embodiment, during the authorization step, the issuing bank may return the actual payment credit card number in the response. This would result in the merchant knowing the 'real' credit card number, without the credit card number having ever being transmitted in the clear from the RFID. The merchant may then submit the 'real' credit card number with the transaction request, simplifying disputes.

Another exemplary embodiment extends the invention to include other encrypted data in the datagram sent in the 8583 protocols. The first example of this use may be to provide the customer's name on the payment receipt. For privacy reasons, the customer name may not be transmitted in the clear to the reader. In a unique usage of the 8583 protocol, the name may be protected without requiring decryption on the reader. The customer name may include an encrypted payload from the RFID, along with the account number. The RF reader may have no knowledge of the contents of the encrypted payload on the RFID and simply move this information into the cryptogram field in the authorization request. The acquirer may forward the authorization to the issuing bank (if different). At the issuing bank, the routing number would be used to determine the encryption key and use it to decrypt the payload from the RFID. The account number may be used as described previously for authorization. The decrypted name may be returned to the reader in the authorization request (if approved). The POS device would then use the name returned from the issuer to print on the customer's receipt.

The present invention may also include a non-traditional transaction processing device because another usage of the encrypted payload may be to enable payments processing for non-traditional issuers such as, for example, cell phones, pervasive computing devices, palm pilots, Blackberry® handhelds, and other devices which may be enabled to participate in the standard credit card merchant-processing network, but use a safe wireless payment protocol and be billed by the telecom. For example, a non-traditional payment device such as a cell phone offered by a phone carrier may have a routing number associated with it to locate an issuing bank. In addition, a phone number or other customer ID as well as a credit card data (number and expiration date) encrypted in an encrypted payload. When the phoneholder decides to use his phone to make a payment, he simply presents it next to the reader at the merchant location. In many cases this may be as simple as imbedding an RFID in the phone case, or may be as sophisticated as implementing the RFID protocol in the phone. The RF reader may respond with a random number that is used by the RF device in the cell phone to produce an authentication tag along with the account data and the counter from the RF device. The transaction request may then be returned to the RF reader that converts the request into a form that is acceptable to the POS device to which it is attached. The transaction request may be forwarded to the POS device, which may forward the request to the acquirer using its existing payment infrastructure and network.

The RF reader may be configured to convert this request into a form recognizable by a POS device and forwards the transaction request to its POS device. In one embodiment, the payment request may be in the ISO 8583 format. The POS device may then forward the request to the associated acquirer using the existing credit card payment infrastructure and network based on the routing number provided. The POS device may use the standard 8583 protocol in a new, unique way, by placing the encrypted payload from the phone, in this case containing a customer ID and account number, into the Cryptogram field in the authorization request. The acquirer may forward the authorization to the issuing bank (if different). The issuing bank may recognize the type of request, and verifies the authentication tag and the counter for the request (as described previously). Since the routing number may be defined as the account number on the ISO 8583 request it can be used by the issuing bank to locate the encryption key used to create the authentication tag for the RF device. If either the authentication tag or counter verification fails, the request may be rejected and returned to the merchant. If both prove to be valid, the authorization may be approved. When the merchant submits the transaction request, the 8583 protocol may again be used. The routing number may be used to route the submission to the acquiring bank for merchant payment. The encrypted payload from the RFID, would be included in the Cryptogram field in the submission request. When the issuing bank receives the transaction request, the account number in the Cryptogram field may be decrypted using the secret encryption key associated with the routing number. The card member may then be billed based on the decrypted account number ID.

The RF reader may convert this request into a form recognizable by a POS device and forwards the transaction request to its POS device. In one embodiment, the payment request may be in the ISO 8583 format. The POS device may then forward the request to the associated acquirer using the existing infrastructure and network based on the routing number provided. The POS device may use the standard 8583 protocol in a new, unique way, by placing the encrypted payload from the phone, in this case containing the a customer ID and account number, into the Cryptogram field in the authorization request. The acquirer may forward the authorization to the issuing bank (if different). The issuing bank may recognize the type of request, and verifies the authentication tag and the counter for the request (as described previously). Since the routing number may be defined as the account number on the ISO 8583 request it may be used by the issuing bank to locate the encryption key used to create the authentication tag for the RF device. If either the authentication tag or counter verification fails, the request may be rejected and returned to the merchant. If both prove to be valid the payload may be decrypted using the encryption key used for the payload, again using a key that is retrieved based on the routing number. The encryption payload key and encryption key to create the authentication tag may be different keys. The decrypted credit card number may be processed using the authorization system. The authorization may be returned using business as usual over the 8583 protocol. If the authorization is approved, the merchant may submit the transaction request, and the 8583 protocol may again be used. The routing number may be used to route the submission to the acquiring bank for merchant payment. The encrypted payload from the RFID, may be included in the Cryptogram field in the submission request. When the issuing bank receives the 8583 request, the account number and customer ID in the Cryptogram field may be decrypted using the secret encryption key associated with the routing number. The issuing bank may typically facilitate the billing process, and the card member may then be billed based on the decrypted account number ID. Instead in one embodiment, the issuing bank may use the decrypted customer ID to provide a billing record to the Telecom. The Telecom may then bill the customer.

The account and phone numbers may typically be inextricably linked, but may be serviced by different organizations. In one embodiment, the phone may be managed completely by the carrier, while the account number may be supported completely by the account issuer (though it does not issue plastic, it does issue the account number to be imbedded in the phone number). Since the accountholder may really be the phoneholder, instead of the account issuer billing an individual, the issuing bank may bill the phone carrier for all payments made using the cell phone device. It may then be the responsibility of the phone carrier to individually bill the different phone-holders for the payment. Since the phone carriers bill by customer ID, which may be the phone number, the phone number associated to the account number used in the payment may be identifiable and usable by the phone carrier. In one embodiment, the phone number in the payment transaction so that it may be explicitly defined as part of the transaction and in the data provided to the phone carrier. In another embodiment, the phone carrier may identify the account number associated with the phone number in order to complete a billing (if the carrier knows what account is included in the phone at any given time).

The benefit to the phone carrier may be that the phone carrier can provide a wireless payment process that integrates with the existing payment systems, simplifying payment to the merchant, and limiting changes at the merchant location to reader upgrades. The carrier may then receive a portion of the fees (discount, interchange, network, etc.) that are assessed to the merchant for the transaction, which may be an incremental revenue stream for them. The account issuer and the phone carrier may settle at their discretion. In one embodiment, the account issuer may bill the phone carrier periodically (daily, weekly, monthly) for all activity since the previous period. Since a bill is being used, settlement may occur through a direct payment to the account issuer by the phone carrier.

Since a cell phone device has greater processing capacity, an additional authentication factor may be used before the account data is actually provided to the RF reader. When the RF device within the cell phone is activated, it may prompt the user to enter a PIN for the account data. This data may then be used to produce the authentication tag, but may not be included in the transaction request to the RF reader. The acquirer may then identify the PIN for the account to be used to produce its matching authentication tag. If the tags do not match, the authentication may fail and the request may be returned to the merchant as rejected. Alternatively, and/or additionally, the PIN to be validated may be contained in the encrypted cryptogram, so that the PIN number does not have to be known by the central system.

Another embodiment may include the phone number for the cell phone (or the unique identifier for non-cell phone devices) as a variable in the authentication tag. Since there is an explicit relationship between the device and the account number, an additional authentication step may include the device ID itself (either the phone number or some other unique identifier). This may help to insure that the account is only being used in conjunction with the device.

Another constituent may be involved in the process, namely the parent device (cell phone) carrier. Although the payment transaction may not actually use their infrastructure in any way (its using the RF reader attached to an existing POS device), that carrier may still be important to the use of the dependent RF device. In one embodiment, the account, counter and encryption key may not be manufactured into the phone, but may be loaded at any time by the phone carrier (similarly to the way a phone number can be changed). Also, the account number may always be associated with a specific phone number. In another embodiment, the system may consider the phone carrier the real owner (and responsible party) and the phone holder may be considered an additional accountholder.

In another exemplary embodiment the invention may include a third party in the normal payment transaction/relationship. Through the earlier discussion of using a cell phone with an imbedded RF device, which represents some account number provided by an issuer, the process may be essentially the same. The merchant may receive a transaction request and may forward it to the acquirer for authorization of the request. If approved, the request may then be submitted to the acquirer and the acquirer may pay the merchant. The acquirer may then provide (and settle) the request to the account issuer who may then bill the transaction to the accountholder. In another embodiment with the phone carrier as a distinct party, this flow may be changed to include the phone carrier.

In another embodiment, the account issuer may route each transaction to the phone carrier for authorization as well as billing. In this embodiment, the account issuer may serve as an extended acquirer and may be reimbursed for the settlement with the acquirer where the payment originated. For each transaction, the phone carrier may pay the account issuer less whatever fees that it will receive for the transaction.

The present invention also provides a system and method for a RF operable transaction device configured to manage multiple data sets (e.g., "application tenants") of differing formats associated with a plurality of distinct transaction account issuers. In this context, an "application tenant" may include all or any portion of any data sets which are substantially correlated to an account issuer, which the issuer may additionally use to substantially identify an instrument user or related account. For example, where the account issuer provides application tenant information, the application tenant may include, inter alia, a membership identifier associated with a user enrolled in a issuer provided transaction account program, and all related subsets of data stored on the transaction device. Where multiple application tenants are referred to herein, each tenant may constitute its own distinct data set, independent of any other application tenant data sets. For example, each application tenant may include a unique membership identifier and all associated subsets of data. Alternatively, an application tenant may include a membership identifier and an application for processing all data owned by an issuer. Thus, the data set or subset may include the processing application. Moreover, differing formats, as discussed herein, include differences in all or any portion of the formats. As such, "application tenant" and "distinct data set," and data set "owner" and account "issuer" may be used interchangeably herein.

In addition, it should be noted that although the present invention is described with respect to a financial transaction device, the invention is not so limited. The invention is suitable for any instrument capable of storing distinct data sets which may be provided by multiple distinct account issuers where the distinct data sets may be formatted one different from another. The account may be, for example, a calling card, a loyalty, debit, credit, incentive, direct debit, savings, financial, membership account or the like. While the information provided by the account issuers may be described as being "owned" by the issuers, the issuers or their designees may simply be a manager of the account.

The present invention may be described herein in terms of functional block components, optional selections and/or various processing steps. It should be appreciated that such functional blocks may be realized by any number of hardware and/or software components configured to perform the specified functions. For example, the present invention may employ various integrated circuit components (e.g., memory elements, processing elements, logic elements, look-up tables, and/or the like), which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and/or the like. For a basic introduction of cryptography and network security, the following may be helpful references: (1) "Applied Cryptography: Protocols, Algorithms, And Source Code In C," by Bruce Schneier, published by John Wiley & Sons (second edition 1996); (2) "Java Cryptography," by Jonathan Knudson, published by O'Reilly & Associates (1998); and (3) "Cryptography and Network Security: Principles and Practice," by Mayiam Stalling, published by Prentice Hall; all of which are hereby incorporated by reference.

As used herein, the terms "user," "end user," consumer," "customer" or "participant" may be used interchangeably with each other, and each shall mean any person, entity, machine, hardware, software and/or business. Furthermore, the terms "business" or "merchant" may be used interchangeably with each other and shall mean any person, entity, machine, hardware, software or business. Further still, the merchant may be any person, entity, software and/or hardware that is a provider, broker and/or any other entity in the distribution chain of goods or services. For example, the merchant may be a ticket/event agency (e.g., Ticketmaster, Telecharge, Clear Channel, brokers, agents).

The systems and/or components of the systems discussed herein may also include one or more host servers or other computing systems including a processor configured to process digital data, a memory coupled to the processor for storing digital data, an input digitizer coupled to the processor for inputting digital data, an application program stored in the memory and accessible by the processor for directing processing of digital data by the processor, a display coupled to the processor and memory for displaying information derived from digital data processed by the processor and a plurality of databases, the databases including client data, merchant data, financial institution data and/or like data that may be used in association with the present invention. As those skilled in the art may appreciate, the user interface for each system described herein may typically include an operating system (e.g., Windows NT, 95/98/2000, Linux, Solaris, etc.) as well as various conventional support software and drivers typically associated with computers. The user computer and other systems described herein can be in a home or business environment with access to a network. In an exemplary embodiment, access is through the Internet through a commercially-available web-browser software package.

Communication between various elements of the present invention is accomplished through any suitable communication means, such as, for example, a telephone network, intranet, Internet, point of sale device (point of sale device, personal digital assistant, cellular phone, kiosk, etc.), online communications, off-line communications, wireless communications, and/or the like. One skilled in the art may also appreciate that, for security reasons, any databases, systems, or components of the present invention may consist of any combination of databases or components at a single location or at multiple locations, wherein each database or system includes any of various suitable security features, such as firewalls, access codes, encryption, decryption, compression, decompression, and/or the like.

The systems may be suitably coupled to the network via data links. A variety of conventional communications media and protocols may be used for data links. For example, a connection to an Internet Service Provider (ISP) over the local loop as is typically used in connection with standard modem communication, cable modem, Dish networks, ISDN, Digital Subscriber Line (DSL), or various wireless communication methods. The merchant system might also reside within a local area network (LAN) that interfaces to the network via a leased line (T1, D3, etc.). Such communication methods are well known in the art and are covered in a variety of standard texts. See, e.g., Gilbert Held, "Understanding Data Communications" (1996), hereby incorporated by reference.

The computing units may be connected with each other via a data communication network. The network may be a public network and assumed to be insecure and open to eavesdroppers. In the illustrated implementation, the network may be embodied as the Internet. In this context, the computers may or may not be connected to the Internet at all times. For instance, the customer computer may employ a modem to occasionally connect to the Internet, whereas the bank computing center might maintain a permanent connection to the Internet. Specific information related to the protocols, standards, and application software utilized in connection with the Internet may not be discussed herein. For further information regarding such details, see, for example, Dilip Naik, "Internet Standards and Protocols" (1998); "Java 2 Complete," various authors (Sybex 1999); Deborah Ray and Eric Ray, "Mastering HTML 4.0" (1997); Loshin, "TCP/IP Clearly Explained" (1997). All of these texts are hereby incorporated by reference.

It may be appreciated that many applications of the present invention may be formulated. One skilled in the art may appreciate that a network may include any system for exchanging data or transacting business, such as the Internet, an intranet, an extranet, WAN, LAN, satellite communications, and/or the like. It is noted that the network may be implemented as other types of networks, such as an interactive television (ITV) network. The users may interact with the system via any input device such as a keyboard, mouse, kiosk, personal digital assistant, handheld computer (e.g., Palm Pilot®), cellular phone and/or the like. Similarly, the invention may be used in conjunction with any type of personal computer, network computer, workstation, minicomputer, mainframe, or the like running any operating system such as any version of Windows, Windows NT, Windows2000, Windows 98, Windows 95, MacOS, OS/2, BeOS, Linux, UNIX, Solaris or the like. Moreover, although the invention is frequently described herein as being implemented with TCP/IP communications protocols, it may be readily understood that the invention may also be implemented using IPX, Appletalk, IP-6, NetBIOS, OSI or any number of existing or future protocols. Moreover, the present invention contemplates the use, sale or distribution of any goods, services or information over any network having similar functionality described herein.

In accordance with various embodiments of the invention, the Internet Information Server, Microsoft Transaction Server, and Microsoft SQL Server, are used in conjunction with the Microsoft operating system, Microsoft NT web server software, a Microsoft SQL database system, and a Microsoft Commerce Server. Additionally, components such as Access or SQL Server, Oracle, Sybase, Informix MySQL, Interbase, etc., may be used to provide an ADO-compliant database management system. The term "webpage" as it is used herein is not meant to limit the type of documents and applications that might be used to interact with the user. For example, a typical website might include, in addition to standard HTML documents, various forms, Java applets, Javascript, active server pages (ASP), common gateway interface scripts (CGI), extensible markup language (XML), dynamic HTML, cascading style sheets (CSS), helper applications, plug-ins, and/or the like.

The financial transaction device (e.g., smart card, magnetic stripe card, bar code card, optical card, biometric device, radio frequency fob or transponder and/or the like) may communicate to the merchant, information from one or more data sets associated with the financial transaction device. In one example, membership data and credit card data associated with an account or card may be transmitted using any conventional protocol for transmission and/or retrieval of information from an account or associated transaction card (e.g., credit, debit, loyalty, etc.). In one exemplary embodiment, the transaction device may be configured to communicate via RF signals. As such, the data contained on the instrument may be communicated via radio frequency signals.

A financial transaction device may include one or more physical devices used in carrying out various financial transactions. For example, a financial transaction device may include a rewards card, charge card, credit card, debit card, prepaid card, telephone card, smart card, magnetic stripe card, radio frequency card/transponder and/or the like. In yet another exemplary embodiment of the present invention, a financial transaction device may be an electronic coupon, voucher, and/or other such instrument.

The financial transaction device in accordance with this invention may be used to pay for acquisitions, obtain access, provide identification, pay an amount, receive payment, redeem reward points and/or the like. In the radio frequency ("RF") embodiments of the transaction device, instrument to instrument transactions may also be performed. See, for example, Sony's "Near Field Communication" ("NFC") emerging standard which is touted as operating on 13.56 MHz and allowing the transfer of any kind of data between NFC enabled devices and across a distance of up to twenty centimeters. See also, Bluetooth chaotic network configurations; described in more detail at http://www.palowireless.com/infotooth/whatis.asp, which is incorporated herein by reference. Furthermore, data on a first RF device may be transmitted directly or indirectly to another RF device to create a copy of all or part of the original device.

Furthermore, financial transaction device as described herein may be associated with various applications which allow the financial transaction devices to participate in various programs, such as, for example, loyalty programs. A loyalty program may include one or more loyalty accounts. Exemplary loyalty programs include frequent flyer miles, on-line points earned from viewing or purchasing products or websites on-line and programs associated with diner's cards, credit cards, debit cards, hotel cards, calling cards, and/or the like. Generally, the user is both the owner of the transaction card account and the participant in the loyalty program; however, this association is not necessary. For example, a participant in a loyalty program may gift loyalty points to a user who pays for a purchase with his own transaction account, but uses the gifted loyalty points instead of paying the monetary value.

For more information on loyalty systems, transaction systems, and electronic commerce systems, see, for example, U.S. Utility patent application Ser. No. 10/304,251, filed on Nov. 26, 2002, by inventors Antonucci, et al., and entitled "System and Method for Transfer of Loyalty Points"; U.S. Continuation-In-Part patent application Ser. No. 10/378,456, filed on Mar. 3, 2003, by inventors Antonucci, et al., and entitled "System and Method for the Real-Time Transfer of Loyalty Points Between Accounts"; U.S. patent application Ser. No. 09/836,213, filed on Apr. 17, 2001, by inventors Voltmer, et al., and entitled "System And Method For Networked Loyalty Program"; U.S. Continuation-In-Part patent application Ser. No. 10/027,984, filed on Dec. 20, 2001, by inventors Ariff, et al., and entitled "System And Method For Networked Loyalty Program"; U.S. Continuation-In-Part patent application Ser. No. 10/010,947, filed on Nov. 6, 2001, by inventors Haines, et al., and entitled "System And Method For Networked Loyalty Program"; U.S. Continuation-In-Part patent application Ser. No. 10/084,744, filed on Feb. 26, 2002, by inventors Bishop, et al., and entitled "System And Method For Securing Data Through A PDA Portal"; the Shop AMEX™ system as disclosed in Ser. No. 60/230,190, filed Sep. 5, 2000; the Loyalty As Currency™ and Loyalty Rewards Systems disclosed in Ser. No. 60/197,296, filed on Apr. 14, 2000, Ser. No. 60/200,492, filed Apr. 28, 2000, Ser. No. 60/201,114, filed May 2, 2000; a digital wallet system disclosed in U.S. Ser. No. 09/652,899, filed Aug. 31, 2000; a stored value card as disclosed in Ser. No. 09/241,188, filed on Feb. 1, 1999; a system for facilitating transactions using secondary transaction numbers disclosed in Ser. No. 09/800,461, filed on Mar. 7, 2001, and also in related provisional application Ser. No. 60/187,620, filed Mar. 7, 2000, Ser. No. 60/200, 625, filed Apr. 28, 2000, and Ser. No. 60/213,323, filed May 22, 2000, all of which are herein incorporated by reference. Other examples of online loyalty systems are disclosed in Netcentives U.S. Pat. No. 5,774,870, issued on Jun. 30, 1998, and U.S. Pat. No. 6,009,412, issued on Dec. 29, 1999, both of which are hereby incorporated by reference.

Further still, a "code," "account," "account number," "identifier," "loyalty number" or "membership identifier," as used herein, includes any device, code, or other identifier/indicia suitably configured to allow the consumer to interact or communicate with the system, such as, for example, authorization/access code, personal identification number (PIN), Internet code, other identification code, and/or the like that is optionally located on a rewards card, charge card, credit card, debit card, prepaid card, telephone card, smart card, magnetic stripe card, bar code card, radio frequency card and/or the like. The account number may be distributed and stored in any form of plastic, electronic, magnetic, radio frequency, audio and/or optical device capable of transmitting or downloading data from itself to a second device. A customer account number may be, for example, a sixteen-digit credit card number, although each credit provider has its own numbering system, such as the fifteen-digit numbering system used by an exemplary loyalty system. Each company's credit card numbers comply with that company's standardized format such that the company using a sixteen-digit format may generally use four spaced sets of numbers, as represented by the number "0000 0000 0000 0000." The first five to seven digits are reserved for processing purposes and identify the issuing bank, card type and etc. In this example, the last sixteenth digit is used as a sum check for the sixteen-digit number. The intermediary eight-to-ten digits are used to uniquely identify the customer. In addition, loyalty account numbers of various types may be used.

Further yet, the "transaction information" in accordance with this invention may include the nature or amount of transaction, as well as, a merchant, user, and/or issuer identifier, security codes, or routing numbers, and the like. In various exemplary embodiments of the present invention, one or more transaction accounts may be used to satisfy or complete a transaction. For example, the transaction may be only partially completed using the transaction account(s) correlating to the application tenant information stored on the transaction device with the balance of the transaction being completed using other sources. Cash may be used to complete part of a transaction and the transaction account associated with a user and the transaction device, may be used to satisfy the balance of the transaction. Alternatively, the user may identify which transaction account, or combination of transaction accounts, stored on the transaction device the user desires to complete the transaction. Any known or new methods and/or systems configured to manipulate the transaction account in accordance with the invention may be used.

In various exemplary embodiments, the financial transaction device may be embodied in form factors other than, for example, a card-like structure. As already mentioned, the financial transaction device may comprise an RF transponder, a speed pass, store discount card, or other similar device. Furthermore, the financial transaction device may be physically configured to have any decorative or fanciful shape including key chains, jewelry and/or the like. The financial transaction device may furthermore be associated with coupons. A typical RF device which may be used by the present invention is disclosed in U.S. application Ser. No. 10/192,488, entitled "SYSTEM AND METHOD FOR PAYMENT USING RADIO FREQUENCY IDENTIFICATION IN CONTACT AND CONTACTLESS TRANSACTIONS," and its progeny, which are all commonly assigned, and which are all incorporated herein by reference.

As used herein, the term "data set" may include any set of information and/or the like which may be used, for example, in completing a transaction. For example, data sets may include information related to credit cards, debit cards, membership clubs, loyalty programs, speed pass accounts, rental car memberships, frequent flyer programs, coupons, tickets and/or the like. This information may include membership identifiers, account number(s), personal information, balances, past transaction details, account issuer routing number, cookies, identifiers, security codes, and/or any other information. The data set may additionally include an issuer defined management process for determining which subsets of data are to be provided to an issuer or merchant. In some instances, a data set may be associated with one or more account numbers corresponding to accounts maintained by the account issuer.

The various data sets associated with a financial transaction device may either be stored on the financial transaction device itself or remotely. In one exemplary embodiment, the financial transaction device itself is configured to store at least two data sets. In other exemplary embodiments, data sets may be stored in one or more databases and the data sets are affiliated with the financial transaction device. For example, a central database on the instrument may store multiple distinct data sets correlated with a unique issuer. The data sets stored on the remote database may be stored thereon, in such a manner as to mimic the corresponding data sets stored on the transaction device. The multiple distinct data sets may be accessed, for example, by a merchant system, whether stored on the transaction device or remote database stand alone device, and/or a computer user interface, via a network. In this example, the financial transaction device may include one or more user identifiers (e.g., membership identifiers), which may be used to provide access to a subset of data included on the financial transaction device.

Various information and data are described herein as being "stored." In this context, "stored" may mean that the information is kept on a database. In accordance with the invention, a database may be any type of database, such as relational, hierarchical, object-oriented, and/or the like. Common database products that may be used to implement the databases include DB2 by IBM (White Plains, N.Y.), any of the database products available from Oracle Corporation (Redwood Shores, Calif.), Microsoft Access or MSSQL by Microsoft Corporation (Redmond, Wash.), or any other database product. A database may be organized in any suitable manner, including as data tables or lookup tables. Association of certain data may be accomplished through any data association technique known and/or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

Although all data sets associated with a particular financial transaction device may be owned by the same owner, it is contemplated that in general, some of the data sets stored on the financial transaction device have different owners. Furthermore, the storage of data sets is configured to facilitate independent storage and management of the data sets on the financial transaction device. Further still, the data sets may be stored in distinct differing formats provided by the distinct issuer or data set owner (also called "issuer," herein). The owners of data sets may include different individuals, entities, businesses, corporations, software, hardware, and/or the like. However, one skilled in the art will appreciate that the owners may also include different divisions or affiliates of the same corporation or entity.

A data set may contain any type of information stored in digital format. For example, a data set may include account numbers, programs/applications, scripts, cookies, instruments for accessing other data sets, and/or any other information.

As discussed above, many issuers of existing financial transaction devices utilize predetermined formats for account numbers, data and/or applications stored in association with the financial transaction device. Similarly, the data storage media associated with these financial transaction devices are typically configured to accommodate specific predetermined data formats. Thus, since the data format associated with a first issuer is often different from a data format of a second issuer, storage of multiple distinct data of differing formats on a single device provides complications for conventional systems. This is true since, each issuer typically maintains an account processing system that uses a processing protocol different from other issuers, and the information stored on the transaction card relative to the issuer must be formatted accordingly. As such, to ensure the security and integrity of the issuer-owned data, the loading of data on a transaction device is typically performed by an issuer or a third-party provider who typically uploads all related and similarly formatted data sets onto the transaction device. However, since the third party may typically only be authorized by the issuer to load issuer-owned data of similar format onto an issuer-provided transaction device, including differently formatted data sets on a single transaction device by the third party is often not permitted. More particularly, independent owners of data sets are often reluctant to conform their data set formats to a "standard format" because of the security advantages of maintaining a separate, distinct, often secreted format.

In contrast, and in accordance with an exemplary embodiment of the present invention, the format of the information stored in the present invention may vary from one data set to another. That is, the present invention permits the data to be stored on the financial transaction device in any format, and more particularly, in any format recognizable by the data owner/transaction device issuer. Thus, as noted, each data set may be used for a very wide variety of purposes including storage of applications, raw data, cookies, coupons, membership data, account balances, loyalty information, and/or the like.

In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); block of binary (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a Block of Binary (BLOB). Thus, any binary information can be stored in a storage space associated with a data set. As discussed above, the binary information may be stored on the financial transaction device or external to but affiliated with the financial transaction device. The BLOB method may store data sets as ungrouped data elements formatted as a block of binary via a fixed memory offset using either fixed storage allocation, circular queue techniques, or best practices with respect to memory management (e.g., paged memory, memory recently used, etc.). By using BLOB methods, the ability to store various data sets that have different formats facilitates the storage of data associated with the financial transaction device by multiple and unrelated owners of the data sets. For example, a first data set which may be stored may be provided by a first issuer, a second data set which may be stored may be provided by an unrelated second issuer, and yet a third data set which may be stored, may be provided by a third issuer unrelated to the first and second issuers. Each of these three exemplary data sets may contain different information that is stored using different data storage formats and/or techniques. Further, each data set may contain subsets of data which also may be distinct from other subsets.

Even further, where the invention contemplates the use of a self-service user interaction device. In this context, the self-service user interaction device may be any device suitable for interacting with a transaction device, and receiving information from the transaction device user and providing the information to a merchant, account issuer, account manager, data set owner, merchant point of sale, and the like. For example, the self-service user interaction device may be a stand alone read write device, self-service kiosk, merchant point of sale, read/write device, and the like. In one example, the self-service user interaction device may be configured to communicate information to and from the transaction device and to manipulate the data sets stored thereon. The self-service interaction device may be in communication with the various components of the invention using any communications protocol.

In general, systems and methods disclosed herein, are configured to facilitate the management of multiple distinct data sets associated with a financial transaction device. Management of data sets may include such steps as adding, augmenting, updating and/or deleting data sets associated with the financial transaction device. Such manipulations of the data may occur without replacing or reissuing the financial transaction device. With reference to FIG. 1, an exemplary method 100 according to the present invention is shown. Method 100 may include issuing a financial transaction device issued to a transaction device user (step 110), enrolling multiple data set owners in a multiple account on a transaction device program (step 112), and managing data sets associated with the financial transaction device (step 120). In managing the data, the method 100 may determine, for example, whether the data should be added to a data set (step 130), modified (step 140) or deleted (step 150), as described more fully below. Once the data is appropriately managed, the financial transaction device user may present the data contained on the instrument to a merchant system for completion of a transaction.

The system may be further configured such that, during an exemplary transaction, data sets associated with the financial transaction device may be managed. For example, the user may be prompted (e.g., on a screen, by electronic voice, by a store clerk, by a signal and/or the like) as to the possibility of adding, for example, a loyalty account to the same financial transaction device and the user may also be presented with terms and/or conditions in a similar or different manner. The user may be prompted at any time during the transaction, but preferably the user is prompted at the completion of the transaction. If the user accepts the invitation to add data to the financial transaction device, a new data set may be added (step 130) and/or an existing data set is updated (step 140). For example, if data is to be updated, the stand alone may locate appropriate data to be updated on the transaction device, and make the updates ("modifications") in accordance with data owner instructions. If the data is to be added, the stand alone device may be configured to provide any account information (e.g., account identifier, security code, data owner routing number, etc.) to the transaction device for storage thereon. The stand alone may locate an appropriate database location on transaction device for storing the added data. The stand alone device facilitates storage of the data in a distinct location on the transaction device database, where the data is stored independently of any other data. In a preferred embodiment of the invention, the data is added to a database location on the transaction device which reserved for independently storing all data owned by a particular data set owner. Alternatively, the data may be stored in a distinct location on the transaction device, which is a separate location than is used to store any other data set. Further still, the data set is stored in accordance with any storage protocol permitting the data to be stored and retrieved independently of other data.

The adding and updating of the data may be verified by the issuer, prior to making the modifications. If verified, all databases containing the data set to be updated or a mirror image of the data set to be updated, are modified in accordance with the user or issuer provided instructions, and/or the issuer defined data storage protocol or format.

In one exemplary embodiment, multiple account issuers may be enrolled in a multiple account management program using a financial transaction device in accordance with the invention (step 112). For example, permission for adding account issuer owned data may be obtained from the data set owner. The data set owner may then be requested to provide account information to be stored on a transaction device. The data set owner may then provide account information relative to a distinct user account for loading onto the transaction device in accordance with the present invention. The issuers may be enrolled prior to issuance of the instrument or the issuers may be enrolled after issuance. By enrolling in the management program, the issuer may provide authorization for including the issuer-owned data on the financial transaction device. The issuer-owned data may be included (e.g., added, deleted, modified, augmented, etc.) on the transaction device using a stand alone interaction device, merchant system, or user personal computer interface upon presentment of the transaction device to the stand alone interaction device 290 (step 114). The stand alone interaction device may manipulate the issuer-owned data while preserving a format recognizable by an issuer account management system. For example, the stand alone device may identify the appropriate header or trailer associated with the data and add, delete or modify the data accordingly. The stand alone may manipulate the data using any manipulation instruction or protocol as provided by the data set owner so that the resulting manipulated data is in a format recognizable by the data set owner system. In this way, the stand alone device may manipulate the data while maintaining the data set owner's format. Alternatively, the interaction device may store the issuer-owned data on the transaction device in any format, provided that the issuer-owned data is provided to the issuer system (or to merchant system) in an issuer system (or merchant system) recognizable format.

It should be noted, that the financial transaction device may be issued with or without one or more data sets stored thereon. The financial transaction device may be issued using various techniques and practices now known or hereinafter developed wherein an instrument is prepared (e.g., embossed and/or loaded with data) and made available to a user for effecting transactions. Although the present invention may contemplate managing data sets (step 120) before issuing a financial transaction device (step 110), in various exemplary embodiments, by way of illustration, the data sets are described herein as being managed (step 120) after issuance (step 110).

At any time after issuance (step 110) of the financial transaction device, the financial transaction device may be used in a commercial transaction. In one exemplary embodiment of the present invention, a user communicates with a merchant, indicates a desire to participate in a issuer provided consumer program. The user may communicate with the merchant by, for example, presenting the transaction device to the merchant and indicting a desire to complete a transaction. The user may indicate his desire to complete a transaction using any conventional process used by the merchant. The user may further indicate that the user wished to complete the transaction using the financial transaction device.

During completion of the transaction, the user may present the financial transaction device to a merchant system. The financial transaction device is configured to communicate with the merchant, using any conventional method for facilitating a transaction over a network.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction device. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set (e.g., LOADED, INITIALIZED, READY, BLOCKED, REMOVABLE, or DELETED). Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified merchants are permitted to access the data set for reading, and others are altogether excluded from accessing the data set. However, other access restriction parameters may also be used allowing various entities to access a data set with various permission levels as appropriate.

The data, including the header or trailer may be received from a data set owner via any communication method described herein. The header or trailer may be appended to a data set to be modified, added or deleted, to indicate the action to be taken relative to the data set. The data set owner may provide the to a stand alone interaction device configured to add, delete, modify, or augment the data in accordance with the header or trailer. As such, in one exemplary embodiment, the header or trailer is not stored on the transaction device along with the associated issuer-owned data but instead the appropriate action may be taken by providing to the transaction device user at the stand alone device, the appropriate option for the action to be taken. However, the present invention contemplates a data storage arrangement wherein the header or trailer, or header or trailer history, of the data is stored on the transaction device in relation to the appropriate data.

In various exemplary embodiments, the steps of adding, deleting, augmenting and/or modifying data sets may be repeated. For example, first, second, and additional data sets may be added (step 130) to the financial transaction device in any order. In one exemplary embodiment of the present invention, the first data set is owned by a first data set owner (i.e., first issuer) and the second data set is owned by a second data set owner (i.e., second issuer). Furthermore, the system may include replacing a first data set with a subsequent data set by deleting a data set (step 150), then adding a data set (step 130).

Figure 2:
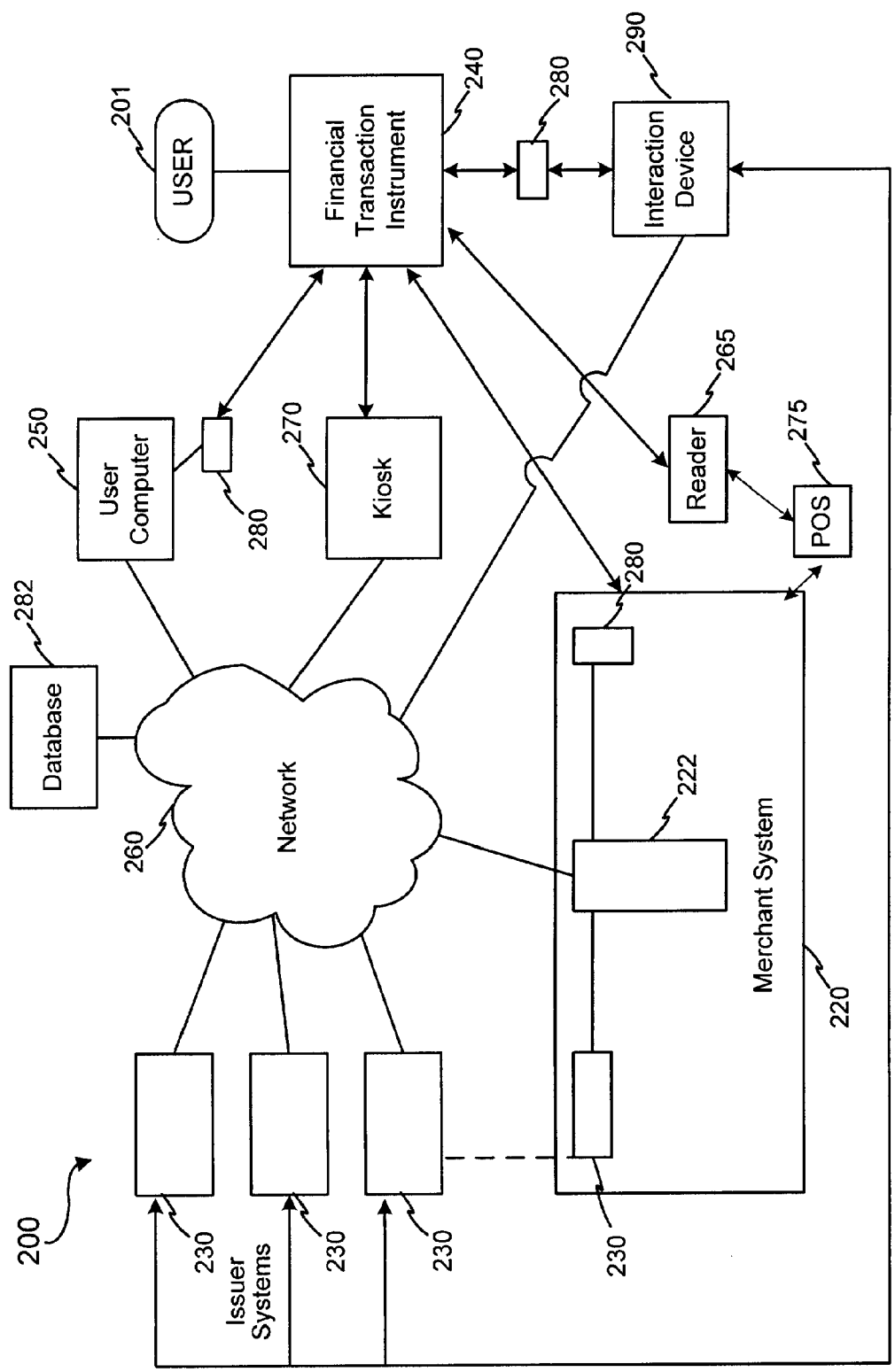
FIG. 2 illustrates a block diagram overview of an exemplary data set management system in accordance with an exemplary embodiment of the present invention.

With reference now to FIG. 2, in one exemplary embodiment of the present invention, a data set management system ("management system") 200 comprises a merchant system 220, various issuer systems 230, and a financial transaction device 240. Management system 200 may further be accessed by a user 201 on a self-service interaction device, such as, for example, user computer 250 or via a transaction device such as, for example, kiosk 270, stand alone interaction device 290, automated teller, or the like. In these examples, communications between user computer 250 or kiosk 270 and merchant system 220 or issuer systems 230 may take place via, for example, a network 260. In various embodiments, merchant system 220, user computer 250 and/or kiosk 270 are configured to communicate with financial transaction device 240. For example, communication with the financial transaction device 240 may be facilitated by a point of read/write device 280, such as a merchant point of sale, merchant RFID reader, computer interface, or the like, configured to receive information provided by the financial transaction device 240.

In general, merchant system 220 is configured to interact with a user 201 attempting to complete a transaction, and to communicate transaction data to one or more of issuer systems 230. Issuer systems 230 are configured to interact with financial transaction device 240 to receive and/or exchange data facilitating a transaction. Merchant system 220 may be operated, controlled and/or facilitated by any merchant that accepts payment via a transaction device.

Merchant system 220 is configured to facilitate interaction with user 201, which may be any person, entity, software and/or hardware. The user 201 may communicate with the merchant in person (e.g., at the box office), or electronically (e.g., from a user computer 250 via network 260). During the interaction, the merchant may offer goods and/or services to the user 201. The merchant may also offer the user 201 the option of completing the transaction using a financial transaction device. The merchant system may provide the options to the user 201 using interactive user interface, suitable website or other Internet-based graphical user interface that is accessible by users.

Each user 201 may be equipped with a computing system to facilitate online commerce transactions. For example, the user 201 may have a computing unit in the form of a personal computer (e.g., user computer 250), although other types of computing units may be used including laptops, notebooks, hand held computers, set-top boxes, and/or the like. The merchant system 220 may have a computing unit 222 implemented in the form of a computer-server, although other implementations are possible. The issuer system 230 may have a computing center such as a main frame computer. However, the issuer computing center may be implemented in other forms, such as a mini-computer, a PC server, a network set of computers, or the like.

Issuer system 230 may be configured to manipulate a transaction account associated with the corresponding issuer-owned data stored on the transaction device 240 (or database 282, discussed below) in accordance with a related transaction. For example, the issuer system 230 may receive "transaction information" and manipulate an account status or balance in accordance with the information received. In accordance with the transaction amount, the issuer system 230 may, for example, diminish a value available for completing a transaction associated with the account, or the issuer system 230 may alter the information relative to the account user (e.g., demographics, personal information, etc.).

It should be noted that issuer systems 230 may also be configured to interact with financial transaction device 240, directly or indirectly via database 282 or stand alone interaction device 290, to individually manage data sets on financial transaction device 240. For example, issuer systems 230 may manage data sets on database 282. In some embodiments, the data sets on database 282 may then be stored on financial transaction device 240 when the transaction device is presented. In other embodiments, issuer systems 230 may store data set information within their own systems which may communicate with the financial transaction device via user computer 250, kiosk 270, or merchant system 220. In such embodiments, the issuer system 230 may be configured to push the data set to the financial transaction device 240 via the stand alone interaction device 290, or the merchant system 220, kiosk 270, interaction device 290 or computer 250 which may be configured to pull such information from the issuer system 230.

In addition, the data may be manipulated using, for example, a stand alone interaction device 290 configured to communicate with at least one of the issuer systems 230 which may or may not be configured to communicate with a merchant system 220. The interaction device 290 may communicate with the issuer systems 230 using any of the aforementioned communication protocols, techniques and data links. The communication between the stand alone interaction device 290 and the issuer system 230 may be facilitated by a network 260. In an exemplary embodiment, the network 260 may be secure against unauthorized eavesdropping.

Interaction device 290 may provide instructions to the issuer systems 230 for requesting receipt of issuer-owned data, such as for example, account data, user member identification data, member demographic data, or the like, which the issuer wishes to store on the financial transaction device 240. The interaction device 290 may communicate with the issuer systems 230 using an issuer recognizable communications protocol, language, methods of communication and the like, for providing and receiving data. In one exemplary embodiment, issuer-owned data is received by the interaction device 290 from issuer systems 230, and stored onto the financial transaction device 240. The data may be stored or manipulated in accordance with the issuer provided instructions, protocol, storage format, header or trailers received by the interaction device from issuer systems 230. The issuer-owned data may be stored on the financial transaction device 240 in any format recognizable by a merchant system 220, and further recognizable by issuer system 230. In one exemplary embodiment, the issuer owned data is stored using a issuer system 230 format which may be later formatted in merchant system 220 recognizable protocol when provided to the merchant system 220. In one embodiment, the issuer-owned information is stored on the financial transaction device 240 in the identical format with which it was provided by the issuer system 230. In that regard, interaction device 290 may be any device configured to receive issuer-owned data from an issuer system 230, and write the data to a database, such as, for example, a database on transaction device 240 or database 282. Further, as described more fully below, the issuer-owned information may also be provided by the issuer system 230 to a remote database 282 where the information is stored such that it mirrors the corresponding information stored on the transaction device 240.

Interaction device 290 may be initialized prior to use. For example, the interaction device 290 may be any system which may be initialized ("configured") to communicate with a merchant system 220. Where the interaction device is not initialized prior to attempting communications with the merchant system 220 or transaction device 240, the interaction device 290 may be initialized at the merchant system 220 location. The interaction device 290 may be initialized using any conventional method for configuring device communication protocol.

As noted, in accordance with the invention a transaction device is provided which permits the storage and presentment of at least one of a plurality of data sets for completing a transaction. The data sets may be stored on the transaction device itself, or on a remote database, as described below. The data sets stored with regard to the transaction device may be modified, deleted, added or augmented, as required by the issuer or the user. For example, as owner of the data, an issuer may modify a data set at the issuer's discretion. The issuer may modify the data, data subsets, member identifier and/or applications or data sets associated with its transaction account program. Such modifications may be completed or substantially completed in substantially real-time or at a later date, for example, when the transaction device is next presented.

In a typical example of issuer modification of the data sets, one or more data sets may be modified by the issuer system 230 directly via the issuer systems 230, upon presentment of the financial transaction device 240 to the system 230. That is, the user 201 may present the card to the issuer system 230, and the issuer system 230 may modify the issuer data stored thereon, using any issuer defined protocol. Alternatively, the modifications, or instructions for modification, may be initiated at the issuer system 230, and provided to the network 260. The modifications and/or modification instructions may additionally be provided to a suitable device configured to communicate with the transaction device 240, receive information regarding the data stored on transaction device 240, and to write or overwrite the information contained on transaction device 240. For example, as noted, interaction device 290 is a suitable interaction device which may be used to provide information to the transaction device 240 to modify the information stored thereon. Interaction device 290 may be any device capable of receiving data management instructions from the issuer systems 230 and for updating the data stored on the transaction device 240, in accordance with the instructions received. In this regard, the interaction device 290 may include any electronic components, databases, processors, servers and the like which may be used to modify the data stored on transaction device 240 using any suitable data modification protocol as is found in the art. Preferably, the interaction device is configured to modify the data on the transaction device in accordance with a data owner defined protocol.

In one exemplary embodiment, the interaction device 290, may be configured to modify the transaction device's 240 issuer-owned data when the transaction device 240 is initially configured, prior to providing the transaction device 240 to the user 201. The interaction device 290 may additionally be configured to modify the issuer data on the transaction device 240 when the transaction device 240 is next presented, for example, to the stand alone interaction device 290. In this regard, the interaction device 290 may receive from multiple distinct issuer systems 230, via the network 260, the issuer provided modifications/instructions and may update the transaction device 240 in real-time or substantially real-time. The modifications may be provided to the interaction device 290 for storage and later use when the transaction device 240 is next presented. Alternatively, the interaction device 290 may be configured to retrieve the instructions from the issuer system 230 when the transaction device 240 is next presented to device 290. Further, where other devices, such as, for example, a kiosk 270, merchant point of sale device, or the like, are likewise configured to modify the issuer data on transaction device 240, the invention contemplates that the real-time or substantially real-time modifications noted above may be made using those devices in similar manner as is described with the interaction device 290.

Alternatively, the device to which the transaction device 240 may be presented, may not be equipped for updating or modifying the data stored on the transaction device 240. For example, merchant system 220 may be any conventional merchant system which communicates to an issuer system 230, and which permits a user 201 to complete a financial transaction, but which is not configured to modify the issuer data contained on the transaction device 240. In general, conventional merchant systems are not configured to write or overwrite data included on the payment devices presented to the merchant system for processing. That is, the merchant system 220 may include little or no additional software to participate in an online transaction supported by network 260. Management of the data sets on transaction device 240 may be performed independent of the operation of the merchant system 220 (e.g., via issuer system 230 or interaction device 290). As such, the present invention may require no retrofitting of the merchant system 220, to accommodate system 200 operation. Thus, where the merchant system 220 is not configured to modify the data on the transaction device 240, such modifications may be made as described above with respect to modifications being made at the interaction device 290 or by the issuer at the issuer system 230.

The merchant system 220, kiosk 270, interaction device 290, may include additional means for permitting the transaction device user 201 to self-manage the data stored on the transaction device 240. In this case, the systems 220, 270, and 290 may include an additional user interface for use by the user 201 to identify the modification action to be taken. Where the systems 220, 270, and 290 are configured to communicate with the transaction device 240 and to modify the data thereon, the modifications may be completed or substantially completed in real-time or substantially real-time. For example, the user 201 may present the transaction device 240 to one of the systems 220, 270, or 290, provide instructions to the system 220, 270, or 290 for modifying the data on transaction device 240. The instructions may include, for example, "ADD," "DELETE," MODIFY," and the system 220, 270, or 290 may modify the data stored on the transaction device 240 in accordance therewith. The modifications may be made on the instrument in real-time or substantially real-time, for example, prior to permitting the transaction device 240 to be used by the user 201. Alternatively, the modifications or instructions for modification may be provided by the user 201 to the merchant system 220 or kiosk 270, and the merchant system 220 or kiosk 270 may further provide the modifications/instructions to the network 260 for use in later modifying the data. For example, the modifications/instructions may be provided by system 220 or 270 to the issuer system 230 managed by the issuer owning the data to be modified. The issuer system 230 may provide the modifications to, for example, interaction device 290, for updating the transaction device 240 when next presented. The modifications/instructions may additionally be provided from the network 260 to a remote database, where the issuer-owned data corresponding to the transaction device and the issuer may be additionally stored (i.e., database 282, described below). In one exemplary embodiment, the modifications/instructions may be stored at the issuer system 230, until such time as the transaction device 240 is next presented to a device configured to modify the data on the instrument. Once presented, the modifications/instructions may be provided to the device (e.g., computer 250, interaction device 290, etc.) for modifying the transaction device 240 data.

In another exemplary embodiment, the user 201 may self-manage the data sets by, for example, modifying the data sets using a conventional computer system 250, which may be in communication with the network 260. Computer system 250 may or may not be configured to interact with financial transaction device 240. Where the computer system 250 is not configured to interact with the transaction device 240, the user 201 may provide modifications or instructions to the issuer system 230 for later use in modifying the corresponding transaction device 240 data, for example, when the transaction device 240 is next presented in similar manner as described above. Where the computer 250 is configured to interact with the financial transaction device 240 to modify the data stored thereon, the user 201 may provide modifications/instructions to the computer 250 for modifying the data on the financial instrument in real-time or substantially real-time. That is, the computer 250 may be configured to interact with, read, add, delete, and/or modify the data sets on the transaction device 240. Consequently, the computer 250 may receive modifications/instructions from the user 201 and perform the modifications accordingly, and may modify the data in real-time or substantially real-time. The computer 250 may additionally be configured to receive authorization of the modifications/instructions from issuer system 230 prior to making the user 201 requested changes. In one exemplary arrangement, the user 201 may provide the modifications/instructions via the network 260 which may be additionally provided to the issuer system 230. The issuer system 230 may receive the user 201 modifications/instructions and verify whether the identified updates are available to the user 201 or if the identified updates are valid. If the identified updates are authorized, the issuer system 230 may update a data storage area associated with the transaction device 240. For example, the issuer system 230 may update an issuer database (not shown) containing data corresponding to the issuer-owned data associated with the transaction device 240. Alternatively, the issuer system 230 may provide modifications/instructions to a database positioned remotely to the issuer system 230 for use in modifying the data stored thereon, which is associated to the transaction device 230. As such, in accordance with the present invention, a user 201 may self-manage the data via, for example, the user computer 250, a kiosk 270, a merchant system 220, and/or a stand alone interaction device 290.

In one exemplary method of self-management, a user 201 logs onto a website via user computer 250, or onto a stand alone device, such as, for example, interaction device 290 or kiosk 270, and selects options for configuring data sets on a financial transaction device 240. The changes may be transmitted to the transaction device 240 via a instrument reader/writer device 280 configured to communicate the data to transaction device 240. In this context, the reader/writer device 280 may be any conventional transaction device reader or writer.

As noted, modifications to the data stored on the financial transaction device 240 may be made in real-time or substantially real-time when the transaction device 240 is presented to the interaction device 290, or to a reader/writer device 280. However, as noted, various embodiments of the invention include a remote database 282 in communication with an issuer system 230 via a network 260. The remote database 282 may additionally be in communication with one of the user computer 250, kiosk 270, merchant system 220 and/or the interaction device 290, for variously receiving modifications or instructions for performing modifications to the data stored thereon. In addition, database 282 may contain a data storage area which "mirrors" the data stored on transaction device 240. In this context "mirrored" or "mirror" may mean that the data is stored on database 282 in substantially identical configuration and format as stored on the transaction device 240. As such, the present invention may be configured to permit modifications made to transaction device 240 data to be mimicked on corresponding data locations on database 282. For example, the user 201 may self-manage the data on the database 282 via a user interface in communication with the database 282 via the network 260. In one exemplary embodiment, the user 201 may communicate with a "website" which is used to manage the database 282, wherein database 282 is a database including unique locations for storing the issuer provided data and data sets correlative to the data and data sets stored on the transaction device 240. The website may include an account management application which permits the user 201 to select which user accounts to add, delete, or modify with respect to the transaction device 240. That is, the user 201 may provide unique identifying information to the user computer 250 which may be recognized by the system (e.g., issuer system 230 or remote system managing the database 282) managing database 282, thereby permitting the user 201 to access the data corresponding to the unique identifying information stored on database 282. Further, prior to permitting modifications to the database 282, the issuer owning the data may require authorization that such modifications may be performed. Further still, the present invention contemplates that database 282 may be self-managed by the user 201 in similar manner, where the merchant system 220, kiosk 270 and/or interaction device 290 are configured to provide modifications/instructions to the issuer systems 230 and database 282.

In another exemplary embodiment, database 282 serves as a temporary or redundant storage space for data sets. Thus, a "mirror image" of the data sets currently on the financial transaction device 240 may be maintained and/or updated at appropriate intervals for facilitating replacement of, for example, a damaged financial transaction device 240. As such, database 282 may be used, for example, for verifying the validity or accuracy of the information stored on the transaction device 240. Also, changes to one or more data sets may be stored to database 282 pending an opportunity to update the financial transaction device 240. In various embodiments, such updating may take place in both directions similar to hot sync technology.

As noted, in some exemplary embodiments of the invention, authorization must be obtained from issuer systems 230 prior to making any modifications to the data contained on transaction device 240 or database 282. Authorization may be obtained by requesting the authorization during the modification process. Authorization may be given where the user 201 provides the more appropriate security information, which is verified by the issuer system 230. The security information may be, for example, a security code granting access to the issuer-owned data on the transaction device 240 or database 282. For example, a point of sale (POS) machine may be configured to allow the input of a code, or an answer to a prompt which is provided to and verified by issuer system 230. Once verified the modification requested may be made to the data contained on the financial transaction device 240.

It should be noted that the authorization code may be used to permit the user 201 to select which issuer provided data to utilize for completion of a transaction. For example, a Point of sale Device (POI) device may be programmed to search the financial transaction device 240 for a data set containing a particular club membership data set, or to locate all available data sets for providing to a user 201 display available data sets to the user 201, thereby permitting the user 201 to select which data set to use to complete a transaction. If no data set is found, the POS device may alert the user 201 or prompt the merchant to alert the user 201 of the possibility of adding issuer-owned data to the financial transaction device 240. A positive response to this alert may cause the POS device to add an issuer data set to the transaction device 240.

It is noted that the user 201 may already be a member of a membership program managed by an issuer system 230 in which case the associated user 201 membership data may be assigned to user 201 for inclusion on transaction device 240. As such, the user 201 may be permitted to add the membership data set to the transaction device 240. Alternatively, the user may become a member by selecting to add the membership information to the financial transaction device 240, using the interactive device 290. In some embodiments, changes made to the data sets stored on the transaction device 240 may be updated to the financial transaction device 240 in real-time or substantially real-time, where the device 290 is in communication with the transaction device 240. Or the changes may be made the next time the user 201 presents the financial transaction device 240 to stand alone interaction device 290 or to a kiosk 270, merchant system 220, or the like.

In another exemplary embodiment of the present invention, merchant system 220, kiosk 270, and/or user computer 250 may be configured to interact with financial transaction device 240 via a read/write device 280. Read/write device 280 may be any device configured to communicate with financial transaction device 240. In one embodiment, read/write device 280 is configured to read and write to financial transaction device 240. For example, read/write device 280 may be a point of sale magnetic card reader/writer. In another example, where the transaction device 240 includes a RF transmitter/receiver for communicating with system 200, read/write device 280 may include a mating transponder configured to receive and transmit issuer-owned data. Read/write device 280 may be configured to select data sets for use by a merchant using any suitable selection technique including but not limited to proprietary commands or command sequences or use of ISO/IEC 7816-4 application selection sequences (e.g., GET command).

In one exemplary embodiment, management of data sets is facilitated by annotating the data set with a status indicator (e.g., condition header); (e.g., LOADED, INITIALIZED, READY, BLOCKED, REMOVABLE or DELETED).

In this regard, a data set may have a LOADED status when the information related to that data set has been stored in association with the financial transaction device 240, but remains dormant. For example, a credit card account may have been added to the financial transaction device 240 that has not yet been activated. In some instances, the loaded data set needs to be further configured before it is ready to be used. For example, the data set may be modified to include a particular branch in a chain of franchise stores, the identification of a user's 201 primary care physician, or to reflect a user's 201 selection of a platinum membership status. In another example, a loyalty program may be added in association with a financial transaction device 240, and the data set marked LOADED. In another example, the user 201 may interact with a kiosk 270 or the like to input personal information and configure the loyalty program data set. Once such a data set has been configured, it may be annotated with an INITIALIZED status.

The status of a data set may be set as READY when the data set is ready to be utilized. For example, a user 201 may enter a secret code to indicate that the user 201 is ready to use the data set. In one example, the data set may be marked as READY when that data set is first accessed to perform a transaction. It will be noted that in accordance with other embodiments of the present invention, the status of a data set may be set at READY the moment it is loaded to the financial transaction device 240. Furthermore, it is possible to change the status between READY, LOADED, and INITIALIZED, under appropriate circumstances. Thus, the data sets may be managed through any one or more of these states and in various orders.

It may also be desirable to prevent use of a data set and/or the associated functionality for a period of time. Thus, the status indicator may be set to BLOCKED. The setting of the status indicator to BLOCKED may, for example, disable the use of the data set. In one exemplary embodiment, an appropriately configured financial transaction device reader is configured to recognize the BLOCKED status indicator when accessing the data set and to prevent use of that data set example.

In addition, for various reasons, a user 201 may desire to remove a data set from a transaction card 240. The user 201 may, for example, desire to use the available space on the transaction card 240 for other data sets, or may remove the data set for security reasons. Furthermore, circumstances may arise where the owner of the data set desires to remove the data set from one or more transaction devices 240, such as when a coupon expires. In these instances, the data set may be marked as REMOVABLE. Under these circumstances, the memory associated with the data set is available to receive information associated with future added data sets, but for the moment retains the old data set. A REMOVABLE data set may again be made READY under various configurations.

The REMOVABLE data set may subsequently be removed from the financial transaction device 240 and marked DELETED. A DELETED status indicator may be used to indicate that a portion of the financial transaction device 240 is available to store one or more data sets. It is noted that data sets may be directly deleted without going through the step of making the data set REMOVABLE. In one example, a data set may be removed from the financial transaction device 240 if the security of the account associated with the data set is compromised (e.g., stolen password). Furthermore, as appropriate, the status of data sets may be changed to different states. Under appropriate circumstances one or more of any of the six status indicators LOADED, INITIALIZED, READY, BLOCKED, REMOVABLE, or DELETED or other suitable status indicators may be used to annotate a BLOB or other similar data set.

Although the data sets described herein may be managed without status indicators, nevertheless, such status indicators facilitate management of data. For example, regardless of a first data set owner's ability to interpret the information stored in a data set owned by another party, the first owner may interpret the status indicator to determine whether the data set is LOADED, DELETED, or the like. The determination that a data set is DELETED facilitates the addition of new data sets by independent owners without overwriting other data sets on the financial transaction device 240. In addition, the use of tags or status indicators may facilitate the use of global rules, which may simplify operations and/or commands. Status indicators may also enhance interoperability between data sets. Nevertheless, a data set owner may chose not to use a status indicator even if the opportunity is available.

Figure 3:
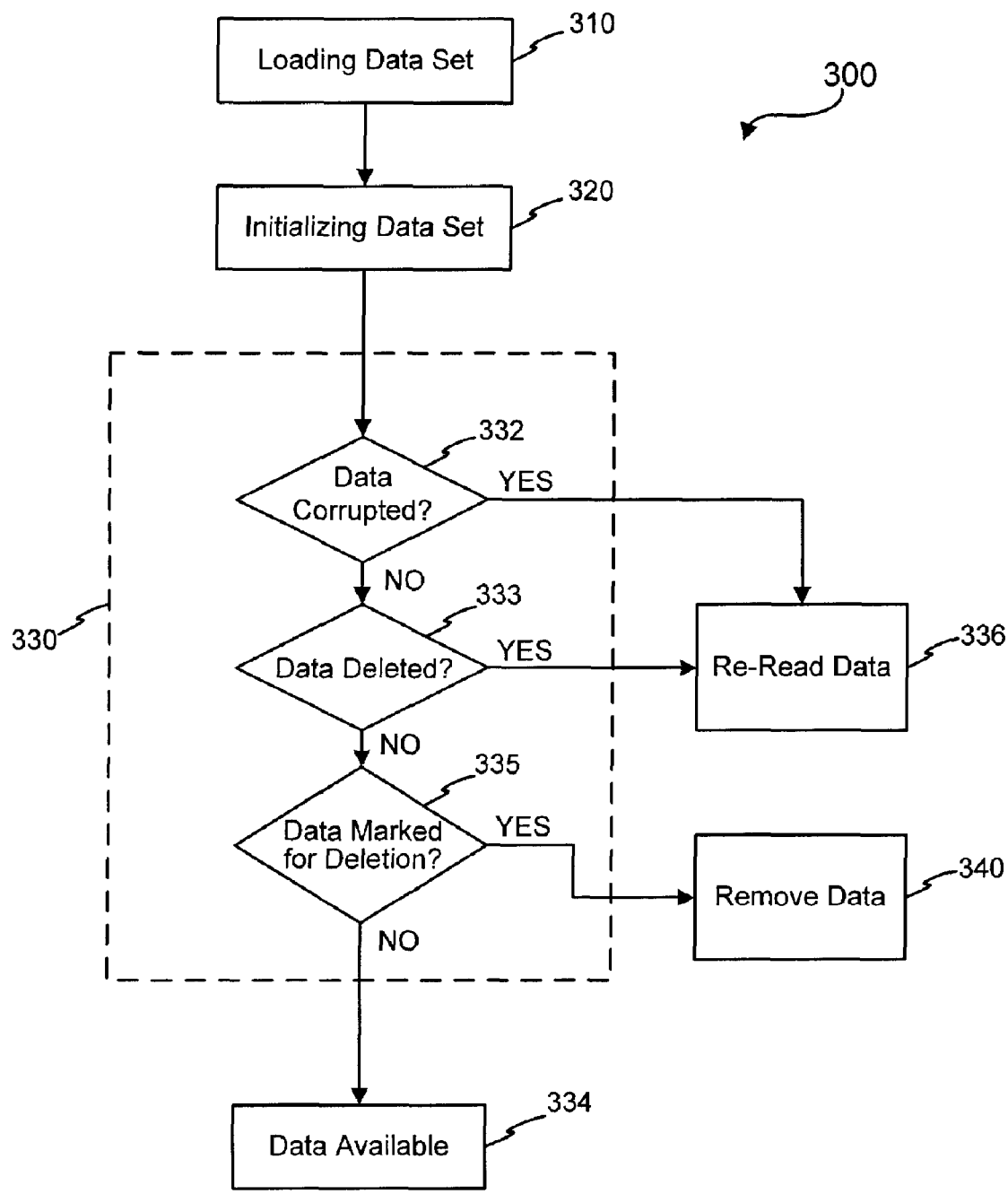
FIG. 3 illustrates a more detailed exemplary data set management method in accordance with an exemplary embodiment of the present invention.

Managing of the data sets (step 120) may include one or more of the following exemplary steps: add, update, modify, replace, verify, delete and/or the like. More particularly, FIG. 3 illustrates a general overview of an exemplary data set management method 300 comprising the steps of: loading a data set (step 310), initializing a data set (step 320), verifying availability of data set (step 330), and deleting a data set (step 340). In this manner, a data set may be added to a financial transaction device 240 and utilized until it is deleted. The adding and deleting steps are described in further detail with reference to FIGS. 4 and 5. Furthermore, the ability to update, modify, replace and/or delete a data set may be subject to security requirements.

In one embodiment, the various processes may include a user 201 facilitating the input of information into a data management system to cause the data set to be loaded. The information may be inputted via keypad, magnetic stripe, smart card, electronic pointer, touchpad and/or the like, into a user computer 250, POS terminal, kiosk 270, ATM terminal and/or directly into the merchant system 220 via a similar terminal or computer associated with merchant server 222. The information may be transmitted via any network 260 discussed herein to merchant system 220 or issuer systems 230. In another embodiment, the merchant may enter the information into an issuer system 230 on behalf to the user 201. This may occur, for example, when the user 201 and/or issuer system 230 authorizes the management of data sets on financial transaction device 240 over a telephone and the service representative inputs the information. In this embodiment, the transaction device 240 may be updated at the next presentment opportunity such as when the user 201 attempts to compete a transaction using the transaction device 240.

Any suitable procedures may be utilized to determine whether a data set is currently ready for use and available (step 330). In one example, when a financial transaction device 240 is presented, the availability of the data set is verified by checking whether the data set has been corrupted or blocked (step 332), or deleted (step 333). For example, the data set may be checked to determine if the data set has been accessed or altered without permission ("corrupted") or if the data set exists or has been removed from the transaction device 240 ("deleted"). The check may be performed using any suitable protocol or comparing data. If the answer to these questions is no, then the data set is available and ready for use (step 334). If the data is corrupted or blocked, subroutines may be used to attempt to retry reading the data (step 336). If the data set is marked deleted or removable, subroutines will prevent access to the data set (step 335) and remove the data set (step 340). For example, a suitable subroutine may place a DELETE "marker" on the data set which prevents the data from being transmitted during completion of a transaction. The data set may then be marked for deletion and deleted from the transaction device 240 at the next presentment of the device. In similar manner, where the data set is corrupted, a CORRUPTED marker may be appended to the data set and the data set is prevented from being transmitted during completion of a transaction. The marker may be a header or trailer as discussed herein.

Figure 4:
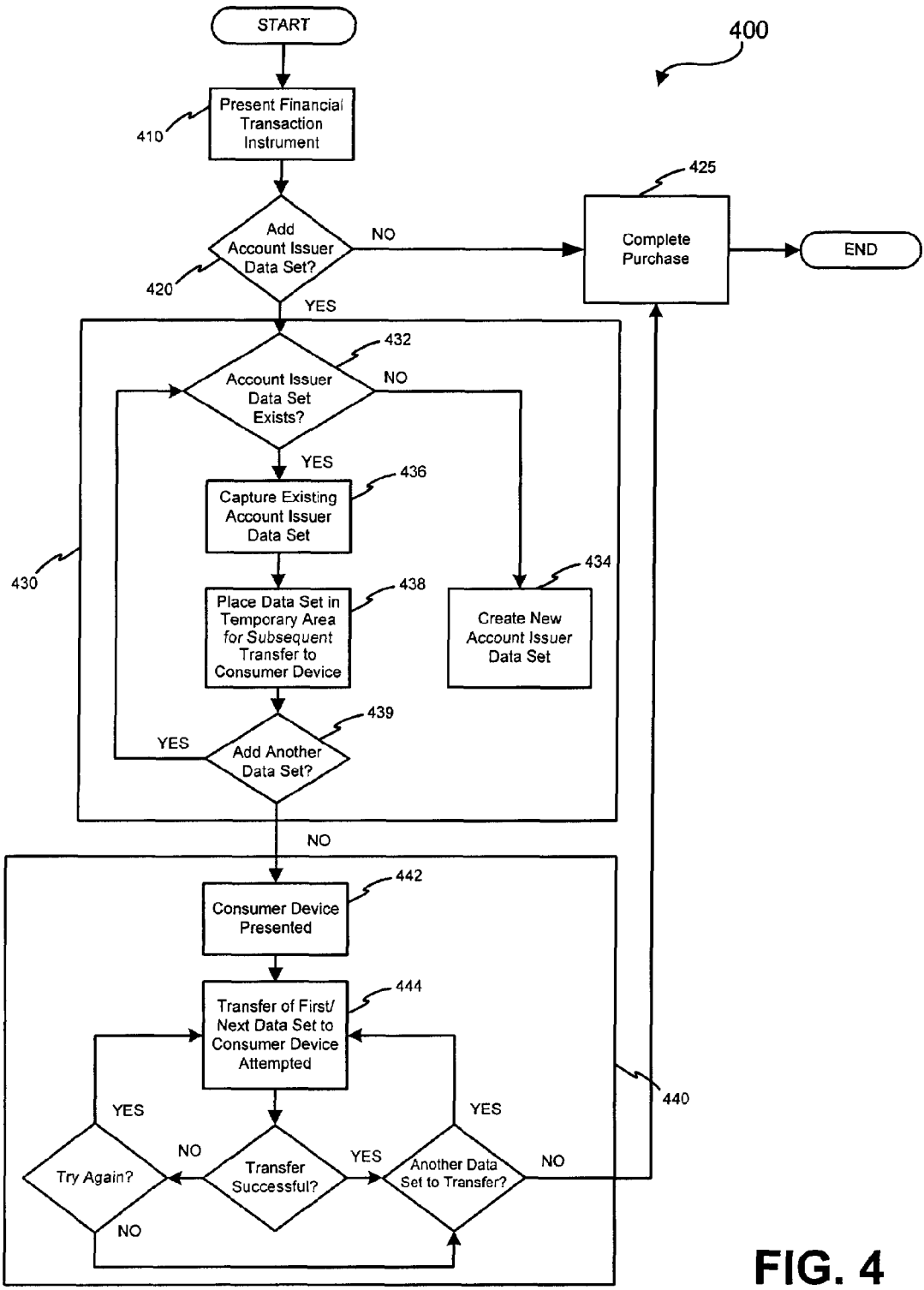
FIG. 4 illustrates an exemplary data set management method for adding data sets in accordance with an exemplary embodiment of the present invention.

Various methods may be used to add a data set to a financial transaction device 240 or to replace a data set on a financial transaction device 240. FIG. 4 illustrates an exemplary method of adding a data set to a financial transaction device 240, including the general steps of presenting the financial transaction device 240 (step 410), verifying the addition of the data set to the financial transaction device 240 (step 420), placing the data set in a temporary holding area (step 430), and adding the data set (step 440).

More particularly, the user 201 presents the financial transaction device 240 (step 410) to a interaction device 280 configured to communicate with transaction device 240. The user 201 may present financial transaction device 240 at a point of purchase or to an interaction device 280 or kiosk 270. For example, the user 201 may wave the RF transaction device 240 in front of a POS machine in a retail store, which is configured to receive data from the device 240. Alternatively, the user 201 may present the financial transaction device 240 at a self-service location such as a kiosk 270 in a mall. Moreover, the user 201 may present the financial transaction device 240 to a peripheral device associated with a personal computer, or the like.

The user 201 is then given the opportunity to add a data set to the transaction device 240. For example, interaction device 280 may detect the absence of a particular data set on the transaction device 240 by searching the transaction device 240 data base and comparing the existing data sets to the data set to be added. If the data set to be added is not found on the data base, the user 201 may be prompted to confirm the addition of this data set to the transaction device 240 (step 420). The user may be prompted via an interactive user interface displaying the option to add the data set. In one example, when a user 201 presents a financial transaction device 240 to a merchant, the card reader detects the absence of a loyalty data set and provides a message on a display to the user 201 or the store clerk indicating that the loyalty data set can be added if desired. The user 201 may answer in the negative and complete the purchase using typical transaction methods (step 425). Alternatively, if user 201 provides an affirmative response, the algorithm may prepare a data set for communication with the financial transaction device 240 (step 430). The process may determine whether the data set (or information that may be used to create the data set) exists in some form or on some device other than on the financial transaction device 240 (step 432). Determining whether a data set exists may involve querying an issuer system 230, database 282, or the like. For example, the issuer system 230 may compare the data set to other data sets the issuer system 230 has assigned to a particular user 201. If the data set is not assigned to a particular user, then issuer system 230 may determine that the data set is available for adding to the transaction device 240. Determining whether a data set exists may also take place when a store clerk verbally asks (or a screen prompts) the user 201 to present another card containing the information. For example, the data set may exist on a movie rental card and stored in magnetic stripe form, bar code, and/or the like.

If the data set exists in an accessible form, the data set may be captured (step 436). In this example, the user 201 may present the movie rental card and the data read from the movie rental card may then be stored in a data set associated with the financial transaction device 240. For example, the user 201 may desire to add a shopping loyalty card to the user's 201 financial transaction device 240. The user 201 may swipe, scan or otherwise present the loyalty card such that the data set from the loyalty card is captured. The system may be further configured such that the merchant, kiosk 270, or computer system may access an issuer system 230 to obtain information for creating the data set. Thus, if a user 201 does not have the movie rental card on the user's 201 person, the system 230 may prompt the clerk to request identifying/security information and to access the user's 201 account and therefore facilitate adding a movie rental data set associated with the user's 201 transaction device 240. Any other suitable methods of capturing data sets may also be used.

If the data set does not exist, a new data set may be created (step 434) for inclusion on the transaction device 240. Creation of the data set may, for example, involve filling out an application, providing name and address, creating an account, and/or the like. In either event, the pre-existing or newly created data set is temporarily held in a storage area (e.g., database 282, local memory or the like) for transfer to the transaction device 240 (step 438). Additional data sets may be prepared for transmittal to transaction device 240 (step 439).

In this exemplary embodiment, the transaction device 240 is presented again to read/write device 280 (step 442). Read/write device 280 is configured to attempt to transfer the data set(s) to the transaction device 240 (step 444). For example, existing read/write device 280 may be configured with software and/or hardware upgrades to transmit data to the transaction device 240. In one exemplary embodiment, if the data sets were not transferred correctly, the process may try the transfer again. In another exemplary embodiment, data sets are added one at a time or all together. Thus, a user 201 may pass a card through a card reader/writer one or more times during the addition process. The transaction may be completed (step 425) using the new data set or another selected method of payment. The same steps may be used in a self-service embodiment, however, in one embodiment, no financial transaction takes place along with the addition of data sets. It should also be noted that under appropriate circumstances, a user 201 may add data sets at a point of purchase without actually completing a purchase.

In various exemplary embodiments, the user 201 and/or the owner of the data set may manage the data set (i.e., steps 432-439) in advance of presenting the transaction device 240. For example, a user 201 on user computer 250 may choose to add or delete data sets via a website configured for management of data sets. In another example, an issuer system 230 may add functionality to an account and may desire to update the data set associated with that account. In either example, data sets that have been prepared in advance, may be ready for transmission upon presentment of the transaction device 240.

The transmission of the data sets may be transparent to the user 201. For example, the user 201 may present the transaction device 240 (step 442) to complete a purchase and the waiting data sets may automatically be added to the user's 201 card (step 440).

Similar steps may be taken to replace or update data sets with new information. For example, a user 201 at a point of sale may be informed of an upgrade in functionality associated with an account or other data set. Following similar steps as discussed with reference to FIG. 4, the existing data set on the transaction device 240 is replaced with a new data set. Moreover, depending on permission rights and/or hierarchies in place, if any, an existing data set may be replaced with an unrelated data set. Other methods of adding and replacing data sets may also be used to manage data sets on a transaction device 240.

Figure 5:
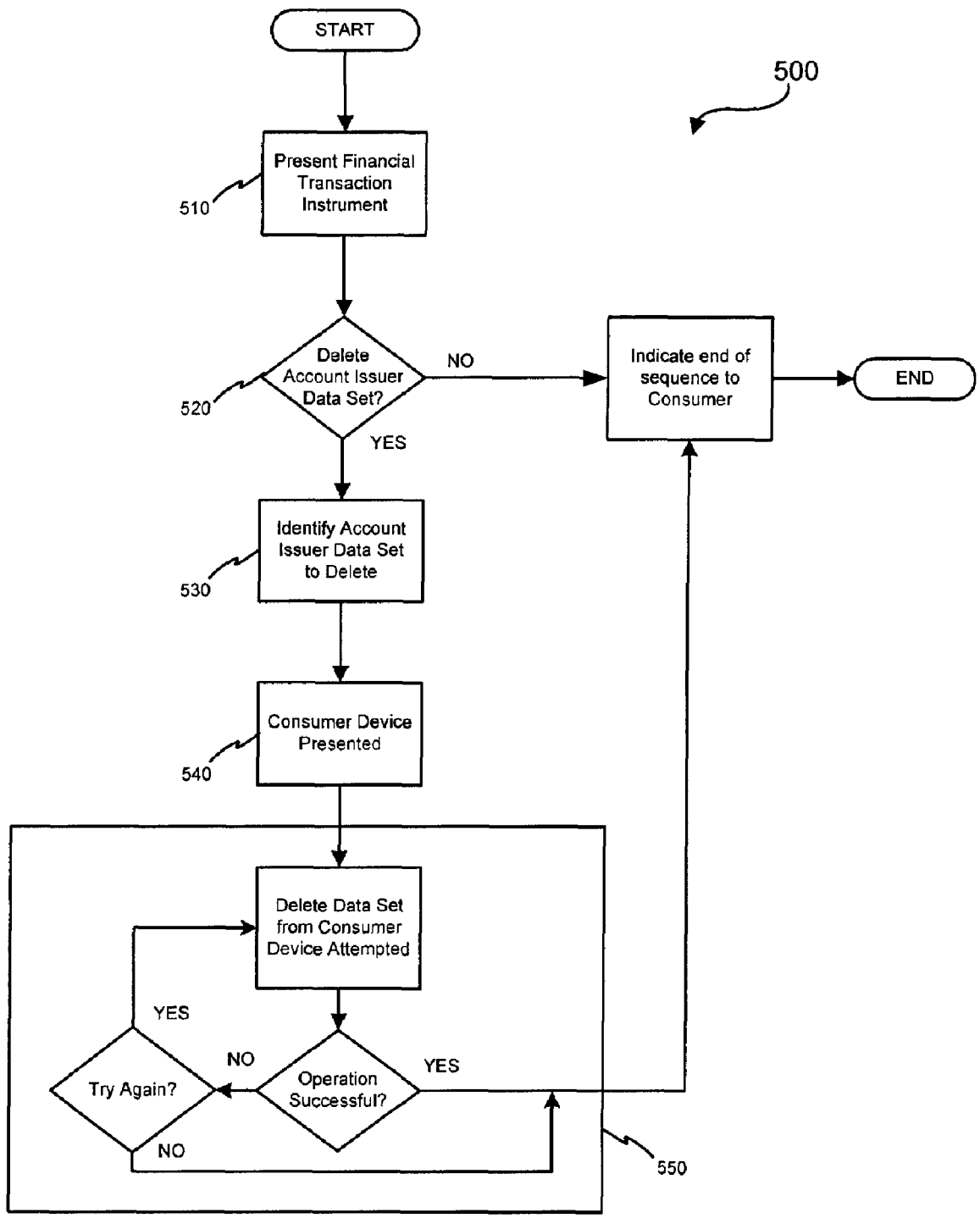
FIG. 5 illustrates an exemplary data set management method for deleting data sets in accordance with an exemplary embodiment of the present invention.

Furthermore, data sets may be deleted using any suitable techniques. For example, FIG. 5 illustrates an exemplary data set deletion method 500. The user 201 presents transaction device 240 at a point of purchase, self-service location, or the like (step 510). The POS device may be configured to facilitate the user 201 providing input regarding deletion of a data set (step 520). For example, the POS device may ask the user 201, via a test screen, whether the user 201 desires to manage the data sets on the transaction device 240. Through a series of menus and/or questions, the user 201 may identify data sets that the user 201 desires to delete.

Furthermore, the POS device may be configured to interrogate a database 282 or specific issuer systems 230 to determine whether the deletion of a data set has been requested earlier. If the user 201 requests deletion of one or more data sets, the data sets are then identified (step 530). It will be noted that step 530 may occur concurrently with step 520 or the user 201 may request deletion of a specific account at this step. In other embodiments, accounts may be deleted per predefined rules or policies, and/or the like. Upon presenting the transaction device 240 again, the identified data set(s) are removed from the transaction device 240 (steps 540 and 550). Other methods of deleting data sets may also be used to manage data sets on a transaction device 240.

In an exemplary embodiment, management of the data sets may further include selecting preferences for use of the data sets. For example, a user 201 may indicate a desire to use data set A, associated with a low interest rate credit card, as a first option, but to use data set B, associated with a higher interest rate credit card when data set A is not available. In another example, one data set may be used for purchases of gas while another data set may be used for purchasing travel tickets. The consumer data set preferences may be stored on the transaction device 240 as a data set. In this example, when the card is presented, all available data sets are read and the card reader device determines which data sets are to be used based in part on the preferences stored on the card, which preferences may be updated from time to time.

In one exemplary embodiment of the present invention, transaction device 240 is a RF device configured to transmit and receive information via RF frequency. The RF transaction device 240 may be embodied in any form factor allowing presentment of the transaction device 240 for payment. Typical form factors may include a watch, card, FOB, or the like. For ease in understanding, the RF transaction device may be referred to, herein, as a "FOB."

The FOB may be configured to communicate via a radio frequency transponder to the merchant systems or account systems. In yet another embodiment, the FOB may be configured to comprise two or more antennae that are both configured to send and receive information and the FOB may be responsive to different RF frequencies. In this exemplary embodiment, each antenna may be configured to communicate using a particular protocol and/or frequency. Thus, the FOB may be configured to communicate with two or more interaction devices 280 that each communicate with the FOB using different transmission frequencies. For more information on dual antenna FOBs, see U.S. patent application Ser. No. 10/192,488, filed Jul. 9, 2002, by inventors Michael J. Berardi, et al., and entitled "SYSTEM AND METHOD FOR PAYMENT USING RADIO FREQUENCY IDENTIFICATION IN CONTACT AND CONTACTLESS TRANSACTIONS," and its progeny, which are hereby incorporated by reference.

Figure 6:
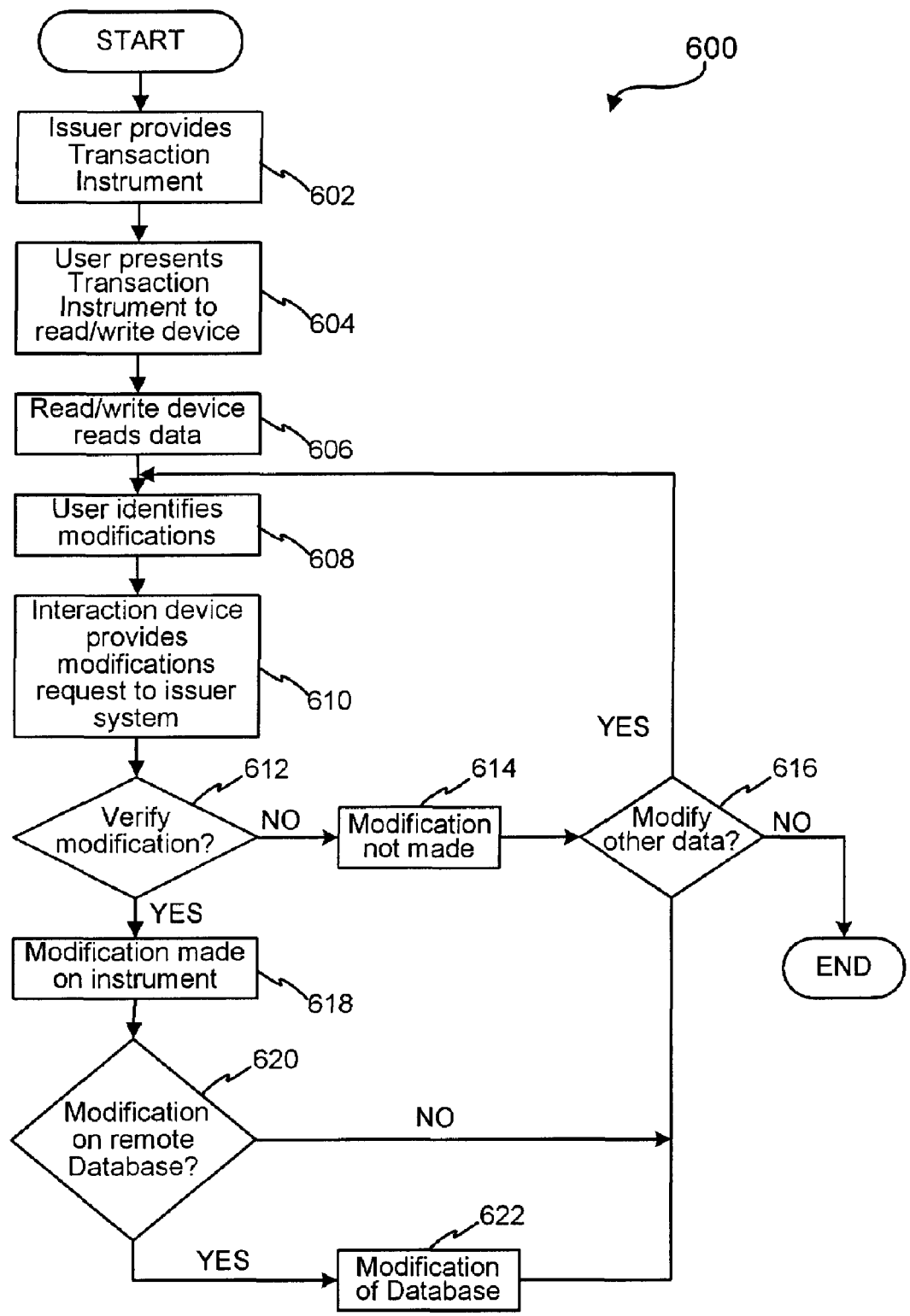
FIG. 6 illustrates an exemplary method for user-self-management of data sets in accordance with an exemplary embodiment of the present invention.
Figure 7:
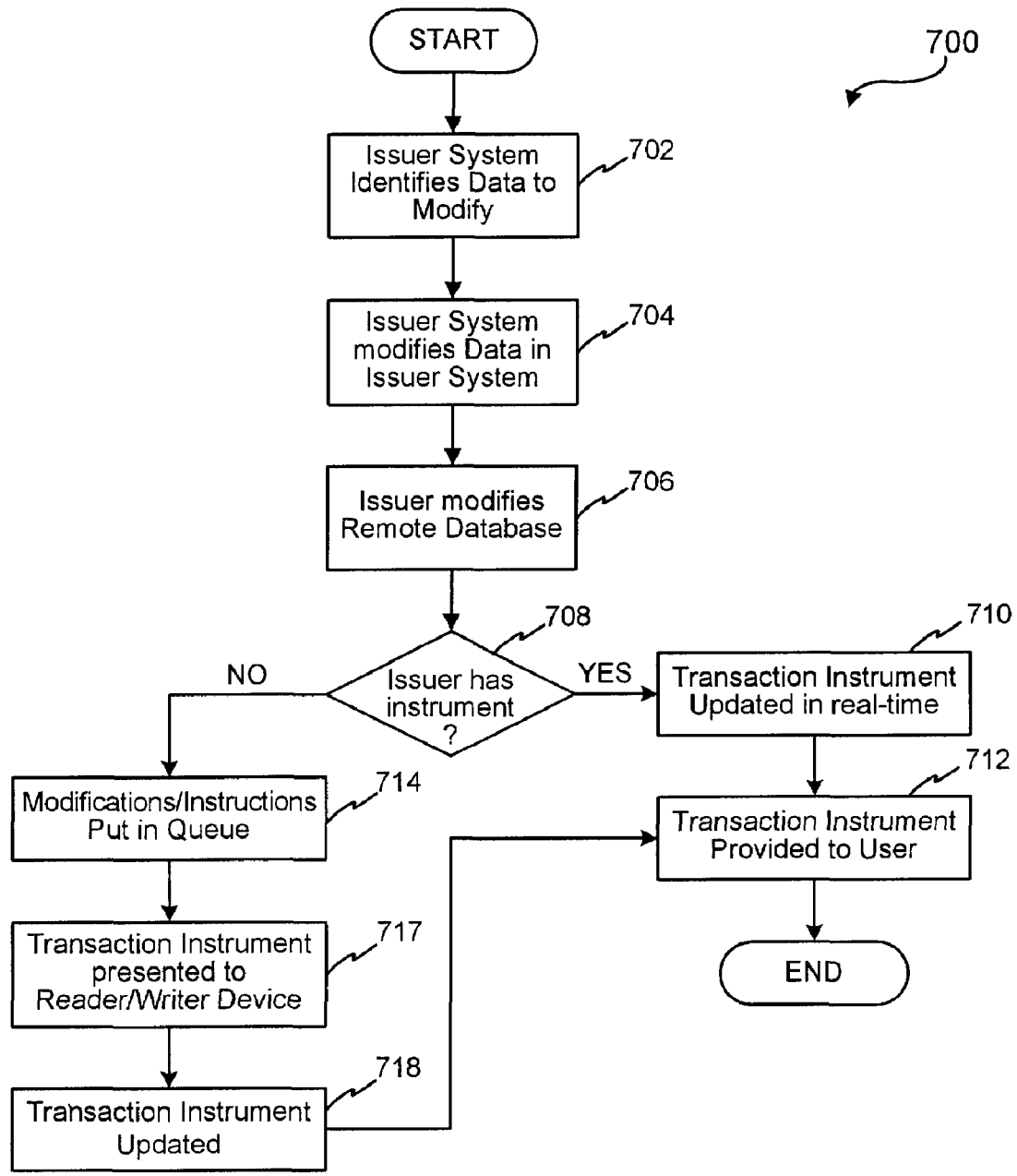
FIG. 7 illustrates an exemplary method for issuer management of data sets in accordance with the present invention.

As noted, the data associated with the transaction device 240 may be modified by the user 201 and/or by the issuer system 230. FIGS. 6 and 7 respectively, depict exemplary methods for user 201 and issuer system 230 data management. For example, with respect to user 201 self-management, the issuer system 230 may provide the user 201 with a transaction device 240 (step 602). The transaction device 240 may be provided with pre-stored issuer-owned data, or the transaction device 240 may be configured to permit the user 201 to add the data at a later date. The user 201 may the present the transaction device 240 to read/write device 280 for initiating the self-management process (step 604). The read/write device 280 may then read the data on the transaction device 240, and provide the data to an interaction device 290 for displaying to the user 201 (step 606). Alternatively, the interaction device 290 may provide the user 201 a list of available data to be added to the transaction device 240.

The user 201 may then be permitted to identify which data the user 201 wishes to modify (step 608). Identification of the data may include providing the data with a trailer or header indicating the action to be taken (e.g., add, delete, augment, overwrite, etc.). The header and an indicator of the data to be modified may then be provided to the issuer system 230 (step 610) for verification as to whether such desired modifications are available to the user 201 (step 612). If the desired modifications are not available, the modifications will not be made and the user 201 is notified accordingly (step 614). The user 201 may then be permitted to identify whether other data is to be modified (step 616). If so (step 608), the interaction device 290 may provide a request for modification to the issuer system 203 (step 610) and the verification process is repeated.

Alternatively, where the issuer system 230 verifies that the modifications may be made (step 612), the interaction device 290 may make the modifications to the appropriate data on the transaction device 240 (step 618). Additionally, where the system 200 includes a remote database 282 for storing a mirror image of the data contained on transaction device 240 (step 620), the interaction device 290, or issuer system 230, may facilitate modification of the remote database 282 (step 622). The user 201 may then be permitted to select other data sets to modify (step 616), in similar manner as was described above.

In either case, where the modifications are complete, the user 201 may then present the transaction device 240 to a merchant for use in completing a transaction.

FIG. 7 depicts an exemplary method wherein the issuer system 230 manages the data contained on the transaction device 240. For example, the issuer may identify on the issuer system 230 which data sets are to be modified (step 702). The modifications may then be made to the corresponding data set stored on the issuer system 230 (step 704). Where the system 200 includes a remote database 282, the issuer system 230 may provide the modifications/instructions to the database 282 for updating the database 282 accordingly (step 706).

In addition, the issuer system 230 may query as to whether the issuer system 230 is in possession of the transaction device 240 for making the modifications to the data set on the transaction device 240 in real-time or substantially real-time (step 708). If so, the modifications are made accordingly (step 710) and the transaction device 240 may then be provided to the user 201 for use in completing a transaction using the distinct data sets modified (step 712).

Where the issuer system 230 is not in possession of the transaction device 240 at the time the issuer determines that modifications to the data on the transaction device 240 are to be made (step 708), the modifications may be made on the issuer system 230 (step 704), and may be placed in queue, for uploading to the transaction device 240 when it is next presented to the issuer system 230 or to an appropriate read/write device 280 (step 714). When the transaction device 240 is presented thusly (step 716), the issuer system 230 may be notified that the transaction device 240 is available for modifying, and the issuer system 230 may then provide the instructions for modification (e.g., modified data including headers) to the appropriate read/write device 280 for modifying the transaction device 240 (step 718). The transaction device 240 may then be provided to the user 201 for use in completing a transaction (step 712).

Figure 8:
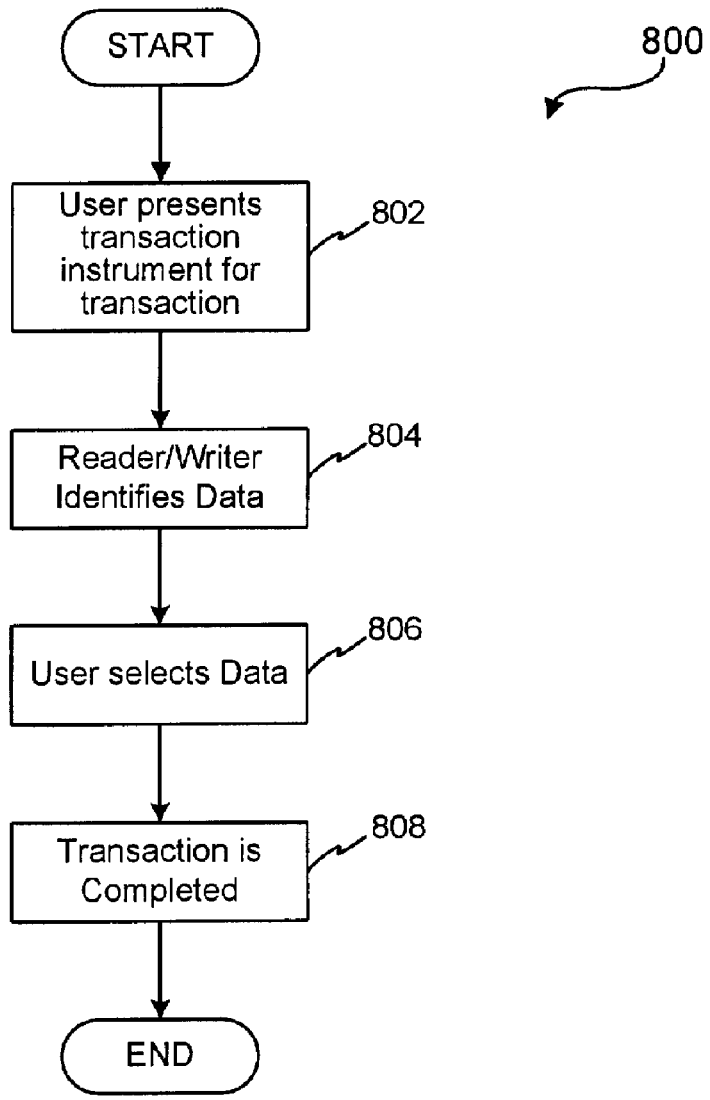
FIG. 8 illustrates an exemplary data set selection method for use in completing a transaction.

As noted, the transaction device 240 may include multiple data sets which correspond to distinct issuer systems 230, and which may be used to complete a transaction. The user 201 may be permitted to choose which data set to use for transaction completion. FIG. 8 illustrates an exemplary method by which the user 201 may choose which of the data sets to use to complete a transaction. For example, the user 201 may present the transaction device 240 to a merchant system 220 for use in completing a transaction (step 802). The merchant system 220 may then read the data stored on the transaction device 240 and report to the user 201 all distinct data sets which may be used to complete a transaction (804). The user 201 may then select the appropriate data set (step 806) and the transaction is completed accordingly (step 808).

It should be noted that completion of a transaction may be performed under any business as usual standard employed by the merchant and/or issuer system 230. For example, the merchant server 222 may be configured to communicate transaction data to the appropriate issuer system 230, in real-time or substantially real-time, or by using batch processing at the end of each day. Any suitable means for delivering the transaction data to the issuer systems 230 may be used. In one exemplary embodiment of the present invention, the transaction data may be delivered to the issuer system 230 via a network 260. The issuer system 230 may receive the transaction information and process the transaction under issuer defined protocol independent of any other protocol used by other issuers to process a transaction. The issuer system 230 may receive the transaction data and provide the merchant with the appropriate satisfaction for the transaction.

In one embodiment, the invention permits the system user 201 to present a transaction device 240 containing multiple distinct data sets, and to select a particular data set for transaction completion. The user 201 may select a particular data set using any form of secondary identification, such as, for example, a personal identification number (PIN), biometric identifier, voice recognition technology, retinal recognition technology, or the like. The secondary identifier may be provided to the merchant point of sale device 275, kiosk 270, read/write device 280, or the like, for transaction completion. In yet another embodiment, the transponder, transponder-reader, and/or transponder-reader system are configured with a biometric security system that may be used for providing biometrics as a secondary form of identification. The biometric security system may include a transponder and a reader communicating with the system. The biometric security system also may include a biometric sensor that detects biometric samples and a device for verifying biometric samples. The biometric security system may be configured with one or more biometric scanners, processors and/or systems. A biometric system may include one or more technologies, or any portion thereof, such as, for example, recognition of a biometric. As used herein, a biometric may include a user's voice, fingerprint, facial, ear, signature, vascular patterns, DNA sampling, hand geometry, sound, olfactory, keystroke/typing, iris, retinal or any other biometric relating to recognition based upon any body part, function, system, attribute and/or other characteristic, or any portion thereof. For an explanation of systems and methods for providing a secondary form of identification for transaction completion, please see U.S. Pat. No. 4,508,186, issued Apr. 2, 1985, to Omura et al.; U.S. Pat. No. 4,975,969, issued Dec. 4, 1990, to Tal; U.S. Pat. No. 6,213,391, issued Apr. 10, 2001, to Lewis; U.S. patent application Ser. No. 10/708,822, titled "SYSTEM FOR BIOMETRIC SECURITY USING A FOB," filed Mar. 26, 2004; U.S. patent application Ser. No. 10/708,823, titled "METHOD FOR BIOMETRIC SECURITY USING A TRANSPONDER," filed Mar. 26, 2004; U.S. patent application Ser. No. 10/708,823, titled "METHOD FOR BIOMETRIC SECURITY USING A TRANSPONDER," filed Mar. 26, 2004; U.S. patent application Ser. No. 10/708,824, titled "METHOD FOR BIOMETRIC SECURITY USING A TRANSPONDER-READER," filed Mar. 26, 2004; U.S. patent application Ser. No. 10/708,825, titled "METHOD AND SYSTEM FOR FINGERPRINT BIOMETRICS ON A FOB," filed Mar. 26, 2004; U.S. patent application Ser. No. 10/708,826, titled "METHOD AND SYSTEM FOR FACIAL RECOGNITION BIOMETRICS ON A FOB," filed Mar. 26, 2004; U.S. patent application Ser. No. 10/708,827, titled "METHOD AND SYSTEM FOR VOICE RECOGNITION BIOMETRICS ON A FOB," filed Mar. 26, 2004; U.S. patent application Ser. No. 10/708,828, titled "METHOD AND SYSTEM FOR SIGNATURE RECOGNITION BIOMETRICS ON A FOB" filed Mar. 26, 2004; U.S. patent application Ser. No. 10/708,829, titled "METHOD AND SYSTEM FOR VASCULAR PATTERN RECOGNITION BIOMETRICS ON A FOB" filed Mar. 26, 2004; U.S. patent application Ser. No. 10/708,830, titled "METHOD AND SYSTEM FOR DNA RECOGNITION BIOMETRICS ON A FOB" filed Mar. 26, 2004; U.S. patent application Ser. No. 10/708,831, titled "METHOD AND SYSTEM FOR HAND GEOMETRY RECOGNITION BIOMETRICS ON A FOB" filed Mar. 26, 2004; U.S. patent application Ser. No. 10/708,832, titled "METHOD AND SYSTEM FOR AUDITORY EMISSIONS RECOGNITION BIOMETRICS ON A FOB" filed Mar. 26, 2004; U.S. patent application Ser. No. 10/708,833, titled "METHOD AND SYSTEM FOR SMELLPRINT RECOGNITION BIOMETRICS ON A FOB" filed Mar. 26, 2004; U.S. patent application Ser. No. 10/708,834, titled "METHOD AND SYSTEM FOR KEYSTROKE SCAN RECOGNITION BIOMETRICS ON A FOB" filed Mar. 26, 2004; U.S. patent application Ser. No. 10/708,835, titled "METHOD AND SYSTEM FOR IRIS SCAN RECOGNITION BIOMETRICS ON A FOB" filed Mar. 26, 2004; U.S. patent application Ser. No. 10/708,836, titled "METHOD AND SYSTEM FOR RETINAL SCAN RECOGNITION BIOMETRICS ON A FOB" filed Mar. 26, 2004; U.S. patent application Ser. No. 10/708,837, titled "SYSTEM AND METHOD FOR PROFFERING MULTIPLE BIOMETRICS FOR USE WITH A FOB" filed Mar. 26, 2004; U.S. patent application Ser. No. 10/708,838, titled "SYSTEM FOR REGISTERING A BIOMETRIC FOR USE WITH A TRANSPONDER" filed Mar. 26, 2004; U.S. patent application Ser. No. 10/708,839, titled "METHOD FOR REGISTERING BIOMETRIC FOR USE WITH A FOB" filed Mar. 26, 2004; U.S. patent application Ser. No. 10/708,840, titled "METHOD FOR USING A SENSOR REGISTER A BIOMETRIC FOR USE WITH A TRANSPONDER-READER SYSTEM" filed Mar. 26, 2004; U.S. patent application Ser. No. 10/708,841, titled "BIOMETRIC SAFEGUARD FOR USE WITH A FOB" filed Mar. 26, 2004; all of which are herein incorporated by reference.

To facilitate understanding of the invention, the multiple data sets contained on the transaction device 240 are discussed with reference to distinct transaction account numbers associated with corresponding transaction accounts maintained by distinct issuer systems 230. Each one of the multiple transaction account numbers, or a plurality of the transaction account numbers, may be correlated to a single issuer system 230. However, for ease in understanding, the invention is discussed with reference to a first data set correlating to a first issuer system 230, and a second data set correlated to a second issuer system 230.

In one typical example, the transaction numbers (e.g., data set) are added to the transaction device 240 as discussed above. As previously noted, each transaction number is ordinarily stored on the transaction device 240 distinct from the other transaction numbers stored thereon. The transaction account numbers may include a routing number, transit number, bank identification number (BIN), or the like, which is used to identify the issuer system 230 that maintains the transaction account corresponding to the transaction account number. The transaction account number may additionally include a user account number, which is used by the issuer system 230 to identify the transaction account to be used to complete the transaction. In one exemplary embodiment, the issuer system 230 stores the user account number on the issuer system database correlative to the transaction account in such manner that the issuer system 230 may retrieve the transaction account for transaction completion by, for example, referencing the user account number.

The transaction account may be maintained on the issuer system 230 in an issuer system database (not shown). In conventional methods for transaction completion, when a system user 201 requests completion of a transaction, the user 201 may present the transaction device 240 to a merchant system POS 275. The transaction device 240 may provide the transaction account number to the merchant system 220, and the merchant system may forward a request for transaction authorization (e.g., merchant transaction request) to the issuer system 230. The merchant system 220 provides the merchant transaction request over a network (e.g., network 260) to the issuer system 230 corresponding to the routing number included in the transaction account number. When the issuer system 230 receives a transaction request from a merchant system 220, the issuer system 230 ordinarily retrieves the transaction account corresponding to the user account number from the issuer system database, and processes the transaction request under the issuer system's business as usual standard.

In some conventional transaction processing methods, the issuer system 230 may require the user 201 to provide a secondary form of identification prior to authorizing a transaction. For example, the issuer system 230 may receive a transaction request from a merchant system 220, and return instructions to the merchant system 220 to prompt the user 201 to provide a PIN. The merchant system POS 275 may require the user 201 to provide the PIN prior to further processing the transaction request. The user 201 may provide the PIN to the merchant system 220 using, for example, a conventional keypad as is commonly used in the industry for such purposes. Once the PIN is provided to the merchant system 220, the merchant system 220 may provide the PIN and any other information used to identify the user 201 to the issuer system 230 for PIN verification.

The conventional PIN verification process performed by the issuer system 230 may include comparing the PIN to a PIN stored in the issuer system database with reference to the user's account number. If the PIN provided by the user 201 matches the PIN stored correlative to the user account number on the issuer system 230, then the issuer system 230 may authorize completion of the merchant's transaction request. Otherwise, the issuer system 230 may deny transaction authorization.

Notably, the issuer system 230 may use any issuer defined protocol to compare the provided PIN to the PIN stored in the issuer database. For example, the PIN may be manipulated by the issuer system 230 using any suitable algorithm or any additional information obtained from the merchant system 220, the user 201, or the issuer system database, and the results of the manipulation may be analyzed, or verified against any other information stored on the issuer system database. As such, the method by which the issuer system 230 verifies the PIN is not limited. Any issuer system 230 defined method may be suitably employed.

In other conventional transaction processing systems, the PIN may be verified by the merchant system 220. The merchant system 220 may receive the transaction account number from the transaction device 240 upon initiation of a transaction by the user 201. The merchant system 220 may receive the transaction account number and recognize that the user 201 may need to provide a PIN to the merchant system 220 for verification prior to completion of the transaction. The merchant system 220 may provide the user 201 with a request for the PIN, or with notification that a PIN is required to complete the transaction. The user 201 may then provide the PIN to the merchant system 220 using, for example, a conventional keypad. The merchant system 220 may receive the PIN from the user 201 and provide the PIN to the transaction device 240. According to this PIN verification method, the transaction device database includes a user PIN against which the transaction device 240 may compare the PIN provided by the user 201 via the merchant system 220. If the PIN provided by the user 201 matches the PIN stored in the transaction device database, the merchant system may then forward the merchant's transaction request to the issuer system 230 for completion. Otherwise, the merchant system 220 may deny the transaction.

Figure 9:
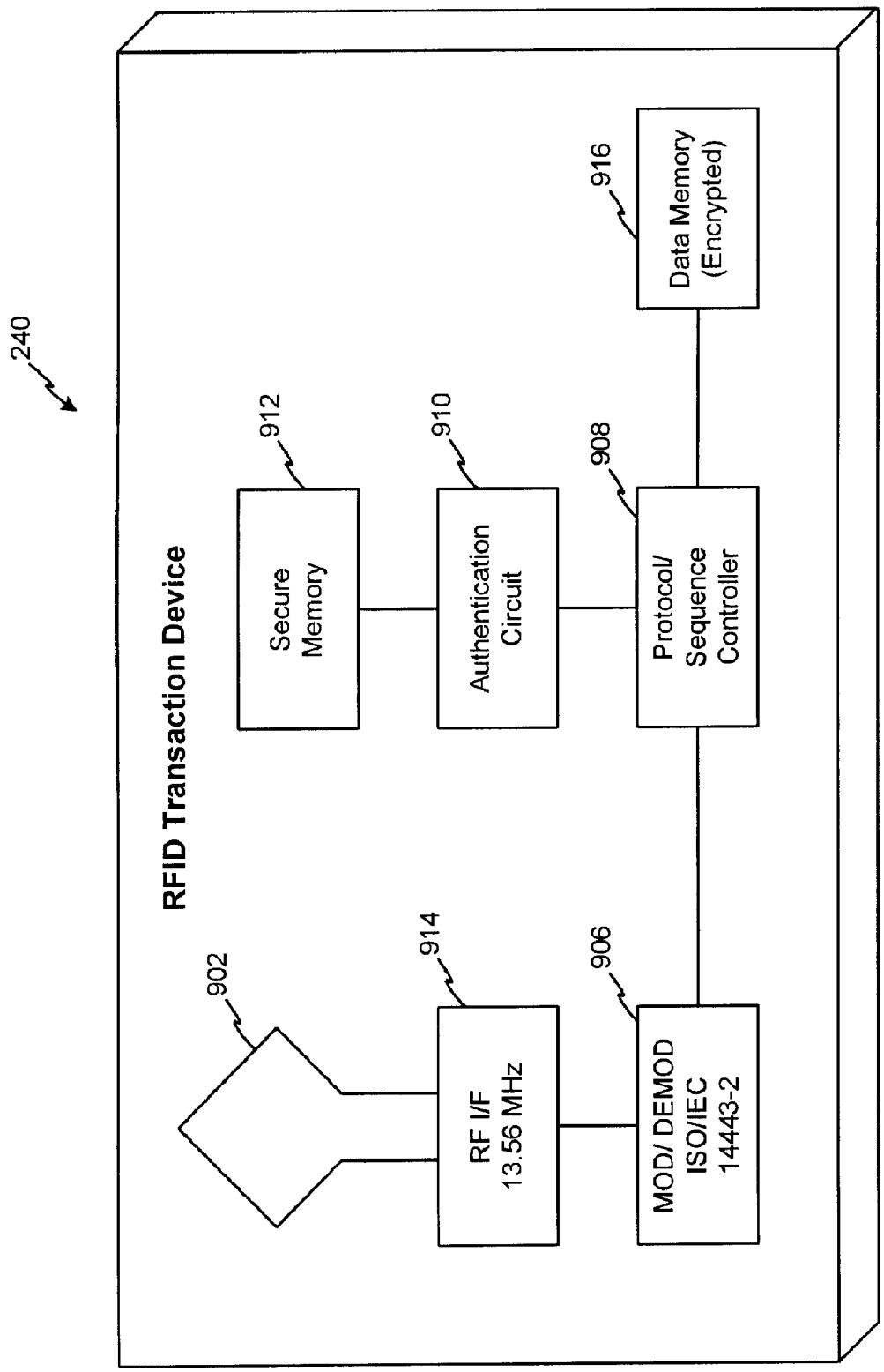
FIG. 9 illustrates a block diagram of an exemplary transaction device for use with the present invention.

FIG. 9 illustrates a block diagram of an exemplary transaction device 240 in accordance with the invention. Transaction device 240 may be a RFID transaction device 240 which may be presented by the user to facilitate an exchange of funds or points, etc., for receipt of goods or services. The transaction device 240 discussed herein may also be a "pervasive computing device," which may include a traditionally non-computerized device that is embedded with a computing unit. Examples can include watches, Internet enabled kitchen appliances, restaurant tables embedded with RF readers, wallets or purses with imbedded transponders, etc.

Transaction device 240 may include an antenna 902 for receiving an interrogation signal from RFID reader 265 via antenna 1002 (or alternatively, via external antenna 1026). Transaction device antenna 902 may be in communication with a transponder 914. In one exemplary embodiment, transponder 914 may be a 13.56 MHz transponder compliant with the ISO/IEC 14443 standard, and antenna 902 may be of the 13 MHz variety. The transponder 914 may be in communication with a transponder compatible modulator/demodulator 906 configured to receive the signal from transponder 914 and configured to modulate the signal into a format readable by any later connected circuitry. Further, modulator/demodulator 906 may be configured to format (e.g., demodulate) a signal received from the later connected circuitry in a format compatible with transponder 914 for transmitting to RFID reader 265 via antenna 902. For example, where transponder 914 is of the 13.56 MHz variety, modulator/demodulator 906 may be ISO/IEC 14443-2 compliant.

Modulator/demodulator 906 may be coupled to a protocol/sequence controller 908 for facilitating control of the authentication of the signal provided by RFID reader 265, and for facilitating control of the sending of the transaction device 240 account number. In this regard, protocol/sequence controller 908 may be any suitable digital or logic driven circuitry capable of facilitating determination of the sequence of operation for the transaction device 240 inner-circuitry. For example, protocol/sequence controller 908 may be configured to determine whether the signal provided by the RFID reader 265 is authenticated, and thereby providing to the RFID reader 265 the account number stored on transaction device 240.

Protocol/sequence controller 908 may be further in communication with authentication circuitry 910 for facilitating authentication of the signal provided by RFID reader 265. Authentication circuitry 910 may be further in communication with a non-volatile secure memory database 912. Secure memory database 912 may be any suitable elementary file system such as that defined by ISO/IEC 7816-4 or any other elementary file system allowing a lookup of data to be interpreted by the application on the chip. Database 912 may be any type of database or file system such as simple flat file or a hierarchical file structure such as defined by ISO/IEC 7816 standard. Database 912 may be organized in any suitable manner, including as data tables or lookup tables. Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in each of the manufacturer and retailer data tables. A "key field" partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The data may be used by protocol/sequence controller 908 for data analysis and used for management and control purposes, as well as security purposes. Authentication circuitry 910 may authenticate the signal provided by RFID reader 265 by association of the RFID signal to authentication keys stored on database 912. Encryption circuitry may use keys stored on database 912 to perform encryption and/or decryption of signals sent to or from the RFID reader 265.

In addition, protocol/sequence controller 908 may be in communication with a database 916 for storing at least a transaction device 240 account data, and a unique transaction device 240 identification code. Protocol/sequence controller 908 may be configured to retrieve the account number from database 916 as desired. Database 916 may be of the same configuration as database 912 described above. The transaction device account data and/or unique transaction device identification code stored on database 916 may be encrypted prior to storage. Thus, where protocol/sequence controller 908 retrieves the account data, and or unique transaction device identification code from database 916, the account number may be encrypted when being provided to RFID reader 265. Further, the data stored on database 916 may include, for example, an unencrypted unique transaction device 240 identification code, a user identification, Track 1 and 2 data, as well as specific application applets.

Figure 10:
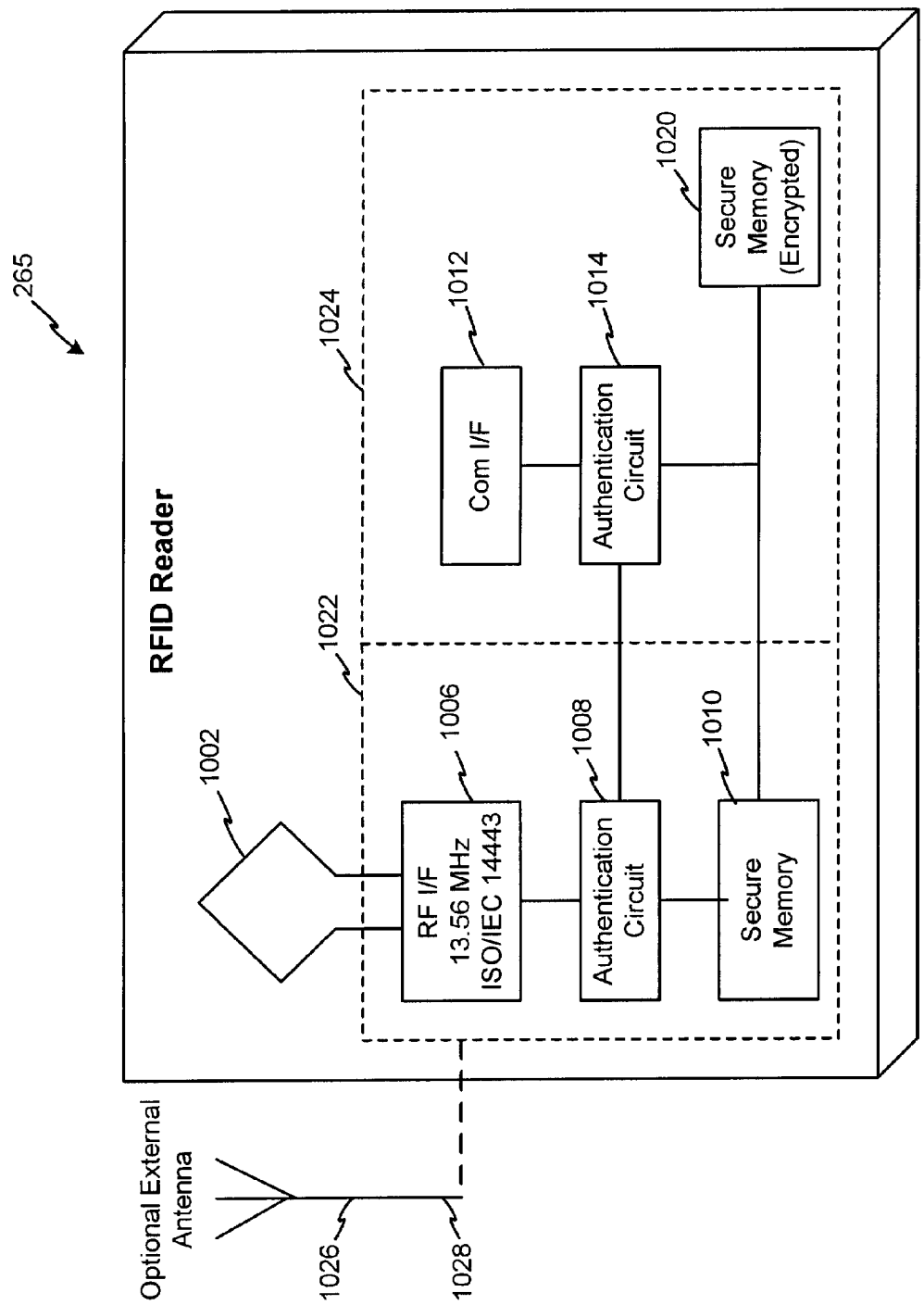
FIG. 10 illustrates a block diagram of an exemplary Radio Frequency Identification (RFID) reader for use with the present invention.

FIG. 10 illustrates an exemplary block diagram of a RFID reader 265 in accordance with an exemplary embodiment. RFID reader 265 includes, for example, an antenna 1002 coupled to a RF module 1022, which is further coupled to a control module 1024. In addition, RFID reader 265 may include an antenna 1026 positioned remotely from the RFID reader 265 and coupled to RFID reader 265 via a suitable cable 1028, or other wire or wireless connection.

RF module 1022 and antenna 1002 may be suitably configured to facilitate communication with transaction device 240. Where transaction device 240 is formatted to receive a signal at a particular RF frequency, RF module 1022 may be configured to provide an interrogation signal at that same frequency. For example, in one exemplary embodiment, transaction device 240 may be configured to respond to an interrogation signal of about 13.56 MHz. In this case, RFID antenna 1002 may be 13 MHz and may be configured to transmit an interrogation signal of about 13.56 MHz.

Further, protocol/sequence controller 1014 may include an optional feedback function for notifying the user of the status of a particular transaction. For example, the optional feedback may be in the form of an LED, LED screen and/or other visual display which is configured to light up or display a static, scrolling, flashing and/or other message and/or signal to inform the transaction device 240 user or any other third party that the transaction is initiated (e.g., transaction device is being interrogated), the transaction device is valid (e.g., transaction device is authenticated), transaction is being processed, (e.g., transaction device account number is being read by RFID reader) and/or the transaction is accepted or denied (e.g., transaction approved or disapproved). Such an optional feedback may or may not be accompanied by an audible indicator (or may present the audible indicator singly) for informing the transaction device 240 user of the transaction status. The audible feedback may be a simple tone, multiple tones, musical indicator, and/or voice indicator configured to signify when the transaction device 240 is being interrogated, the transaction status, or the like.

RFID antenna 1002 may be in communication with a transponder 1006 for transmitting an interrogation signal and receiving at least one of an authentication request signal and/or an account data from transaction device 240. Transponder 1006 may be of similar description as transponder 914 of FIG. 9. In particular, transponder 1006 may be configured to send and/or receive RF signals in a format compatible with antenna 902 in similar manner as was described with respect to transaction device transponder 914. For example, where transponder 1006 is 13.56 MHz RF rated antenna 902 may be 13.56 MHz compatible. Similarly, where transponder 1006 is ISO/IEC 14443 rated, antenna 1002 may be ISO/IEC 14443 compatible.

RF module 1022 may include, for example, transponder 1006 in communication with authentication circuitry 1008 which may be in communication with a secure database 1010. Authentication circuitry 1008 and database 1010 may be of similar description and operation as described with respect to authentication circuitry 910 and secure memory database 912 of FIG. 9. For example, database 1010 may store data corresponding to the transaction device 240 which are authorized to transact business over system 200. Database 1010 may additionally store RFID reader 265 identifying information for providing to transaction device 240 for use in authenticating whether RFID reader 265 is authorized to be provided the transaction device account number stored on transaction device database 916.

Authentication circuitry 1008 may be of similar description and operation as authentication circuitry 910. That is, authentication circuitry 1008 may be configured to authenticate the signal provided by transaction device 240 in similar manner that authentication circuitry 910 may be configured to authenticate the signal provided by RFID reader 265. In one exemplary embodiment, transaction device 240 and RFID reader 265 engage in mutual authentication. In this context, "mutual authentication" may mean that operation of the system 200 may not take place until transaction device 240 authenticates the signal from RFID reader 265, and RFID reader 265 authenticates the signal from transaction device 240. For a detailed explanation of a suitable transaction processing method and mutual authentication process for use with the invention, see, for example, U.S. patent application Ser. No. 10/192,488, titled "SYSTEM AND METHOD FOR PAYMENT USING RADIO FREQUENCY IDENTIFICATION IN CONTACT AND CONTACTLESS TRANSACTIONS," filed Jul. 9, 2002, and U.S. patent application Ser. No. 10/340,352, titled "SYSTEM AND METHOD FOR INCENTING PAYMENT USING RADIO FREQUENCY IDENTIFICATION IN CONTACT AND CONTACTLESS TRANSACTIONS," filed Jan. 10, 2003, both incorporated herein by reference.

The transaction device 240 may provide the reader 265 with transaction device data for use in authenticating a transaction request at the issuer system 230. For example, the transaction device 240 may include a counter or random number generator (not shown) which may be provided to the issuer system for use in transaction device 240, reader 265, or transaction verification. The issuer system 240 may receive the counter or random number for use in determining whether to authorize the transaction. Suitable methods for using a counter or random number generator are disclosed in, for example, U.S. patent application Ser. No. 10/708,547, titled "SYSTEM AND METHOD FOR SECURING RF TRANSACTIONS USING A RADIO FREQUENCY IDENTIFICATION DEVICE INCLUDING A RANDOM NUMBER GENERATOR", filed Mar. 10, 2004, and U.S. patent application Ser. No. 10/708,545, titled "SYSTEM AND METHOD FOR SECURING RF TRANSACTIONS USING A RADIO FREQUENCY IDENTIFICATION DEVICE INCLUDING A TRANSACTIONS COUNTER", filed Mar. 10, 2004, both incorporated herein by reference.

In accordance with the present invention, transaction device 240 may include multiple transaction account numbers stored on RFID transaction device database 912 (or secure memory 916). Each transaction account numbers stored thereon may be associated with a distinct PIN for use by the merchant system 220 or the issuer system 230 in verifying or authorizing a transaction. For example, a first transaction account number (e.g., first data set) may be associated with a first PIN on the issuer system 230 or on the transaction device database 912, 916, and a second transaction account number (e.g., second data set) may be associated with a second PIN on the issuer system 230 or on the transaction device database 912, 916, where the first transaction account number is distinct and different from the second transaction account number and the first PIN is distinct and different from the second PIN.

Upon presentment of the transaction device 240 to the reader 265 for transaction completion, the transaction device 240 may provide the reader 265 with information relative to the multiple transaction account numbers contained in the transaction device database 912, 916. The reader 265 may then inform the user 201 that multiple transaction accounts are available on the transaction device database 912, 916 for use in transaction completion. The reader 265 may notify the reader audibly, for example, by reciting specific information relative to each transaction account number. For example, the reader 265 may audibly notify the user that a particular transaction account number is one issued by a particular issuer system 230. The reader 265 may request that the user 201 select at least one of the transaction accounts contained on the database 912, 916 for use in transaction completion.

Figure 11:
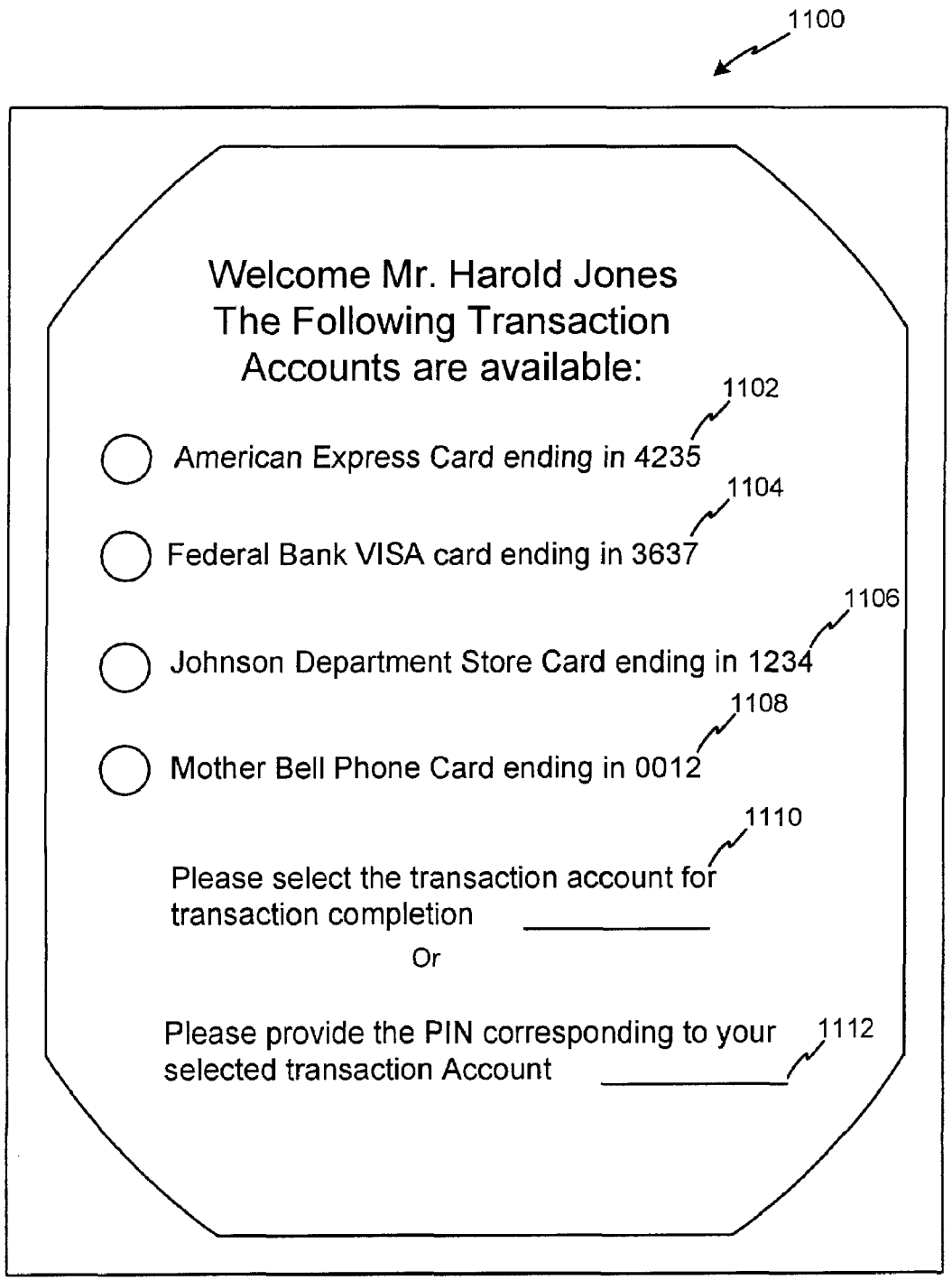
FIG. 11 depicts an exemplary screen shot providing a system user with a listing of transaction account numbers stored on an transaction device that is available for completing a transaction, in accordance with the present invention.

In another exemplary embodiment, the reader 265 (or the merchant system 220) may be configured to provide to the user a listing of the multiple transaction accounts contained on the database 912. In this exemplary embodiment, the reader 265 (or the merchant system 220) may be equipped with a display screen (not shown) for displaying the multiple accounts to the user 201. FIG. 11 depicts an exemplary screen shot 1100 of a display screen that may be presented to the user 201 for transaction account selection. Screen shot 1100 may include a listing of transaction account numbers 1102-1108, which may correspond to the transaction account numbers (e.g., data sets) stored on the transaction device database 912, 916. For example, transaction account number 1102 corresponds to a first transaction account number (e.g., "American Express Card ending in 4235"); transaction account number 1104 corresponds to a second transaction account number (e.g., "Federal Bank VISA Card ending in 3637"); transaction account number 1106 corresponds to a third transaction account number (e.g., "Johnson Department Store Card ending in 1234"); and transaction account number 1108 corresponds to a fourth transaction account number (e.g., "Mother Bell Phone Card ending in 0012").

The user 201 may then be permitted to select which one of the transaction account numbers to use in completing the transaction. For example, the user 201 may be prompted by a message 1112 to provide a PIN corresponding to the transaction account number selected. The PIN may be provided to the merchant system 220 via a keypad, touch screen, or the like. The PIN may then be verified in accordance with any method described above. If the PIN is verified, the transaction may be completed under business as usual standards. Otherwise, completion of the transaction is denied.

In another exemplary embodiment, the user 201 may be permitted to select a transaction account number from the screen. The user 201 may be permitted to select a particular transaction account number by providing transaction account identifying information to the merchant system 220. For example, where the screen is a touch sensitive screen, the user 201 may select a particular transaction account by touching the appropriate transaction account on the screen 1100, or by providing transaction account identifying information to the screen in accordance with the message 1110 provided by to the user 201. In some instances, the user 201 may select a particular transaction account by providing the merchant system 220 with a PIN which correlates with the selected transaction account. As such, the issuer system 230 or the merchant system 220 may verify whether a PIN is required to complete the transaction using the transaction number selected. The PIN may be verified under any merchant system 220 or issuer system 230 defined protocols. If a PIN is required, then the user 201 may be prompted to provide the required PIN to the keypad prior to completing the transaction. If the system user does not provide a PIN, or alternatively provides an incorrect PIN, the merchant system 220 or issuer system 230 may terminate the transaction request.

Figure 12:
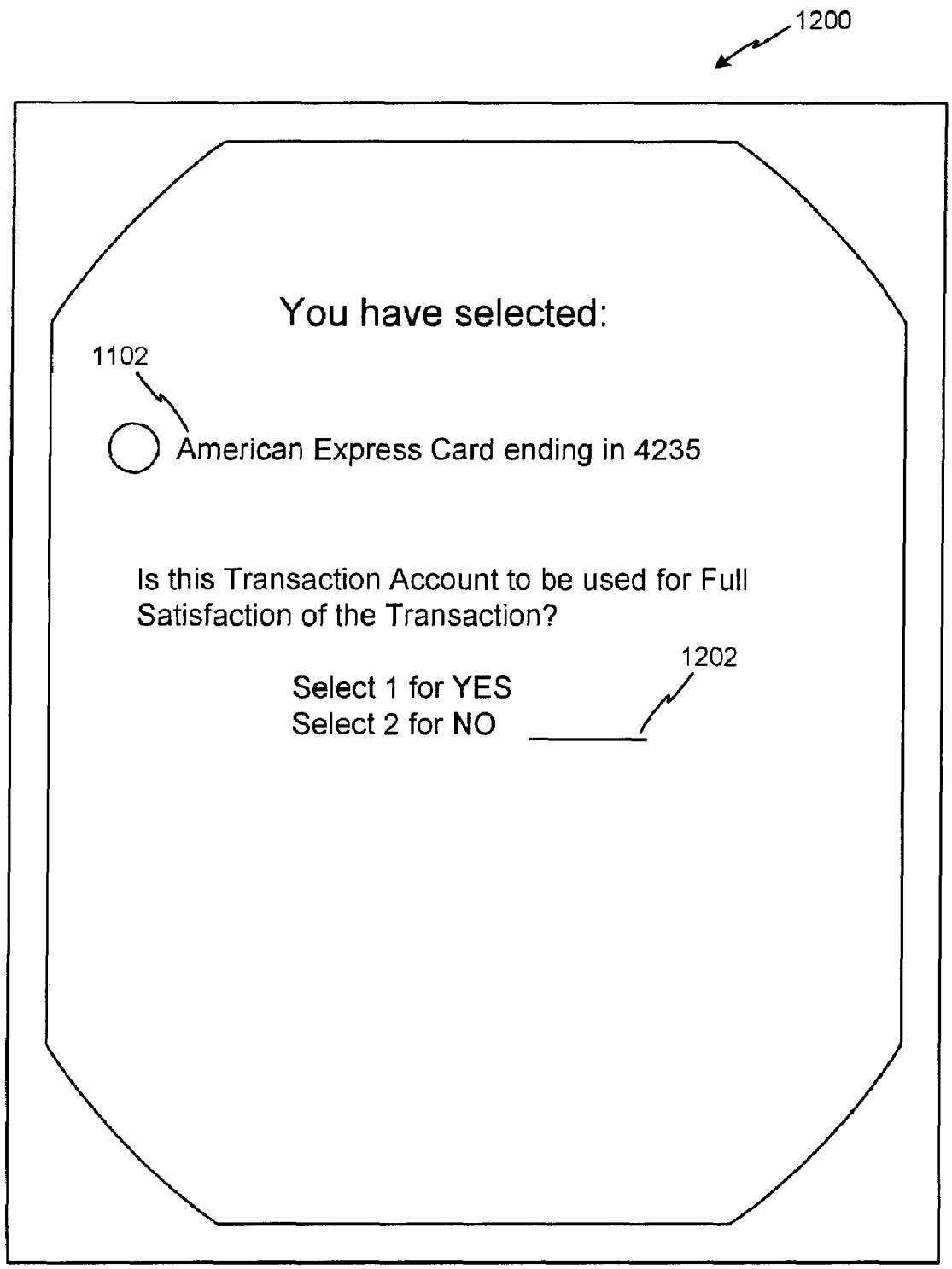
FIG. 12 depicts an exemplary screen shot providing a system user the opportunity to allocate a portion of the transaction to be satisfied to a user selected transaction account number, in accordance with the present invention.

In yet another embodiment of the invention, the user 201 may be permitted to select more than one of the transaction account numbers contained on the transaction device database for transaction completion. The user 201 may be permitted to allocate portions of the transaction request to multiple transaction account numbers for transaction satisfaction. For example, FIG. 12 depicts a second screen shot 1200 that the reader 265 may provide to the user 201 subsequent to the selection of a particular transaction account number. For example, the user 201 may elect to use a first transaction account number 1102 for full satisfaction of the transaction request. The screen shot 1200 may provide a message 1202 prompting the user 201 to identify whether the selected account is to be used for full satisfaction of the transaction request. If so, then the merchant system 220 may process the transaction request under business as usual standards using the first transaction account number 1102. The merchant system 220 may provide the first transaction account number 1102 to the issuer system 230 for verification and transaction authorization.

Figure 13:
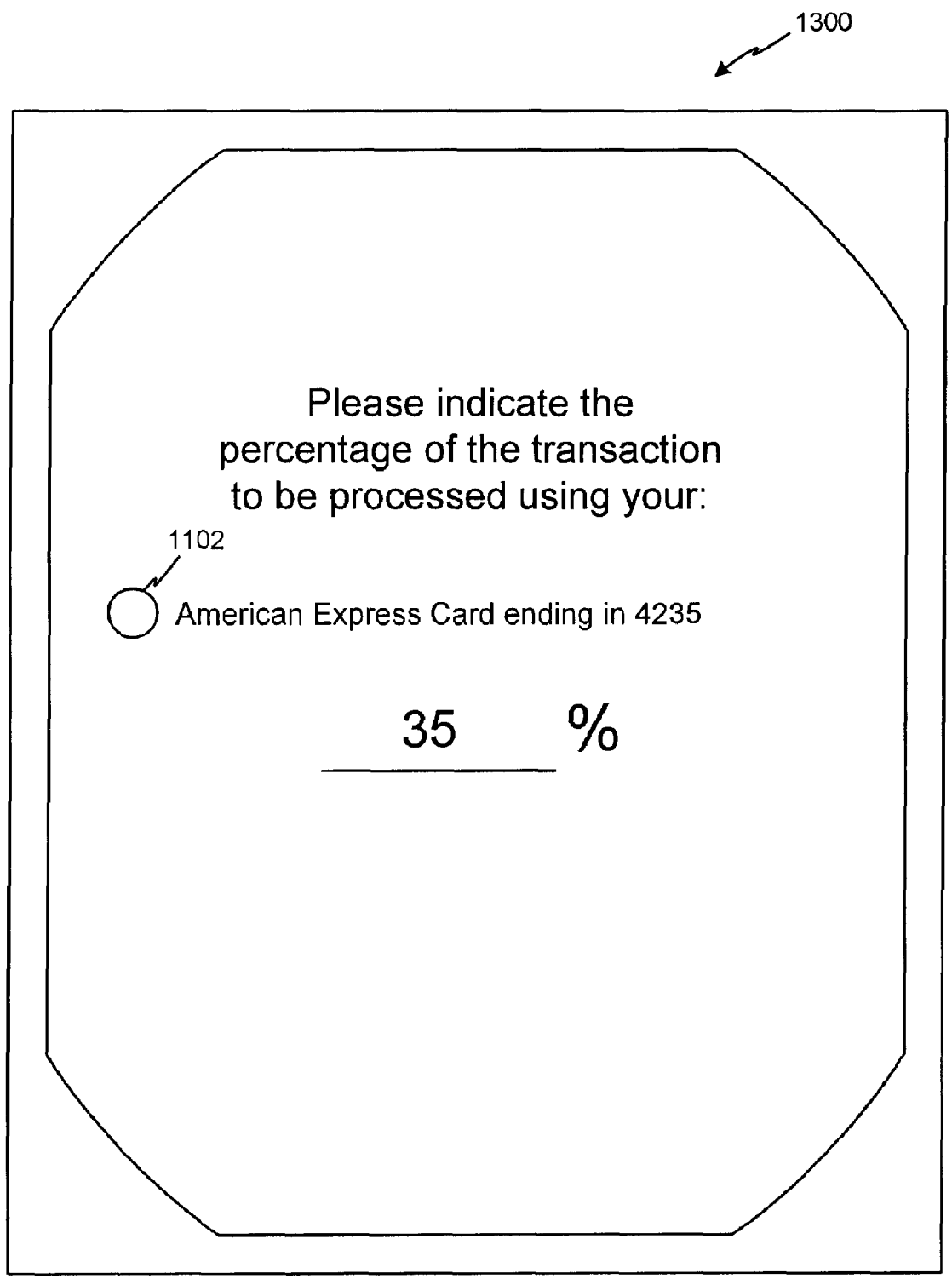
FIG. 13 depicts an exemplary screen shot providing a system user the opportunity to identify a portion of a transaction request to be satisfied by a user selected transaction account number, in accordance with the present invention.
Figure 14:
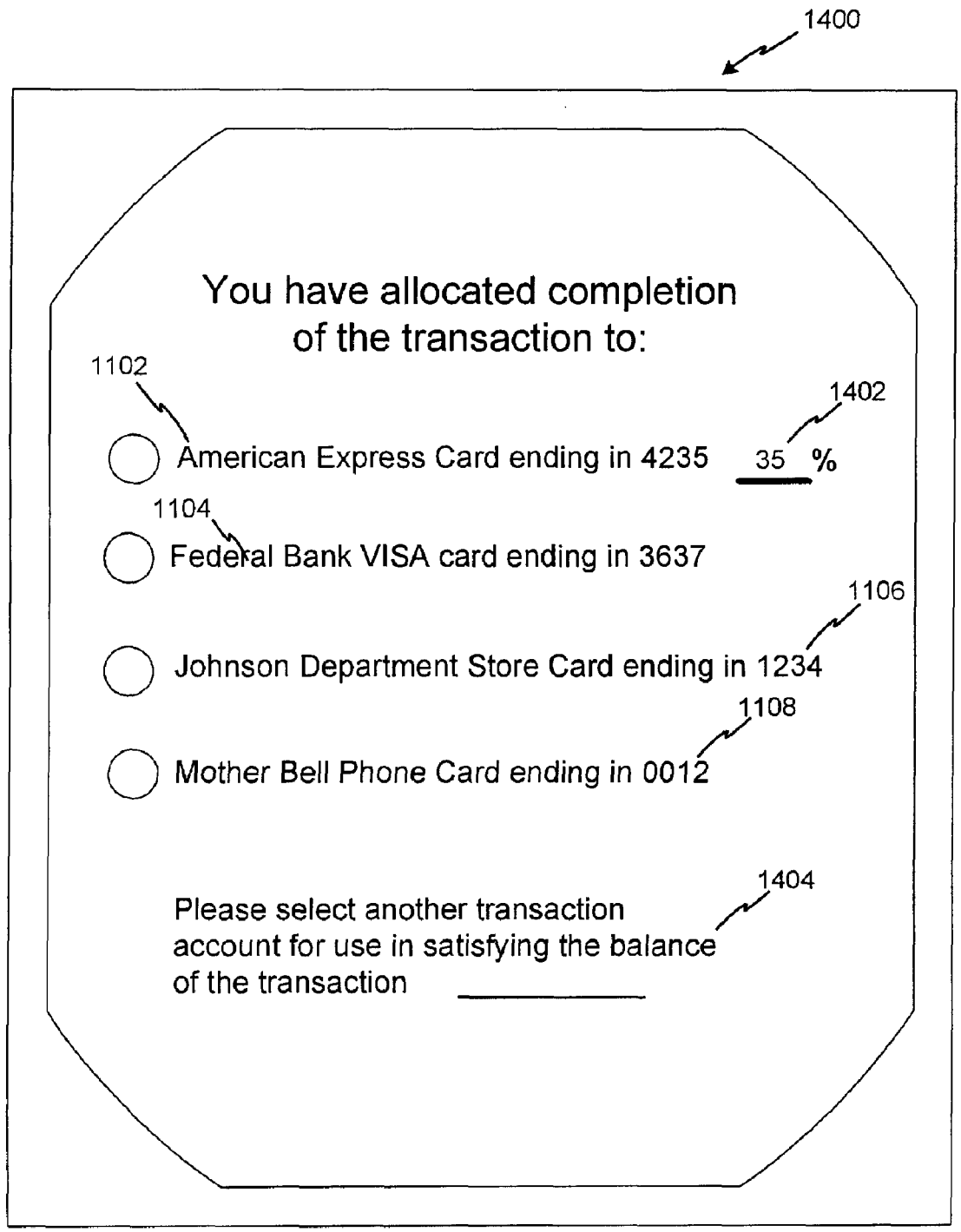
FIG. 14 depicts a subsequent listing of transaction accounts stored on the transaction device, which are available for transaction completion, in accordance with the present invention.

If the user 201 elects to allocate portions of the transaction request to multiple transaction account numbers for transaction satisfaction, the reader 265 or merchant system 220 may permit the user 201 to identify the portion of the transaction request to allocate to a particular transaction account number. For example, the user 201 may desire to allocate 35% of the transaction to a first transaction account number 1102 and 65% to a second transaction account number. In this instance, at the screen shot 1200, the user 201 may select a first transaction account number, and indicate that the first transaction account number is not to be used for full satisfaction of the transaction request. The reader 265 or merchant system 220 may then provide the user 201 with a screen shot permitting the user 201 to indicate which portion of the transaction request to allocate to the first transaction number. The user 201 may indicate which portion to allocate by, for example, providing the key pad with information identifying the allocated portion. In the example illustrated in FIG. 13, the user 201 is prompted by message 1302 to provide what percentage of the transaction request is to be allocated to a first transaction account number 1102. As shown, screen shot 1300 indicates that 35% of the transaction is to be allocated to the first transaction account number 1102. Once the user 201 indicates the portion, the reader 265 or merchant system 220 may return the user 201 to a subsequent listing of the available transaction account numbers for use in completing the transaction. The subsequent listing of available transaction account numbers may include all of the transaction account numbers contained on the transaction device database 912, 916, or only those transaction account numbers not yet selected by the user 201. Alternatively, the subsequent listing may include notification of which transaction account number the user 201 has previously selected. As shown in FIG. 14, a screen shot 1400 may include the subsequent listing which may additionally include the relevant information pertaining to the allocation made to the first transaction account number 1102 by the user 201. For example, screen shot 1400 may include the selected first transaction account number 1102 and the corresponding amount 1402 allocated thereto. The user 201 may be permitted to select additional transaction account numbers from the subsequent listing for allocation of portions of the transaction request, or for use in satisfying the balance of the transaction request. For example, the user 201 may be provided a message 1404 requiring the user 201 to select additional accounts for use in transaction completion. The user 201 may be required to select additional transaction account numbers from the subsequent list until the totality of the transaction is satisfied. The user 201 may be provided screen shots shown in FIGS. 11-14 and the process repeated until the appropriate portions, or all portions, of the transaction request is fully satisfied.

Figure 15:
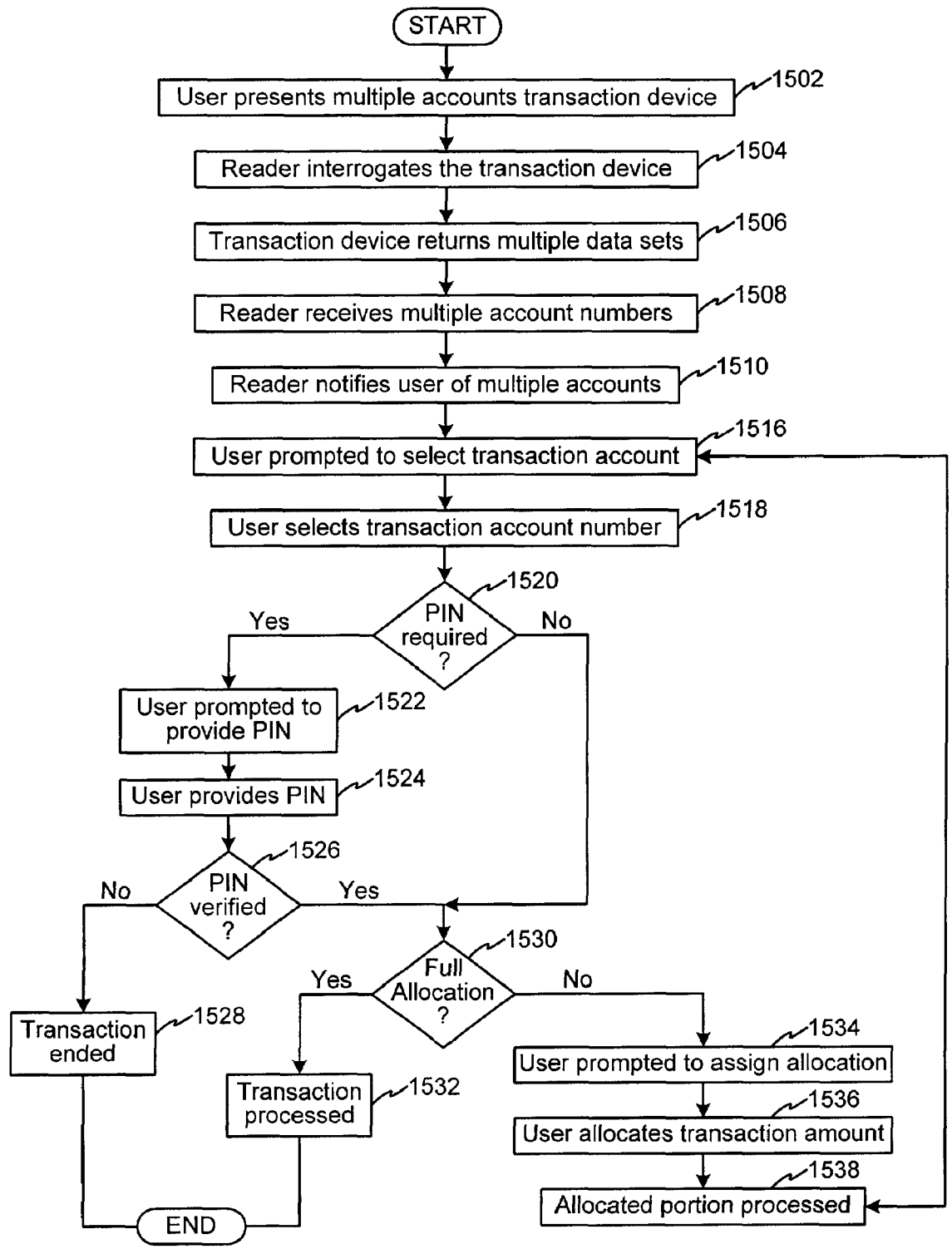
FIG. 15 depicts an exemplary method for selecting one of a multiple transaction accounts for transaction completion, in accordance with the present invention.

FIG. 15 illustrates an exemplary method for selecting from amongst the multiple transaction account numbers contained on the transaction device database 912, 916. The method begins with the user 201 presenting the multiple accounts transaction device 240 for completion of a transaction (step 1502). In presenting the transaction device 240, the user 201 may place the transaction device within the interrogation zone of a RFID reader 265. The reader 265 interrogates the transaction device and the transaction device 240 and reader 265 may engage in mutual authentication (step 1504). Once the transaction device 240 and the reader 265 successfully mutually authenticate, the transaction device 240 is provides the reader 265 with transaction account information contained in the transaction device database 912, 916. For detailed description of a suitable interrogation and mutual authentication process for use with the invention, please refer to U.S. patent application Ser. No. 10/192,488, incorporated by reference above.

Upon successful interrogation and authentication, the transaction device 240 provides the reader 265 with the multiple transaction account numbers stored on the transaction device database 912, 916 (step 1506). In one example, the transaction device protocol/sequence controller 908 sends a signal to database 912, 916 and the database 912, 916 provides the multiple transaction account numbers to the protocol/sequence controller 908. The protocol sequence controller 908 may receive the multiple transaction account numbers and provides the multiple transaction account numbers to modulator/demodulator 906, which in turn provides the multiple transaction account numbers to transaction device transponder 914. Transponder 914 may provide the multiple transaction account numbers to transaction device antenna 902, and antenna 902 may provide the multiple transaction account numbers to the reader 265, via reader antenna 1002 (or optional external antenna 1026).

The reader 265 may receive the transaction account numbers (step 1508) and provide notice to the user 201 that multiple transaction account numbers are present on the transaction device 240 that are available for use in completing a transaction request (step 1510). The reader 265 may receive the transaction account numbers at reader transponder 1006 via reader antenna 1002. Transponder 1006 may additionally provide the multiple account numbers to a reader or merchant display screen (not shown) for use in displaying the transaction account numbers to a user 201. For example, the reader protocol sequence controller 1014 may provide a signal to the reader communications interface 1012, which commands the interface 1012 to receive the multiple transaction account numbers and provide the multiple transaction account numbers to the display screen. The reader 265 may then prompt the user 201 to select at least one of the multiple transaction account numbers for use in transaction completion (step 1516). For example, the reader or merchant display screen may provide the user 201 with a screen shot, such as, for example, screen shot 1100 shown in FIG. 11. The screen shot 1100 may include a listing of the multiple transaction account numbers contained on the transaction device database 912, 916, which are available for use in transaction completion. The screen shot 1100 may be configured to permit the user 201 to select one of the transaction account numbers, and the screen may provide the transaction account number to the reader 265 or merchant system 220 for processing (step 1518).

In some instances, the account issuer 230 that provides the transaction account number to the user 201 may require the user 201 to provide a PIN prior to permitting use of the transaction account number for transaction completion (step 1520). In this case, display screen may be configured to prompt the user 201 to provide the appropriate PIN for verification by the reader 265, merchant system 220, or issuer system 230, in any manner discussed above (step 1522). The user 201 may provide the PIN (step 1524) and the PIN may be verified under the merchant system 220 or issuer system 230 defined verification protocol (step 1526). If the PIN is not verified (step 1526), then the merchant system 220 may terminate the transaction request (step 1528).

In some instances, the issuer system 230 corresponding to the selected transaction account number may not require a PIN for a particular transaction account number to be used for transaction completion (step 1520). In which case, the transaction account number is processed and the transaction completed under the merchant system's business as usual protocol. For example, the merchant system 220 may provide a request for satisfaction of a transaction request to the issuer system 230, and the issuer system 230 may evaluate the transaction request for transaction completion.

Alternatively, as illustrated in FIG. 12, the display screen may be configured to permit the user 201 to select more than one of the multiple transaction account numbers contained on the transaction device 240 for transaction completion. For example, where the transaction device 240 includes multiple transaction account numbers, the user 201 may allocate portions of the transaction request to the transaction account numbers for satisfaction in accordance with that portion. The user 201 may elect to fully allocate the whole of the transaction request to a single transaction account number, or to separate the transaction request amongst multiple transaction account numbers (step 1530). If the user 201 elects to allocate the transaction to only one of the transaction account numbers, the transaction request in process under the merchant system's business as usual standards (step 1532). For example, the merchant system 220 receives the transaction account number and provides the transaction account number to the corresponding issuer system 230 by referencing the issuer system 230 routing number included in the selected transaction account number. Typical methods of routing a transaction request to an issuer system 230 based on a routing number are well known and will not be discussed herein for brevity.

In another exemplary embodiment, the user 201 may elect to allocate only a portion of the transaction request to a selected transaction account number (step 1530). In which case, the display screen may be configured to prompt the user 201 to identify the portion of the transaction request to be allocated to the selected transaction account number. For example, display screen 1300, shown in FIG. 13, illustrates a typical prompt for use in identifying which portion of a transaction to allocate to a particular transaction account number. The user 201 may identify a portion of the transaction request to be allocated (step 1536) and the merchant system 220 may process the allocated portion of the transaction request in accordance with the transaction account number selected and the merchant system business as usual standard, as discussed above (step 1538). That is, the portion of the transaction request to be allocated to the transaction account number is forwarded to the issuer system 230 corresponding to the routing number contained in the selected transaction account number.

The user 201 may elect to satisfy the balance of the transaction request using one or more of the remaining transaction account numbers contained on the multiple transaction account device database 912, 916. In which case, the reader 265 and the merchant system may provide the user 201 with a subsequent list of transaction account numbers available for transaction completion and the user 201 may select one or more of the transaction account numbers to satisfy the balance of the transaction request. In which case, steps 1516-1538 may be repeated until the transaction is wholly satisfied.

It should be appreciated that the particular implementations shown and described herein are illustrative of the invention and its best mode and are not intended to otherwise limit the scope of the present invention in any way. Indeed, for the sake of brevity, conventional data networking, application development and other functional aspects of the systems (and components of the individual operating components of the systems) may not be described in detail herein. It should be noted that many alternative or additional functional relationships or physical connections may be present in a practical data set management system.

As may be appreciated by one of ordinary skill in the art, the present invention may be embodied as a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus include steps for implementing the functions specified in the flowchart block or blocks.

It should be noted that although the present invention is discussed with respect to Internet Service Providers, and systems and networks which may communicate via a leased line (T1, D3, TCP/IP etc.), the invention is not so limited. The present invention contemplates conventional protocol, networks and systems which support a wide range of data transfer. For example, in accordance with this invention, a transaction may be completed using telephone lines connecting long distance carrier systems. In this instance, the issuer-owned data which may be included on transaction device 240 using any of the methods discussed herein, may be an account number which corresponds to long distance calling time such as may be done with a conventional calling card.

Where the transaction device 240 is loaded with several distinct data sets, each corresponding to a distinct data set owner operating on distinct and non-compatible communications network, the user of the transaction device 240 may use the instrument to complete long distance calls on each of the distinct communications network, independently of the other. This is especially useful for a transaction device 240 user who may travel to different locations, where the different locations support different long distance communications network. In this exemplary embodiment, the present invention enables a user to anticipate which communications network is available in many different travel destinations, and include the corresponding mating data set on transaction device 240 prior to beginning travel. In this way, the transaction device 240 user may be prepared to use the transaction device 240 as a long distance calling card irrespective of his anticipated travel destination.

In the foregoing specification, the invention has been described with reference to specific embodiments. However, it may be appreciated that various modifications and changes can be made without departing from the scope of the present invention. For example, alternate authentication and verification methods are required by the account issuer system may be employed. The issuer system may require the transaction device to include random number generators, counters, authentication tags, or the like for transaction device, reader, or transaction verification. Additionally, the notifications to the user discussed herein may be visual, audible, or any other suitable notification method capable of conveying to the user that multiple transaction accounts are available for transaction completion. Further, the processing method described herein may be modified so as to permit the selection of a data set from the transaction device using a PIN, where each data set is assigned a PIN, and the user uses the PIN to identify which data set to select for transaction completion. Further still, the user may audibly or physically (e.g., touch screen, input data in touch pad or key pad) select which data set to use. As such, the specification and figures are to be regarded in an illustrative manner applicable irrespective of the data processing protocol used by a data set owner, rather than a restrictive one, and all such modifications are intended to be included within the scope of present invention. Accordingly, the scope of the invention should be determined by the appended claims and their legal equivalents, rather than by the examples given above. For example, the steps recited in any of the method or process claims may be executed in any order and are not limited to the order presented.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical."

What is claimed is:

1. A method for managing a plurality of data sets on a radio frequency (RF) transaction device, the method comprising:
   adding, to a first database on the RF transaction device, a first data set of a first format and a second data set of a second format, wherein:
      the first data set is owned by a first data set owner and the second data set is owned by a second data set owner,
      the first data set owner is distinct from the second data set owner,
      the first format is different from the second format, and
      the first data set is stored in accordance with the first format, and the second data set is stored in accordance with the second format;
   configuring a first method of authentication corresponding to the first data set and a second method of authentication corresponding to the second data set,
      wherein the first method of authentication and the second method of authentication (1) are configured by the first data set owner and the second data set owner independently and (2) each include a distinct access authentication protocol defined by the first data set owner and the second data set owner, respectively,
      wherein, in response to authentication of the first data set owner using the respective distinct access authentication protocol defined by the first data set owner, the first data set owner is provided access rights to the first data set, at least one access right including authorization to at least one of add and remove a static field of the first format, and
      wherein, in response to authentication of the second data set owner using the respective distinct access authentication protocol defined by the second data set owner, the second data set owner is provided access rights to the second data set, at least one access right including authorization to at least one of add and remove a static field of the second format;
   providing information relating to the first data set and the second data set for selection, wherein the information includes the first data set and the second data set being associated with transaction categories;
   determining a selection of at least one of the first data set and the second data set based in part on a preference of data set use and a transaction category of a transaction request;
   receiving the selection of at least one of the first data set and the second data set to complete the transaction request, wherein:
      if the first data set is selected, the receiving includes receiving a first secondary identifier indicium corresponding to the first method of authentication, and
      if the second data set is selected, the receiving includes receiving a second secondary identifier indicium corresponding to the second method of authentication;
   authenticating, in response to receiving the selection, the transaction request using the first secondary identifier indicium if the first data set is selected and using the second secondary identifier indicium if the second data set is selected;
   determining, based on the authenticating, whether the transaction request is approved; and
   completing, if the determining indicates that the transaction request is approved, the transaction request according to the selection.

2. The method of claim 1, wherein at least one of the first secondary identifier indicium and the second secondary identifier indicium is a personal identifier number (PIN) or a biometric identifier.

3. The method of claim 1, wherein the step of receiving a selection further comprises receiving an allocation of a first portion of the transaction request to the first data set for transaction completion.

4. The method of claim 3, wherein the step of receiving a selection further comprises receiving an allocation of a second portion of the transaction request to the second data set for transaction completion.

5. A computer-readable medium having tangibly embodied thereon sequences of instructions including instructions which when executed by a computer system cause the computer system to perform:
   adding, to a first database on a radio frequency (RF) transaction device, a first data set of a first format and a second data set of a second format, wherein:
      the first data set is owned by the first data set owner and the second data set is owned by the second data set owner,
      the first data set owner is distinct from the second data set owner,
      the first format is different from the second format, and
      the first data set is stored in accordance with the first format, and the second data set is stored in accordance with the second format;
   configuring a first method of authentication corresponding to the first data set and a second method of authentication corresponding to the second data set, wherein the first method of authentication and the second method of authentication (1) are configured by the first data set owner and the second data set owner independently and (2) each include a distinct access authentication protocol defined by the first data set owner and the second data set owner, respectively,
      wherein, in response to authentication of the first data set owner using the respective distinct access authentication protocol defined by the first data set owner, the first data set owner is provided access rights to the first data set, at least one access right including authorization to at least one of add and remove a static field of the first format, and
      wherein, in response to authentication of the second data set owner using the respective distinct access authentication protocol defined by the second data set owner, the second data set owner is provided access rights to the second data set, at least one access right including authorization to at least one of add and remove a static field of the second format;
   providing information relating to the first data set and the second data set for selection, wherein the information includes the first data set and the second data set being associated with transaction categories;
   determining a selection of at least one of the first data set and the second data set based in part on a preference of data set use and a transaction category of a transaction request;
   receiving the selection of at least one of the first data set and the second data set to complete the transaction request, wherein:
      if the first data set is selected, the receiving includes receiving a first secondary identifier indicium corresponding to the first method of authentication, and if the second data set is selected, the receiving includes receiving a second secondary identifier indicium corresponding to the second method of authentication;

authenticating, in response to receiving the selection, the transaction request using the first secondary identifier indicium if the first data set is selected and using the second secondary identifier indicium if the second data set is selected;

determining, based on the authenticating, whether the transaction request is approved; and completing, if the determining indicates that the transaction request is approved, the transaction request according to the selection.

6. The method of claim 1, wherein the receiving a selection step further comprises receiving an allocation of the entire transaction request to either the first data set or the second data set.

7. The method of claim 1, wherein the receiving a selection step further comprises receiving a selection of a plurality of data sets to complete the transaction request.

8. The method of claim 1, wherein the providing information relating to the first data set and the second data set for selection further comprises audibly providing information.

9. The method of claim 1, wherein the providing information relating to the first data set and the second data set for selection further comprises providing information during a transaction.

10. The method of claim 1, wherein the receiving the selection of at least one of the first data set and the second data set to complete the transaction request further comprises the selection of a portion of a transaction to allocate to at least one of the first data set and the second data set.

11. The method of claim 1, wherein the transaction category is based on the type of good or service involved in the transaction request.

12. The method of claim 1, wherein the transaction category is based on user prioritization of the first data set and the second data set.

13. The method of claim 1, wherein an RF reader determines the selection of at least one of the first data set and the second data set based in part on the preference of data set use and the transaction category of the transaction request.

* * * * *

UNITED STATES PATENT AND TRADEMARK OFFICE
CERTIFICATE OF CORRECTION

PATENT NO. : 7,996,324 B2  
APPLICATION NO. : 10/711720  
DATED : August 9, 2011  
INVENTOR(S) : Fred Bishop et al.

Page 1 of 1

It is certified that error appears in the above-identified patent and that said Letters Patent is hereby corrected as shown below:

On the Title page, item (63) Related U.S. Application Data, after Jan. 10, 2003, delete "and" and insert therefor --which is--.

Signed and Sealed this
Twenty-seventh Day of September, 2011

David J. Kappos
*Director of the United States Patent and Trademark Office*